United States Patent
Deng

(10) Patent No.: US 9,518,732 B2
(45) Date of Patent: Dec. 13, 2016

(54) HEATING ASSEMBLY

(71) Applicant: David Deng, Diamond Bar, CA (US)

(72) Inventor: David Deng, Diamond Bar, CA (US)

( * ) Notice: Subject to any disclaimer, the term of this patent is extended or adjusted under 35 U.S.C. 154(b) by 432 days.

(21) Appl. No.: 14/181,535

(22) Filed: Feb. 14, 2014

(65) Prior Publication Data

US 2014/0248571 A1 Sep. 4, 2014

Related U.S. Application Data

(60) Provisional application No. 61/771,795, filed on Mar. 2, 2013, provisional application No. 61/773,716, filed (Continued)

(51) Int. Cl.
*F23D 5/16* (2006.01)
*F23C 1/08* (2006.01)
(Continued)

(52) U.S. Cl.
CPC .............. *F23C 1/08* (2013.01); *A47J 37/07* (2013.01); *A47J 37/074* (2013.01);
(Continued)

(58) Field of Classification Search
CPC ............. F23Q 9/10; F23Q 9/08; F23N 1/002; F23N 1/005; F23N 5/245; F23N 5/102; F23N 5/242; F24C 3/10; F24C 3/103; F24C 3/02; F24C 3/08; F24C 5/14; F24C 1/04; F23D 5/16; F23D 2900/00004; F23D 17/002; F23D 2204/10; A47J 37/07; A47J 37/0713; A47J 37/0727; A47J 37/074
(Continued)

(56) References Cited

U.S. PATENT DOCUMENTS 743,714 A * 11/1903 Guese .................. F16K 11/074
137/625.11
1,639,115 A 8/1927 Smith
(Continued)

FOREIGN PATENT DOCUMENTS

CN 2421550 2/2001
CN 2430629 Y 5/2001
(Continued)

OTHER PUBLICATIONS

Country Flame Technologies Inglenook Fireplace Gas Log Set Model INGLS 24-N or INGLS 24-P Natural Gas or Propane Conversion Kit, Installation, Operation, and Maintenance Manual, 2004.

(Continued)

*Primary Examiner* — Gregory Huson
*Assistant Examiner* — Daniel E Namay
(74) *Attorney, Agent, or Firm* — Middleton Reutlinger

(57) ABSTRACT

A heating assembly can be used with one of a first fuel type or a second fuel type different than the first. The heating assembly can a include housing have a first actuation member and a second actuation member. The first and second actuation members can be positioned within respective first and second fuel hook-ups. The first and second actuation members can be configured such that connecting a fuel source to the heater assembly moves one of the actuation members from a first position to a second position to control flow through the heating assembly.

7 Claims, 38 Drawing Sheets

Related U.S. Application Data on Mar. 6, 2013, provisional application No. 61/773,713, filed on Mar. 6, 2013, provisional application No. 61/778,072, filed on Mar. 12, 2013, provisional application No. 61/806,344, filed on Mar. 28, 2013.

(51) Int. Cl.

| | | |
|---|---|---|
| *F23D 17/00* | (2006.01) | |
| *F23N 5/10* | (2006.01) | |
| *F23N 5/24* | (2006.01) | |
| *F23N 1/00* | (2006.01) | |
| *F24C 1/04* | (2006.01) | |
| *F24C 3/02* | (2006.01) | |
| *F24C 3/08* | (2006.01) | |
| *A47J 37/07* | (2006.01) | |
| *F23D 11/42* | (2006.01) | |
| *F23K 5/16* | (2006.01) | |
| *F23Q 9/08* | (2006.01) | |
| *F24C 3/10* | (2006.01) | |
| *F24C 5/14* | (2006.01) | |

(52) U.S. Cl.
CPC ....... *A47J 37/0713* (2013.01); *A47J 37/0727* (2013.01); *F23D 17/002* (2013.01); *F23N 1/002* (2013.01); *F23N 5/102* (2013.01); *F23N 5/242* (2013.01); *F24C 1/04* (2013.01); *F24C 3/02* (2013.01); *F24C 3/08* (2013.01); *F23D 2204/10* (2013.01); *F23D 2900/00004* (2013.01)

(58) Field of Classification Search
USPC ............. 431/74, 6, 66, 47, 72, 86, 127, 128, 254,431/280; 137/62.15, 625.47, 905, 613; 236/1 A, 236/11, 15 BD
IPC ........ F23D 11/42,5/16; F23K 5/16; F23Q 9/10, 9/08; F24C 5/14, 3/08
See application file for complete search history.

(56) References Cited

U.S. PATENT DOCUMENTS

| | | | |
|---|---|---|---|
| 2,319,676 A | 5/1943 | Guelson | |
| 2,380,956 A | 8/1945 | Evarts | |
| 2,422,368 A | 6/1947 | Ray | |
| 2,464,697 A | 3/1949 | Logan et al. | |
| 2,518,894 A | 8/1950 | Humbarger et al. | |
| 2,556,337 A | 6/1951 | Paille | |
| 2,588,485 A | 3/1952 | Clarke et al. | |
| 2,630,821 A | 3/1953 | Arey et al. | |
| 2,661,157 A | 12/1953 | Reichelderfer | |
| 2,687,140 A | 8/1954 | St. Clair et al. | |
| 2,899,798 A * | 8/1959 | Broders et al. | F02C 7/264 417/318 |
| 2,905,361 A | 9/1959 | Noall | |
| 2,969,924 A | 1/1961 | William | |
| 3,001,541 A | 9/1961 | St. Clair et al. | |
| 3,032,096 A | 5/1962 | Stoui | |
| 3,146,794 A * | 9/1964 | Hollman | F16K 11/0743 137/625.15 |
| 3,213,613 A * | 10/1965 | Schwent | F02C 9/16 137/82 |
| 3,244,193 A | 4/1966 | Loveless | |
| 3,331,392 A | 7/1967 | Davidson et al. | |
| 3,386,656 A | 6/1968 | Bergquist | |
| 3,430,655 A | 3/1969 | Forney | |
| 3,578,015 A | 5/1971 | Andersen | |
| 3,747,629 A | 7/1973 | Bauman | |
| 3,814,570 A | 6/1974 | Guigues et al. | |
| 3,829,279 A | 8/1974 | Qualley et al. | |
| 3,939,871 A | 2/1976 | Dickson | |
| 3,954,384 A * | 5/1976 | Tyler | F23Q 9/12 236/99 R |
| 4,021,190 A | 5/1977 | Dickson | |
| 4,033,314 A * | 7/1977 | Walton | F02M 45/04 123/452 |
| 4,101,257 A | 7/1978 | Straitz, III | |
| 4,171,712 A | 10/1979 | DeForrest | |
| 4,181,154 A | 1/1980 | Oley et al. | |
| 4,290,450 A | 9/1981 | Swanson | |
| 4,301,825 A | 11/1981 | Simko | |
| 4,359,284 A | 11/1982 | Kude et al. | |
| 4,465,456 A | 8/1984 | Hynek et al. | |
| 4,515,554 A | 5/1985 | Sirand | |
| 4,653,530 A | 3/1987 | Kelly | |
| 4,660,595 A | 4/1987 | Kuster et al. | |
| 4,690,108 A * | 9/1987 | Debevec | F02M 59/107 123/196 S |
| 4,718,448 A | 1/1988 | Love et al. | |
| 4,768,543 A | 9/1988 | Wienke et al. | |
| 4,796,652 A | 1/1989 | Hafla | |
| 4,930,538 A | 6/1990 | Browne | |
| 4,958,771 A | 9/1990 | Klomp | |
| 5,048,563 A * | 9/1991 | Buchanan | F23K 5/18 137/597 |
| 5,090,451 A * | 2/1992 | Buchanan | F16K 11/161 137/597 |
| 5,172,728 A | 12/1992 | Tsukazaki | |
| 5,379,794 A | 1/1995 | Brown | |
| 5,413,141 A | 5/1995 | Dietiker | |
| 5,452,709 A | 9/1995 | Mealer | |
| 5,458,294 A | 10/1995 | Zachary et al. | |
| 5,584,680 A | 12/1996 | Kim | |
| 5,591,024 A | 1/1997 | Eavenson et al. | |
| 5,674,065 A | 10/1997 | Grando et al. | |
| 5,706,859 A | 1/1998 | Backlund | |
| 5,795,145 A | 8/1998 | Manning et al. | |
| 5,807,098 A | 9/1998 | Deng | |
| 5,816,792 A | 10/1998 | Spencer | |
| 5,915,952 A * | 6/1999 | Manning | F24C 3/122 431/12 |
| 5,971,746 A | 10/1999 | Givens et al. | |
| 5,975,112 A | 11/1999 | Ohmi et al. | |
| 5,988,204 A | 11/1999 | Reinhardt et al. | |
| 6,035,893 A | 3/2000 | Ohmi et al. | |
| 6,135,063 A | 10/2000 | Welden | |
| 6,257,270 B1 | 7/2001 | Ohmi et al. | |
| 6,352,428 B1 * | 3/2002 | Uribetxebarria | F23N 1/005 126/512 |
| 6,354,078 B1 | 3/2002 | Karlsson et al. | |
| 6,402,052 B1 | 6/2002 | Murawa | |
| 6,607,854 B1 | 8/2003 | Rehg et al. | |
| 6,786,194 B2 | 9/2004 | Koegler et al. | |
| 6,904,873 B1 | 6/2005 | Ashton | |
| 6,910,496 B2 | 6/2005 | Strom | |
| 6,938,634 B2 | 9/2005 | Dewey, Jr. | |
| 6,941,962 B2 | 9/2005 | Haddad | |
| 7,013,886 B2 | 3/2006 | Deng | |
| 7,044,729 B2 | 5/2006 | Ayastuy et al. | |
| 7,225,830 B1 | 6/2007 | Kershaw | |
| 7,386,981 B2 | 6/2008 | Zielinski et al. | |
| 7,434,447 B2 | 10/2008 | Deng | |
| 7,487,888 B1 | 2/2009 | Pierre, Jr. | |
| 7,533,656 B2 | 5/2009 | Dingle | |
| 7,600,529 B2 | 10/2009 | Querejeta | |
| 7,607,426 B2 | 10/2009 | Deng | |
| 7,654,820 B2 | 2/2010 | Deng | |
| 7,677,236 B2 | 3/2010 | Deng | |
| 7,967,005 B2 * | 6/2011 | Parrish | A47J 37/0713 126/39 N |
| 8,011,920 B2 | 9/2011 | Deng | |
| 8,123,150 B2 | 2/2012 | Khan et al. | |
| 8,152,515 B2 | 4/2012 | Deng | |
| 8,241,034 B2 | 8/2012 | Deng | |
| 8,465,277 B2 | 6/2013 | Deng | |
| 8,517,718 B2 | 8/2013 | Deng | |
| 8,757,139 B2 | 6/2014 | Deng | |
| 8,757,202 B2 | 6/2014 | Deng | |
| 9,074,770 B2 * | 7/2015 | Young | F23N 1/002 |

(56) References Cited

U.S. PATENT DOCUMENTS

| | | | |
|---|---|---|---|
| 9,170,016 B2* | 10/2015 | Deng | F24C 1/02 |
| 2003/0010952 A1 | 1/2003 | Morete | |
| 2006/0096644 A1 | 5/2006 | Goldfarb et al. | |
| 2006/0236986 A1 | 10/2006 | Fujisawa | |
| 2007/0044856 A1* | 3/2007 | Bonior | F16K 11/0856 |
| | | | 137/625.47 |
| 2007/0154856 A1 | 7/2007 | Hallit et al. | |
| 2007/0215223 A1 | 9/2007 | Morris | |
| 2008/0149872 A1 | 6/2008 | Deng | |
| 2010/0310997 A1 | 12/2010 | Mugica Odriozola et al. | |
| 2010/0319789 A1 | 12/2010 | Erdmann et al. | |
| 2011/0198841 A1 | 8/2011 | Kitagawa | |
| 2011/0226355 A1 | 9/2011 | Benvenuto et al. | |
| 2011/0271880 A1 | 11/2011 | Thompson | |
| 2011/0284791 A1 | 11/2011 | Vasquez et al. | |
| 2012/0196236 A1 | 8/2012 | Deng | |
| 2012/0255536 A1 | 10/2012 | Deng | |
| 2013/0098349 A1 | 4/2013 | Deng | |
| 2013/0209944 A1* | 8/2013 | Deng | F23N 1/005 |
| | | | 431/6 |
| 2014/0057218 A1 | 2/2014 | Deng | |
| 2014/0072921 A1 | 3/2014 | Deng | |
| 2014/0186783 A1 | 7/2014 | Deng | |
| 2016/0161146 A1* | 6/2016 | Deng | F24H 3/006 |
| | | | 431/285 |

FOREIGN PATENT DOCUMENTS

| | | |
|---|---|---|
| CN | 1873268 A | 12/2006 |
| CN | 102506198 | 6/2012 |
| DE | 113 680 C | 11/1899 |
| DE | 1650303 | 9/1970 |
| DE | 1959677 | 5/1971 |
| DE | 3700233 A1 | 7/1988 |
| DE | 19543018 | 5/1997 |
| EP | 0509626 | 10/1992 |
| EP | 1326050 | 7/2003 |
| EP | 1970625 | 9/2008 |
| FR | 2151367 | 3/1973 |
| GB | 19845 | 2/1913 |
| GB | 1136468 | 12/1968 |
| GB | 1381887 | 1/1975 |
| GB | 2210155 | 6/1989 |
| GB | 2241180 | 8/1991 |
| GB | 2298039 | 8/1996 |
| JP | 58 219320 A | 12/1983 |
| JP | 59009425 | 1/1984 |
| JP | 03 230015 A | 10/1991 |
| JP | 05-256422 | 5/1993 |
| JP | 10141656 | 5/1998 |
| JP | 11192166 | 7/1999 |
| JP | 2000234738 | 8/2000 |
| JP | 2003 056845 A | 2/2003 |
| JP | 2003 074837 A | 3/2003 |
| JP | 2003 074838 A | 3/2003 |
| WO | WO 2011/156425 | 12/2011 |
| WO | WO 2012/099825 | 7/2012 |

OTHER PUBLICATIONS

Desa Heating Products, Technical Service Training Manual, 2004.
Flagro F-400T Dual Fuel Construction Heater, Operating Instructions Manual.
Heat Wagon S1505 Construction Heater, Installation and Maintenance Manual, Jul. 29, 2002.
Jotul GF 3 BVAllagash B-Vent Gas Heater, Installation and Operating Instructions, Dec. 2000.
Vanguard Unvented (Vent-Free) Propane/LP Gas Log Heater Manual, Feb. 2004.
White Mountain Hearth, The Vail Vent-Free Gas Fireplace, Installation Instructions and Owner's Manual, Mar. 2006.
Installation Instructions and Owner's Manuals for Empire Unvented Gas Fireplace Model VFHS-36, Mar. 2001.
Installation Instructions and Owner's Manuals for Empire Unvented Gas Fireplace Model VFHS-33, Apr. 2001.
Installation Instructions and Owner's Manuals for Empire Unvented Gas Fireplace Models VFHD-32 and VFHS-36, Apr. 2003.
Installation Instructions and Owner's Manuals for Empire Unvented Gas Fireplace Models VFHD-32 and VFHS-36, Sep. 2003.
Installation Instructions and Owner's Manuals for Empire Unvented Gas Fireplace Models VFHD-32 and VFHS-36, Feb. 2004.
Installation Instructions and Owner's Manuals for Empire Unvented Gas Fireplace Models VFHD-32 and VFHS-36, Sep. 2004.
Installation Instructions and Owner's Manuals for Empire Unvented Gas Fireplace Models VFHD-32 and VFHS-36, Jun. 2005.
Installation Instructions and Owner's Manuals for Empire Unvented Gas Fireplace Models VFP32FP and VFP36FP, Mar. 2006.
Installation Instructions and Owner's Manuals for Empire Unvented Gas Fireplace Models VFP32FP and VFP36FP, May 2006.
Installation Instructions and Owner's Manuals for Empire Unvented Gas Fireplace Model VFHS-20, Jun. 2002.
Installation Instructions and Owner's Manuals for Empire Unvented Gas Fireplace Model VFHS-20, Sep. 2003.
Installation Instructions and Owner's Manuals for Empire Unvented Gas Fireplace Model VFHS-20, Nov. 2003.
Installation Instructions and Owner's Manuals for Empire Unvented Gas Fireplace Model VFHS-20, Sep. 2004.
Installation Instructions and Owner's Manuals for Empire Unvented Gas Fireplace Model VFHS-20, Jun. 2005.
Installation Instructions and Owner's Manuals for Empire Unvented Gas Fireplace Model VFHS-32, Aug. 2002.
*Procom Heating, Inc. v. GHP Group, Inc.* (W.D. KY, Case No. 1:13-cv-00163-GNS-HBB): GHP's Answer to the First Amended Complaint, Aug. 27, 2014.
*Procom Heating, Inc. v. GHP Group, Inc.* (W.D. KY, Case No. 1:13-cv-00163-GNS-HBB): Procom Heating's First Amended Complaint, Aug. 13, 2014.
*Procom Heating, Inc. v. GHP Group, Inc.* (W.D. KY, Case No. 1:13-cv-00163-GNS-HBB): Claims Construction Memorandum Opinion and Order, Jul. 8, 2015.
*Procom Heating, Inc. v. GHP Group, Inc.* (W.D. KY, Case No. 1:13-cv-00163-GNS-HBB): GHP's Initial Invalidity Contentions, Mar. 31, 2014.
*Procom Heating, Inc. v. GHP Group, Inc.* (W.D. KY, Case No. 1:13-cv-00163-GNS-HBB): GHP's 2nd Amended Initial Invalidity Contentions, Sep. 4, 2015.
*Procom Heating, Inc. v. GHP Group, Inc.* (W.D. KY, Case No. 1:13-cv-00163-GNS-HBB): GHP's 2nd Amended Initial Invalidity Contentions, Claims Chart—Exhibit A, Sep. 4, 2015.
*Procom Heating, Inc. v. GHP Group, Inc.* (W.D. KY, Case No. 1:13-cv-00163-GNS-HBB): GHP's 2nd Amended Initial Invalidity Contentions, Claims Chart—Exhibit B, Sep. 4, 2015.
*Procom Heating, Inc. v. GHP Group, Inc.* (W.D. KY, Case No. 1:13-cv-00163-GNS-HBB): GHP's 2nd Amended Initial Invalidity Contentions, Claims Chart—Exhibit C, Sep. 4, 2015.
*Procom Heating, Inc. v. GHP Group, Inc.* (W.D. KY, Case No. 1:13-cv-00163-GNS-HBB): GHP's 2nd Amended Initial Invalidity Contentions, Claims Chart—Exhibit D, Sep. 4, 2015.
*Procom Heating, Inc. v. GHP Group, Inc.* (W.D. KY, Case No. 1:13-cv-00163-GNS-HBB): GHP's 2nd Amended Initial Invalidity Contentions, Claims Chart—Exhibit E, Sep. 4, 2015.
*Procom Heating, Inc. v. GHP Group, Inc.* (W.D. KY, Case No. 1:13-cv-00163-GNS-HBB): GHP's 2nd Amended Initial Invalidity Contentions, Claims Chart—Exhibit F, Sep. 4, 2015.
*Procom Heating, Inc. v. GHP Group, Inc.* (W.D. KY, Case No. 1:13-cv-00163-GNS-HBB): GHP's 2nd Amended Initial Invalidity Contentions, Claims Chart—Exhibit G, Sep. 4, 2015.

\* cited by examiner

B-B

HEATING ASSEMBLY

CROSS-REFERENCE TO RELATED APPLICATIONS

This application claims priority to U.S. Patent Appl. Nos.: 61/771,795, filed Mar. 2, 2013; 61/773,716, filed Mar. 6, 2013; 61/773,713, filed Mar. 6, 2013; 61/778,072, filed Mar. 12, 2013; and 61/806,344, filed Mar. 28, 2013. The entire contents of the above applications are hereby incorporated by reference and made a part of this specification. Any and all priority claims identified in the Application Data Sheet, or any correction thereto, are hereby incorporated by reference under 37 CFR 1.57.

BACKGROUND OF THE INVENTION

Field of the Invention

Certain embodiments disclosed herein relate generally to a heating apparatus for use in a gas appliance adapted for single or multiple fuel use. The heating apparatus can be, can be a part of, and can be used in or with many different appliances, including, but not limited to: heaters, boilers, dryers, washing machines, ovens, fireplaces, stoves, water heaters, barbeques, etc.

Description of the Related Art

Many varieties of appliances, such as heaters, boilers, dryers, washing machines, ovens, fireplaces, stoves, and other heat-producing devices utilize pressurized, combustible fuels. Some such devices commonly operate with either liquid propane or natural gas. And some such devices may operate on one or more other fuels. However, such devices and certain components thereof have various limitations and disadvantages. Therefore, there exists a constant need for improvement in appliances and components to be used in appliances.

SUMMARY

A heating assembly can be used in a dual fuel heater to mix air with fuel to be combusted at the burner. For example, the heating assembly can be configured to be used with one or more of natural gas, liquid propane, well gas, city gas, and methane. The heating assembly can be switched between the different fuels without requiring adjustment of a window or opening for creating the air fuel mixture. According to some embodiments a heating assembly can include any number of different components such as a fuel selector valve, a pressure regulator, a control valve, a burner nozzle, a burner, a pilot, and/or an oxygen depletion sensor.

According to some embodiments, a heater assembly can be configured to produce a yellow flame. The heater assembly can comprise a burner, a first nozzle, a second nozzle, a first conduit, and a second conduit. The first conduit can be positioned between the first nozzle and the burner, the first conduit comprising an opening configured to allow air to mix with fuel injected into the first conduit by the first nozzle. The second conduit can be positioned between the second nozzle and the burner. The first nozzle can be configured to inject fuel into the first conduit near the opening and at a location separate and spaced apart from where the second nozzle is configured to inject fuel into the second conduit. In some embodiments, the fuel injected into the second nozzle does not pass through the first nozzle.

In some embodiments, the heater assembly can further comprise one or more of a venturi positioned between the burner and the first and second nozzles, a control valve configured to control fuel flow to the burner, and a fuel selector valve having a first position and a second position, each position configured to direct a set fuel type through the heater assembly along a set fuel path. In the first position fuel flow can be directed to the first nozzle and in the second position fuel flow can be directed to the second nozzle. In the second position fuel flow may be directed to both the first nozzle and the second nozzle.

According to some embodiments, a heating apparatus can comprise a first fuel input for receiving fuel from a first fuel source, a second fuel input for receiving fuel from a second fuel source, a first fuel outlet path, a second fuel outlet path, a valve body, a transition housing, and a burner. The valve body can be configured to selectively permit fluid communication between the first fuel input and the first fuel output path and/or between the second fuel input and the second fuel outlet path. The transition housing can define a first inlet, a second inlet and an egress, said first inlet communicating with a mixing chamber positioned to receive fuel from the first fuel outlet path and defining one or more openings through which air can pass in response to fuel flow through said mixing chamber to mix with fuel received from the first outlet path and exit through said egress, said second inlet positioned to receive fuel from the second outlet path and defining a second chamber configured to receive fuel from said second outlet path and exit through said egress without flowing across said one or more openings. The burner can be in fluid communication with said egress.

In some embodiments, a heater assembly can be configured for use with one of a first fuel type or a second fuel type different than the first. The heater assembly can comprise a housing, a first actuation member and a second actuation member. The housing can have a first fuel hook-up for connecting a first fuel type to the heater assembly, a second hook-up for connecting a second fuel type to the heater assembly, a first outlet in fluid communication with both the first and second fuel hook-ups, a first inlet, a second inlet, a second outlet, a third outlet, and a fourth outlet. The first actuation member can have an end located within the first fuel hook-up and having a first actuation member first position and a second position, the actuation member configured such that connecting a fuel source to the heater assembly at the first fuel hook-up moves the actuation member from the first actuation member first position to the second position. In the first actuation member first position, fuel flow through the first fuel hook-up and between the second inlet and fourth outlet is prevented. In the first actuation member second position, fuel flow through the first fuel hook-up and between the second inlet and fourth outlet is permitted. The second actuation member can have an end located within the second fuel hook-up and having a first position and a second position, the actuation member configured such that connecting a fuel source to the heater assembly at the second fuel hook-up moves the actuation member from the first position to the second position. In the second actuation member first position, fuel flow through the second fuel hook-up and between the first inlet and the third outlet is prevented. In the second actuation member second position, fuel flow through the second fuel hook-up and between the first inlet and the third outlet is permitted.

In some embodiments, the heater assembly may further comprise a first pressure regulator configured to regulate a fuel flow of the first fuel type within a first predetermined range and a second pressure regulator configured to regulate a fuel flow of the second fuel type within a second predetermined range different from the first.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION

Many varieties of appliances, such as heaters, boilers, dryers, washing machines, ovens, fireplaces, stoves, and other heat-producing devices utilize pressurized, combustible fuels. For example, many varieties of space heaters, fireplaces, stoves, ovens, boilers, fireplace inserts, gas logs, and other heat-producing devices employ combustible fuels, such as liquid propane and/or natural gas. These devices generally are designed to operate with a single fuel type at a specific pressure. For example, as one having skill in the art would appreciate, some gas heaters that are configured to be installed on a wall or a floor operate with natural gas at a pressure in a range from about 3 inches of water column to about 6 inches of water column, while others operate with liquid propane at a pressure in a range from about 8 inches of water column to about 12 inches of water column.

Although certain embodiments discussed herein are described in the context of directly vented heating units, such as fireplaces and fireplace inserts, or vent-free heating systems, it should be understood that certain features, principles, and/or advantages described are applicable in a much wider variety of contexts, including, for example, gas logs, heaters, heating stoves, cooking stoves, barbecue grills, water heaters, and any flame-producing and/or heat-producing fluid-fueled unit, including without limitation units that include a burner of any suitable variety.

Figure 1:
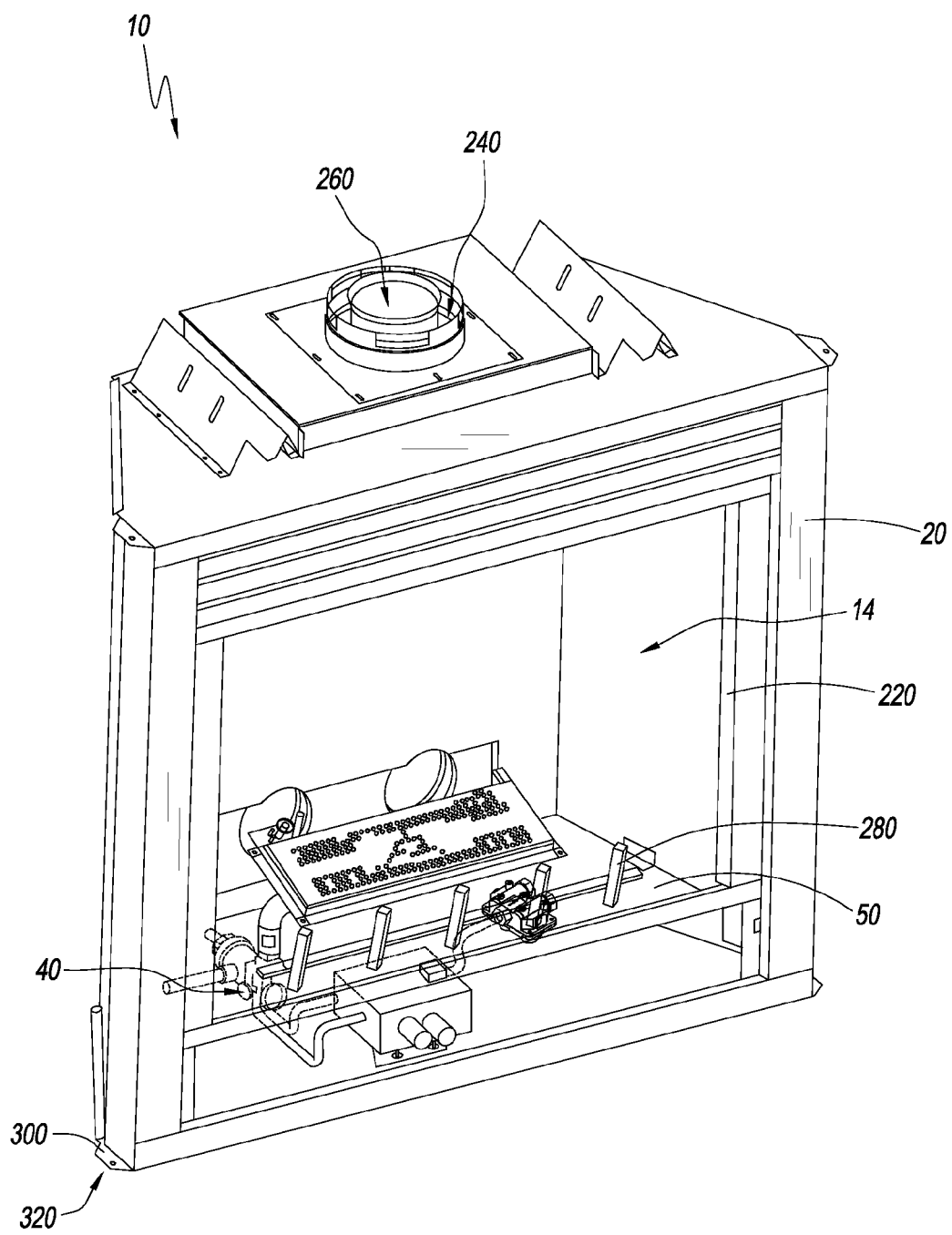
FIG. 1 is a perspective view of an embodiment of a heating device.

FIG. 1 illustrates an embodiment of a fireplace, fireplace insert, heat-generating unit, or heating device 10 configured to operate with a source of combustible fuel. In various embodiments, the heating device 10 is configured to be installed within a suitable cavity, such as the firebox of a fireplace or a dedicated outer casing. The heating device 10 can extend through a wall, in some embodiments.

The heating device 10 includes a housing 20. The housing 20 can include metal or some other suitable material for providing structure to the heating device 10 without melting or otherwise deforming in a heated environment. The housing 20 can define a window 220. In some embodiments, the window 220 comprises a sheet of substantially clear material, such as tempered glass, that is substantially impervious to heated air but substantially transmissive to radiant energy.

The heating device 10 can include a sealed chamber 14. The sealed chamber 14 can be sealed to the outside with the exception of the air intake 240 and the exhaust 260. Heated air does not flow from the sealed chamber to the surroundings; instead air, for example from in an interior room, can enter an inlet vent into the housing 20. The air can pass through the housing in a channel passing over the outside of the sealed chamber 14 and over the exhaust 260. Heat can be transferred to the air which can then pass into the interior room through an outlet vent.

In some embodiments, the heating device 10 includes a grill, rack, or grate 280. The grate 280 can provide a surface against which artificial logs may rest, and can resemble similar structures used in wood-burning fireplaces. In certain embodiments, the housing 20 defines one or more mounting flanges 300 used to secure the heating device 10 to a floor and/or one or more walls. The mounting flanges 300 can include apertures 320 through which mounting hardware can be advanced. Accordingly, in some embodiments, the housing 20 can be installed in a relatively fixed fashion within a building or other structure.

As shown, the heating device 10 includes a fuel delivery system 40, which can have portions for accepting fuel from a fuel source, for directing flow of fuel within the heating device 10, and for combusting fuel. In the illustrated embodiment, portions of an embodiment of the fuel delivery system 40 that would be obscured by the heating device 10 are shown in phantom. Specifically, the illustrated heating device 10 includes a floor 50 which forms the bottom of the sealed combustion chamber 14 and the components shown in phantom are positioned beneath the floor 50.

Figure 2:
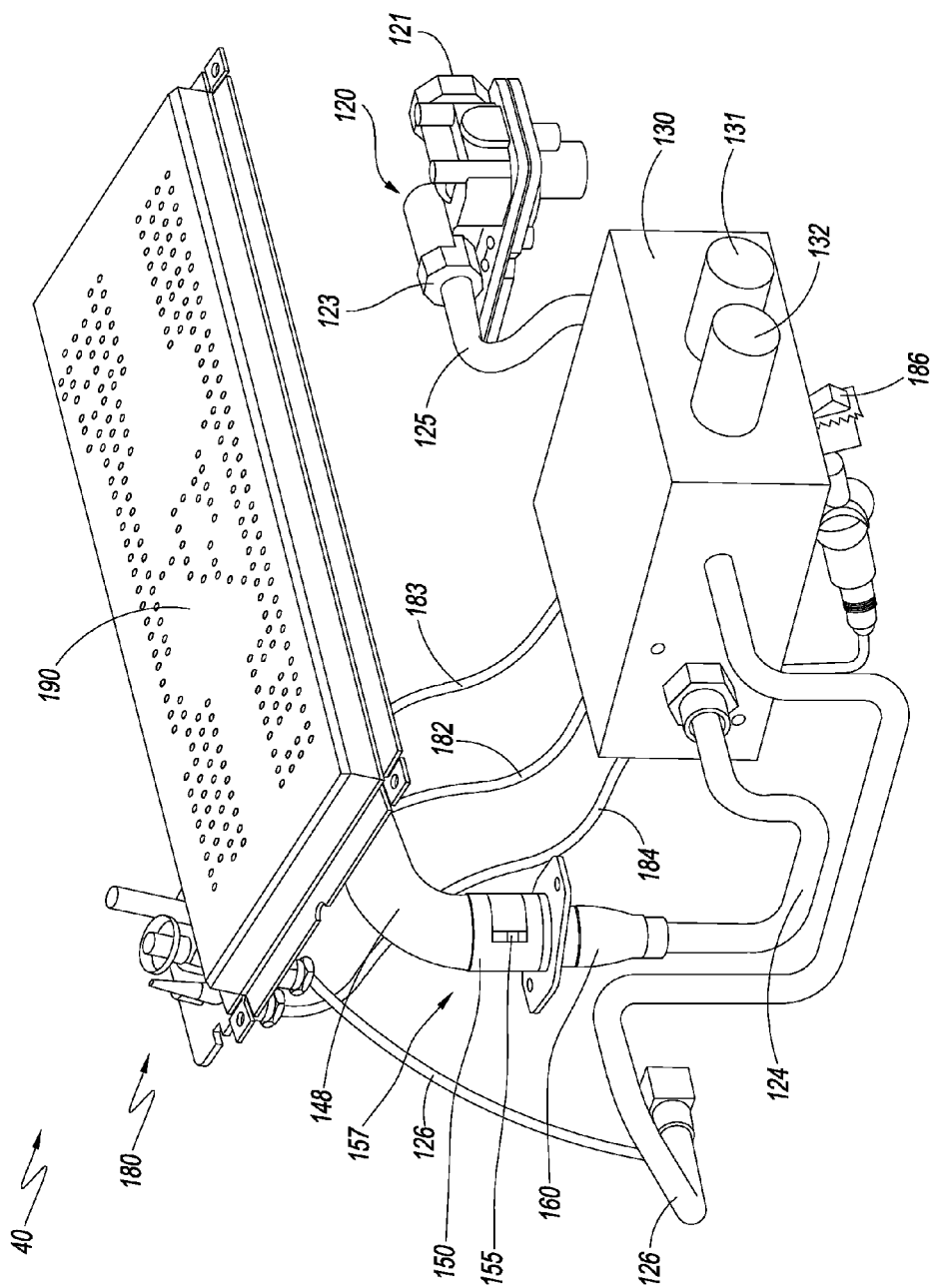
FIG. 2 is a perspective view of an embodiment of a fuel delivery system compatible with the heating device of FIG. 1.

With reference to FIG. 2, an example of a fuel delivery system 40 is shown. The fuel delivery system 40 can include a regulator 120. The regulator 120 can be configured to selectively receive a fluid fuel (e.g., propane or natural gas) from a source at a certain pressure. In certain embodiments, the regulator 120 includes an input port 121 for receiving the fuel. The regulator 120 can define an output port 123 through which fuel exits the regulator 120. Accordingly, in many embodiments, the regulator 120 is configured to operate in a state in which fuel is received via the input port 121 and delivered to the output port 123. In certain embodiments, the regulator 120 is configured to regulate fuel entering the port 121 such that fuel exiting the output port 123 is at a relatively steady pressure. The regulator 120 can function in ways similar to the pressure regulators disclosed in U.S. patent application Ser. No. 11/443,484, filed May 30, 2006, now U.S. Pat. No. 7,607,426, the entire contents of which are hereby incorporated by reference herein and made a part of this specification.

The output port 123 of the regulator 120 can be coupled with a source line or channel 125. The source line 125, and any other fluid line described herein, can comprise piping, tubing, conduit, or any other suitable structure adapted to direct or channel fuel along a flow path. In some embodiments, the source line 125 is coupled with the output port 123 at one end and is coupled with a control valve 130 at another end. The source line 125 can thus provide fluid communication between the regulator 120 and the control valve 130.

The control valve 130 can be configured to regulate the amount of fuel delivered to portions of the fuel delivery system 40. Various configurations of the control valve 130 are possible, including those known in the art as well as those yet to be devised. In some embodiments, the control valve 130 includes a millivolt valve. The control valve 130 can comprise a first knob or dial 131 and a second dial 132. In some embodiments, the first dial 131 can be rotated to adjust the amount of fuel delivered to a burner 190, and the second dial 132 can be rotated to adjust a setting of a thermostat. In other embodiments, the control valve 130 comprises a single dial 131.

In many embodiments, the control valve 130 is coupled with a burner transport line or channel 124 and a pilot transport or delivery line 126. The burner transport line 124 can be coupled with a nozzle assembly 160 which can be further coupled with a burner delivery line 148. The nozzle assembly 160 can be configured to direct fuel received from the burner transport line 132 to the burner delivery line or channel 148.

The pilot delivery line 126 is coupled with a pilot 180. Fuel delivered to the pilot 180 can be combusted to form a pilot flame, which can serve to ignite fuel delivered to the burner 190 and/or serve as a safety control feedback mechanism that can cause the control valve 130 to shut off delivery of fuel to the fuel delivery system 40. Additionally, in some embodiments, the pilot 180 is configured to provide power to the control valve 130. Accordingly, in some embodiments, the pilot 180 is coupled with the control valve 130 by one or more of a feedback line 182 and a power line 183.

The pilot 180 can comprise an igniter or an electrode configured to ignite fuel delivered to the pilot 180 via the pilot delivery line 126. Accordingly, the pilot 180 can be coupled with an igniter line 184, which can be connected to an igniter actuator, button, or switch 186. In some embodiments, the igniter switch 186 is mounted to the control valve 130. In other embodiments, the igniter switch 186 is mounted to the housing 20 of the heating device 10. The pilot 180 can also comprise a thermocouple. Any of the lines 182, 183, 184 can comprise any suitable medium for communicating an electrical quantity, such as a voltage or an electrical current. For example, in some embodiments, one or more of the lines 182, 183, 184 comprise a metal wire.

Furthermore, as discussed below, when a pilot light heats the thermocouple a current is generated in the thermocouple. In certain embodiments, this current produces a magnetic field within the control valve 130 that maintains the valve 130 in an open position. If the pilot light goes out or is disturbed, and the current flow is reduced or terminated, the magnetic field weakens or is eliminated, and the valve 130 closes, thereby preventing passage of fuel.

The pilot 180 may also be an oxygen depletion sensor (ODS) 180. In various embodiments, the ODS 180 provides a steady pilot flame that heats the thermocouple unless the oxygen level in the ambient air drops below a threshold level. In certain embodiments, the threshold oxygen level is between about 18 percent and about 18.5 percent. In some embodiments, when the oxygen level drops below the threshold level, the pilot flame moves away from the thermocouple, the thermocouple cools, and the heat control valve 130 closes, thereby cutting off the fuel supply to the heater 10. It will be understood that most all references to pilot and pilot assembly also refer to an ODS.

The burner delivery line 148 is situated to receive fuel from the nozzle assembly 160, and can be connected to the burner 190. The burner 190 can comprise any suitable burner, such as, for example, a ceramic tile burner or a blue flame burner, and is preferably configured to continuously combust fuel delivered via the burner delivery line 148.

The flow of fuel through the fuel delivery system 40, as shown, will now be described. A fuel is introduced into the fuel delivery system 40 through the regulator 120 which then proceeds from the regulator 120 through the source line or channel 125 to the control valve 130. The control valve 130 can permit a portion of the fuel to flow into the burner transport line or channel 132, and can permit another portion of the fuel to flow into the pilot transport line or channel 126. The fuel flow in the burner transport line 132 can proceed to the nozzle assembly 160. The nozzle assembly 160 can direct fuel from the burner transport line or channel 132 into the burner delivery line or channel 148. In some embodiments, fuel flows through the pilot delivery line or channel 126 to the pilot 180, where it is combusted. In some embodiments, fuel flows through the burner delivery line or channel 148 to the burner 190, where it is combusted.

An air shutter 150 can also be along the burner delivery line 148. The air shutter 150 can be used to introduce air into the flow of fuel prior to combustion at the burner 190. This can create a mixing chamber 157 where air and fuel is mixed together prior to passing through the burner delivery line 148 to the burner 190. The amount of air that is needed to be introduced can depend on the type of fuel used. For example, propane gas at typical pressures needs more air than natural gas to produce a flame of the same size.

The air shutter 150 can be adjusted by increasing or decreasing the size of a window 155. The window 155 can be configured to allow air to pass into and mix with fuel in the burner delivery line 148.

Figure 3:
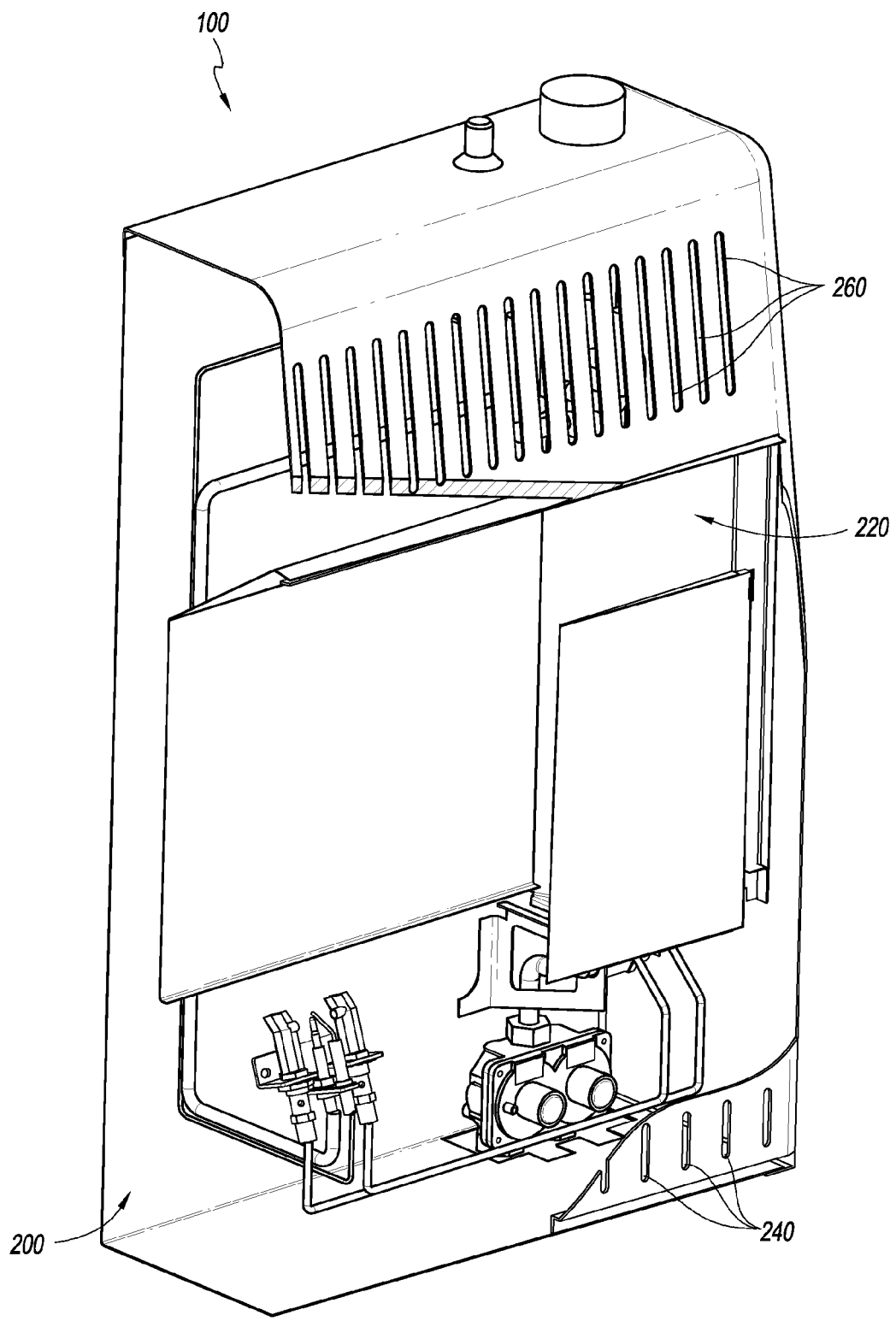
FIG. 3 is a perspective cutaway view of a portion of one embodiment of a heater configured to operate using either a first fuel source or a second fuel source.
Figure 4:
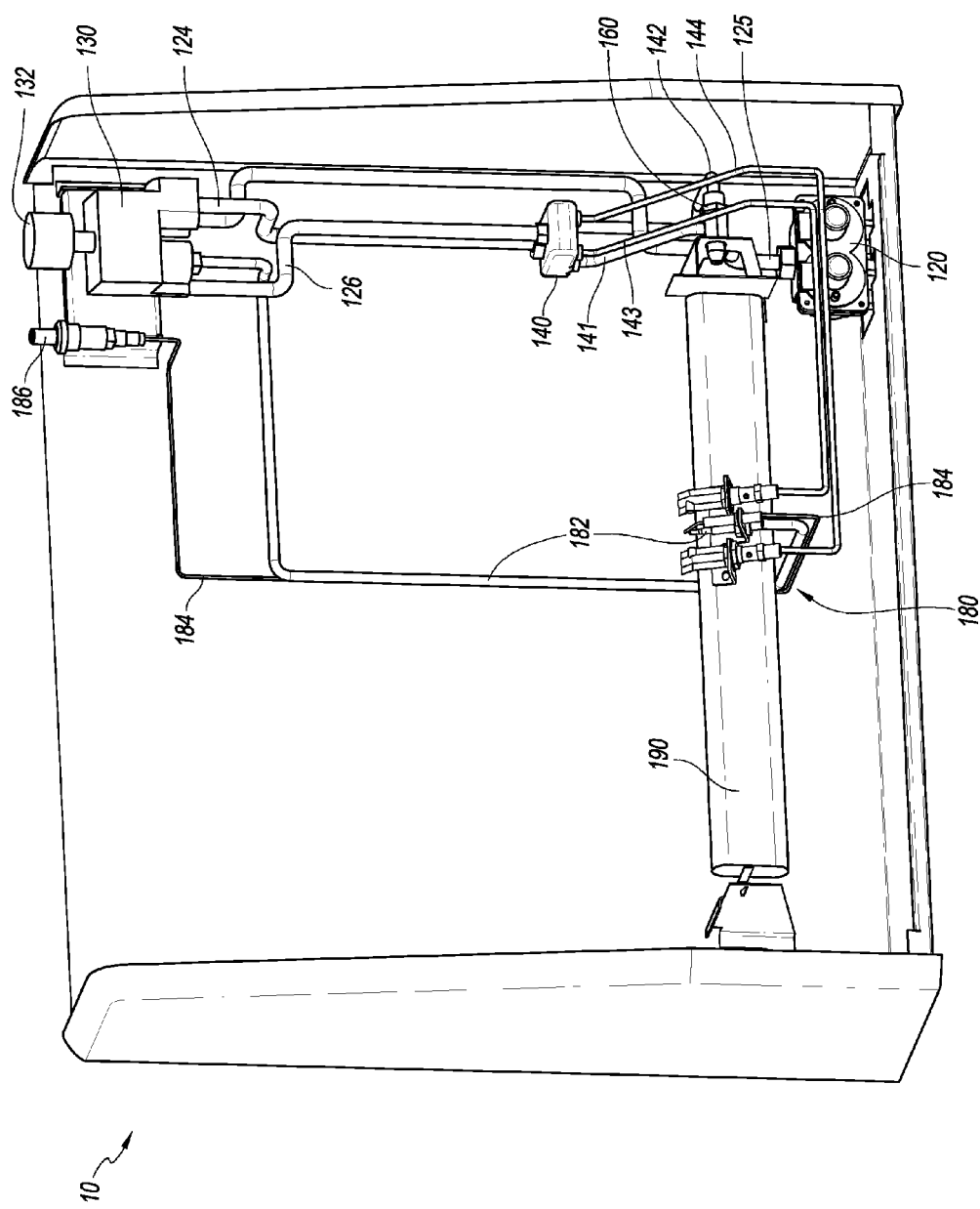
FIG. 4 is a partially dissembled perspective view of the heater of FIG. 3.

FIGS. 3 and 4 show an embodiment of a dual fuel heater 100. The heater can be made for use with two different fuels, where in a first setting the heater is set to use the first fuel and in a second setting the heater is set to use the second fuel. The heater 100 can be configured such that the installer of the gas appliance can connect the assembly to one of two fuels, such as either a supply of natural gas (NG) or a supply of propane (LP) and the assembly will desirably operate in the standard mode (with respect to efficiency and flame size and color) for either gas. The heater 100 can be, for example, a vent-free infrared heater or a vent-free blue flame heater. Other configurations are also possible for the heater 100.

Though the heater 100 is configured for dual fuel use, the heater can include many of the same types of components as the heater 10 as will be understood by review of the below description. It will be understood that like reference characters or terminology denote corresponding features, but this does not require that the components be identical in all aspects.

The heater 100 can comprise a housing 200. In the illustrated embodiment, the housing 200 comprises a window 220, one or more intake vents 240 and one or more outlet vents 260. Heated air and/or radiant energy can pass through the window 220. Air can flow into the heater 100 through the one or more intake vents 240 and heated air can flow out of the heater 100 through the outlet vents 260.

With reference to FIG. 4, in certain embodiments, the heater 100 includes a regulator 120. The regulator 120 can be coupled with source line 125. The source line 125 can be coupled with a heater control valve 130, which, in some embodiments, includes a knob 132. As illustrated, the heater control valve 130 is coupled to a fuel supply pipe 124 and an oxygen depletion sensor (ODS) pipe 126, each of which can be coupled with a fluid flow controller 140. The fluid flow controller 140 can be coupled with a first nozzle line 141, a second nozzle line 142, a first ODS line 143, and a second ODS line 144. In some embodiments, the first and the second nozzle lines 141, 142 are coupled with a nozzle 160, and the first and the second ODS lines 143, 144 are coupled with an ODS 180. In some embodiments, the ODS comprises a thermocouple 182, which can be coupled with the heater control valve 130, and an igniter line 184, which can be coupled with an igniter switch 186. Each of the pipes 125, 124, and 126 and the lines 141-144 can define a fluid passageway or flow channel through which a fluid can move or flow.

In some embodiments, including the illustrated embodiment, the heater 100 comprises a burner 190. The ODS 180 can be mounted to the burner 190, as shown. The nozzle 160 can be positioned to discharge a fluid, which may be a gas, liquid, or combination thereof into the burner 190. For purposes of brevity, recitation of the term "gas or liquid" hereafter shall also include the possibility of a combination of a gas and a liquid. In addition, as used herein, the term "fluid" is a broad term used in its ordinary sense, and includes materials or substances capable of fluid flow, such as gases, liquids, and combinations thereof.

Where the heater 100 is a dual fuel heater, either a first or a second fluid is introduced into the heater 100 through the regulator 120. Still referring to FIG. 4, the first or the second fluid proceeds from the regulator 120 through the source line 125 to the heater control valve 130. The heater control valve 130 can permit a portion of the first or the second fluid to flow into the fuel supply pipe 124 and permit another portion of the first or the second fluid to flow into the ODS pipe 126. From the heater control valve 130, the first or the second fluid can proceed to the fluid flow controller 140. In many embodiments, the fluid flow controller 140 is configured to channel the respective portions of the first fluid from the fuel supply pipe 124 to the first nozzle line 141 and from the ODS pipe 126 to the first ODS line 143 when the fluid flow controller 140 is in a first state, and is configured to channel the respective portions of the second fluid from the fuel supply pipe 124 to the second nozzle line 142 and from the ODS pipe 126 to the second ODS line 144 when the fluid flow controller 140 is in a second state.

In certain embodiments, when the fluid flow controller 140 is in the first state, a portion of the first fluid proceeds through the first nozzle line 141, through the nozzle 160 and is delivered to the burner 190, and a portion of the first fluid proceeds through the first ODS line 143 to the ODS 180. Similarly, when the fluid flow controller 140 is in the second state, a portion of the second fluid proceeds through the nozzle 160 and another portion proceeds to the ODS 180. Other configurations are also possible. The heater 100 and components thereof can be further understood with reference to U.S. patent application Ser. No. 11/443,484, filed May 30, 2006, now U.S. Pat. No. 7,607,426, the entire contents of which are hereby incorporated by reference herein and made a part of this specification.

Figure 6:
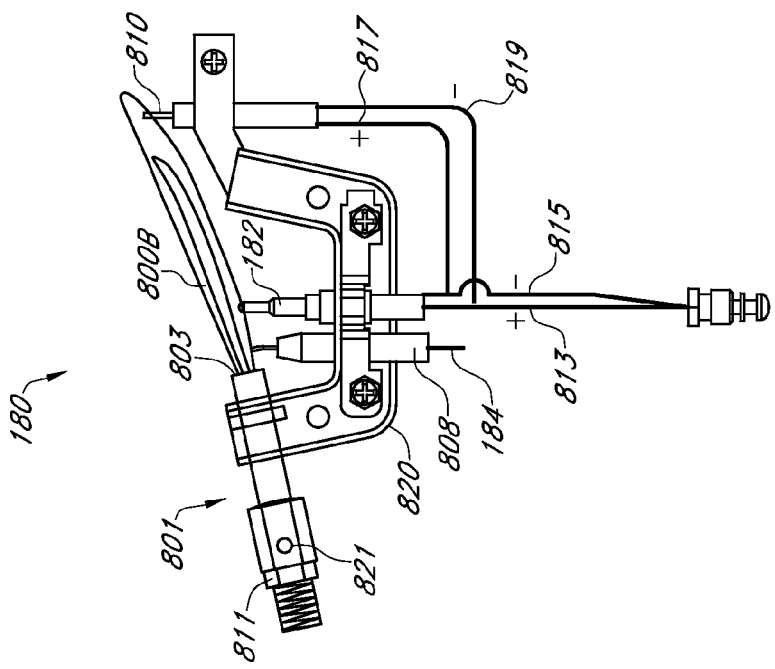
FIGS. 5 and 6 show a pilot assembly in use with a first fuel and a second fuel respectively.
Figure 5:
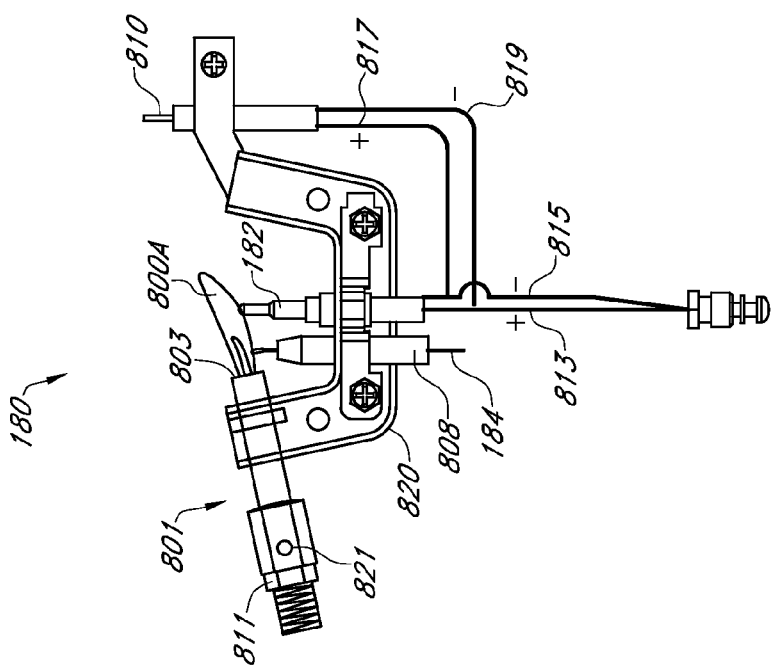

With reference now to FIGS. 5-6, a pilot assembly 180 will now be discussed. The pilot assembly 180 can be used in conjunction with either of the heaters 10, 100 discussed above, as well as, with other embodiments of heating devices. Fuel delivered to the pilot 180 can be combusted to form a pilot light or flame 800. When the pilot light 800 heats the thermocouple 182 a current is generated in the thermocouple. This current is used in some heaters to generate a magnetic field within the control valve 130 to maintain the valve 130 in an open position.

In operation, the pilot assembly generally first needs to be proved before fuel can flow to the burner nozzle 160 and then on to the burner 190. Proving the pilot is generally the initial step in turning on the heater. As has been discussed, the pilot 180 has a thermocouple 182 that generates an electric current when heated to hold open the control valve 130. If the thermocouple is not hot enough there won't be enough current generated to keep the control valve open. Generally speaking, when the control valve is in a pilot position, the control valve is also being held in an open position to allow flow to the pilot 180, but not to the burner nozzle 160. When the control valve is moved from the pilot position to a heating position, the control valve is no longer held open but requires the electric current from the thermocouple to hold the valve open. Thus, if there is not yet enough heat and the control valve were adjusted from the pilot position to the heating position, i.e. by turning the knob 132, the control valve will close and fuel will not be able to flow to the burner. And in fact, most control valves will not allow the user to rotate the knob, or change the position of the control to a heating condition, until after the pilot has been proven.

Once lit, if the pilot light 800 goes out or is disturbed, and the current flow is reduced or terminated, the magnetic field weakens or is eliminated, and the valve 130 closes, thereby preventing further flow of fuel. So with the control valve in a heating position, the pilot ensures that if the flame goes out, uncombusted fuel will not continue to flow into the room or space where the heating assembly is located. In this way the pilot can prevent a potential safety hazard, such as an explosion.

If the pilot assembly is also an oxygen depletion sensor (ODS) 180, then the ODS can cause the control valve 130 to close when the oxygen level drops below a certain threshold. For example, the threshold oxygen level can be between about 18 percent and about 18.5 percent. As the oxygen level changes the pilot light 800 moves with respect to the thermocouple 182. When the oxygen level drops below the threshold level, the pilot flame 800 moves away from the thermocouple 182, the thermocouple 182 cools, and the control valve 130 closes, thereby cutting off the fuel supply to the heater 10, 100.

The illustrated pilot assembly 180 can also be used to shut off flow through the control valve 130 when an excessive heat threshold or other condition is met. For example, if the wrong fuel is connected to the heater 10, 100 depending on the fuel, a large flame 800B such as that shown in FIG. 6 may be produced. It will be understood that this wrong fuel could also provide an undesirably large flame at the burner 190 creating a potential safety hazard.

The pilot assembly 180 can be configured to prevent the heater 10, 100 from starting if the wrong fuel is connected to the heater, or if an excessive temperature condition is experienced at the pilot 180. In some embodiments, a temperature sensor, such as second thermocouple 810 can be used to detect an excessive temperature condition and/or the connection of the wrong fuel. A signal can be sent to the control valve 130 or to a printed circuit board, or the signal from the first thermocouple 182 can be interrupted, to thereby close the control valve or to activate some other shut off feature. In some embodiments, this can be done before fuel is permitted to flow to the burner nozzle 160, or before the pilot has been fully proven. For example, the heating assembly can be configured to detect an undesired condition while the pilot is being proven and before the fuel can flow to the burner nozzle 160. This can beneficially prevent a potential safety hazard.

As one example, if the heater is a natural gas heater the pilot assembly can be configured for use with natural gas. The pilot flame 800A shown in FIG. 5 can represent the normal flame size when the pilot assembly is used with natural gas. As can be seen, the thermocouple 182 is not only adjacent the flame 800A but is actually within and surrounded by it. In this condition, the flame 800A would heat thermocouple 182 to generate an electric current to hold open the control valve 130. But, it can also be seen that the flame 800A is spaced away from the second thermocouple 810. In this condition the flame 800A would not provide sufficient heating to the second thermocouple to exceed the set threshold.

Thus, in this condition, the first thermocouple 182 can be heated sufficiently to prove the pilot, thereafter allowing flow to the burner nozzle when the heater is changed from the pilot position to a heating position. But the second thermocouple is not heated sufficient to generate a closing signal to the control valve, or to interrupt the current from the first thermocouple 182. The first thermocouple can be spaced a first distance from the nozzle. The second thermocouple can be spaced a second distance from the nozzle. Preferably, the second distance is greater than the first distance, but in some embodiments the distances may be the same, of the second distance may be less than the first distance.

In FIG. 6 it can be seen that large flame 800B contacts and surrounds both the first and second thermocouples 182, 810. Where the pilot assembly 180 is configured for use with natural gas, this can be the condition when liquid propane is passed into the pilot assembly. The sensed temperature at the second thermocouple can exceed the set threshold to cause the control valve to close as will be described in more detail below.

As shown, the pilot assembly 180 comprises a first thermocouple 182, a nozzle 801, and an electrode 808, and a second thermocouple 810. It will be understood that other temperature sensors and devices could be used instead of, or in addition to, one or both of the thermocouples, such as a thermopile. The pilot assembly 180 can include a frame 820 for positioning the constituent parts of the pilot assembly. The nozzle 801 can include an injector 811 to be coupled with the line 143 (see FIGS. 1-4), an air inlet 821, and an outlet 803.

In many embodiments, the injector is a standard injector as are known in the art, such as an injector that can be utilized with liquid propane or natural gas. Thus, the injector can have an internal orifice sized for a particular fuel. The nozzle 801 is directed towards the electrode 808 to ignite the fuel and towards the thermocouple 182 such that a stable flame 800A exiting the nozzle 801 will heat the thermocouple 182.

A gas or a liquid can flow from the line 143 through the injector 811 to the outlet 803 and toward the thermocouple 182. The fluid flows near the air inlet 821 drawing in air for mixing with the fluid. In some embodiments, a user can activate the electrode by depressing the igniter switch 186 (see FIGS. 2 and 4). The electrode can comprise any suitable device for creating a spark to ignite a combustible fuel. In some embodiments, the electrode is a piezoelectric igniter.

Figure 7:
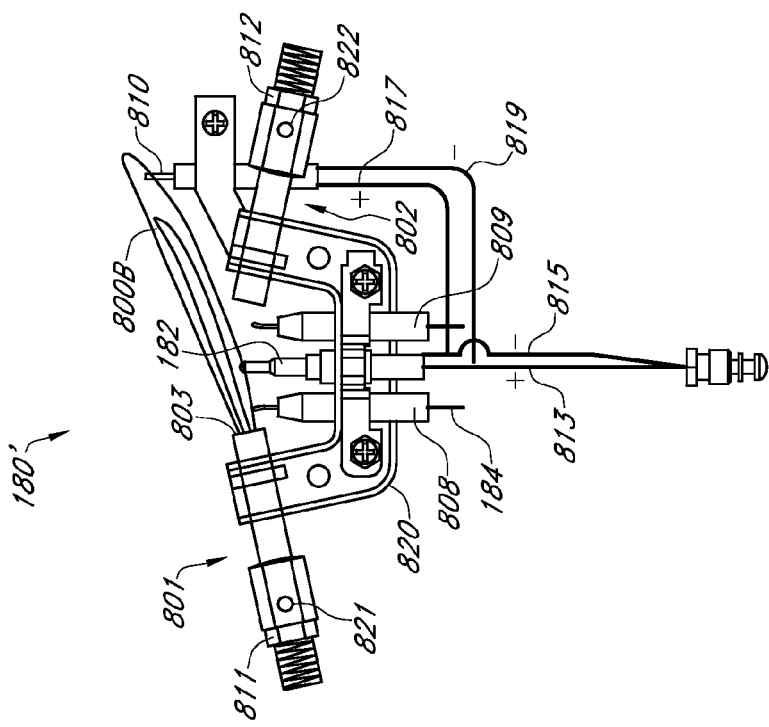
FIGS. 7 and 8 show a dual fuel pilot assembly in use with a first fuel and a second fuel respectively.
Figure 8:
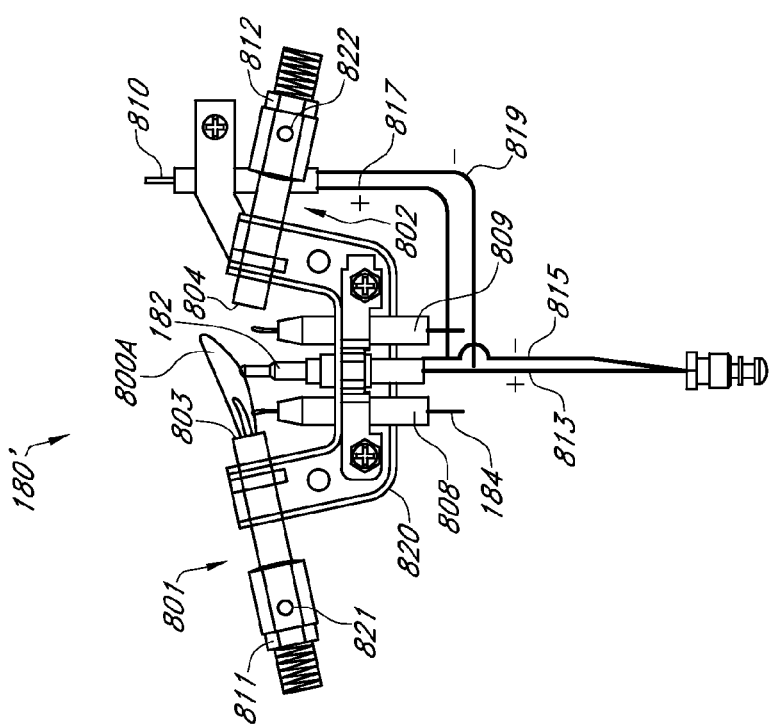

With reference now to FIGS. 7-8, a dual fuel pilot assembly 180' will be discussed. As previously mentioned, the pilot assembly 180' can also be an oxygen depletion sensor. The pilot assembly 180' can function is a manner substantially similar to the pilot assembly 180. The primary difference being that the dual fuel pilot assembly 180' has a second nozzle 802. The first nozzle 801 can be configured for use with a first fuel, such as natural gas, and the second nozzle 802 can be configured for use with a second fuel, such as liquid propane. As shown, the pilot assembly 180' also includes a second electrode 809. It will be understood that some embodiments may only have a single electrode.

Similar to the first nozzle, the second nozzle can include an injector 812, an air inlet 822, and an outlet 804. In some embodiments, the first nozzle 801 and the second nozzle 802 are directed toward the thermocouple such that a stable flame exiting either of the nozzles 801, 802 will heat the thermocouple 182. In certain embodiments, the first nozzle 801 and the second nozzle 802 are directed to different sides of the thermocouple 182. In some embodiments, the first nozzle 801 and the second nozzle 802 are directed to opposite sides of the thermocouple 182. In some embodiments, the first nozzle 801 is spaced closer to the thermocouple than is the second nozzle 802.

In some embodiments, the first nozzle 801 comprises a first air inlet 821 at a base thereof and the second nozzle 802 comprises a second air inlet 822 at a base thereof. In various embodiments, the first air inlet 821 is larger or smaller than the second air inlet 822. In many embodiments, the first and second injectors 811, 812 are also located at a base of the nozzles 801, 802. In certain embodiments, a gas or a liquid flows from the first line 143 through the first injector 811, through the first nozzle 801, and toward the thermocouple 182. In other embodiments, a gas or a liquid flows from the second line 144 through the second injector 812, through the second nozzle 802, and toward the thermocouple 182. In either case, the fluid flows near the first or second air inlets 821, 822, thus drawing in air for mixing with the fluid. In certain embodiments, the first injector 811 introduces a fluid into the first nozzle 801 at a first flow rate, and the second injector 812 introduces a fluid into the second nozzle 802 at a second flow rate. In various embodiments, the first flow rate is greater than or less than the second flow rate.

In some embodiments, the first electrode 808 is positioned at an approximately equal distance from an output end of the first nozzle 801 and an output end of the second nozzle 802. In some embodiments, a single electrode is used to ignite fuel exiting either the first nozzle 801 or the second nozzle 802. In other embodiments, a first electrode 808 is positioned closer to the first nozzle 801 than to the second nozzle 802 and the second electrode 809 is positioned nearer to the second nozzle 802 than to the first nozzle 801.

With reference back to any of FIGS. 5-8, certain embodiments of an electrical control system will be described. As shown in FIGS. 5-8 the thermocouples are electrically connected. Wires 813 and 815 are connected to the first thermocouple 182 and wires 817 and 819 are connected to the second thermocouple. The wires 813 and 817 represent the positive wire connected to the anode of the thermocouple and wires 815 and 819 represent the negative wire connected to the cathode of the thermocouple. It can be seen that the second thermocouple is electrically connected to the first thermocouple with opposite wires or in reverse polarity. In other words, the positive wire 813 of the first thermocouple 182 is connected to the negative wire 819 of the second thermocouple 810. Also the negative wire 815 of the first thermocouple 182 is connected to the positive wire 817 of the second thermocouple 810. In this way, when the second thermocouple is heated, the current from the first thermocouple can be effectively cancelled out or interrupted by generating a current that flows in the opposite direction. Thus, when the wrong fuel is connected to the heater, or to the wrong connection of the heater, the second thermocouple can detect the excessive temperature and prevent the pilot from proving.

In some embodiments, a pilot can comprise a first thermocouple, a second thermocouple and a nozzle pointing at both thermocouples. The pilot can be configured to direct a flame at only the first thermocouple during normal operation and at both thermocouples when an incorrect fuel is directed through the pilot. In some embodiments, the thermocouples can be electrically connected in reverse polarity. In some embodiments, the pilot can include a second nozzle. The second nozzle can be pointed at only the first thermocouple. In other embodiments, the second nozzle can be pointed at a third thermocouple and the position of the second nozzle and third thermocouple can be independent from the position of the other nozzle and thermocouples.

Figure 9:
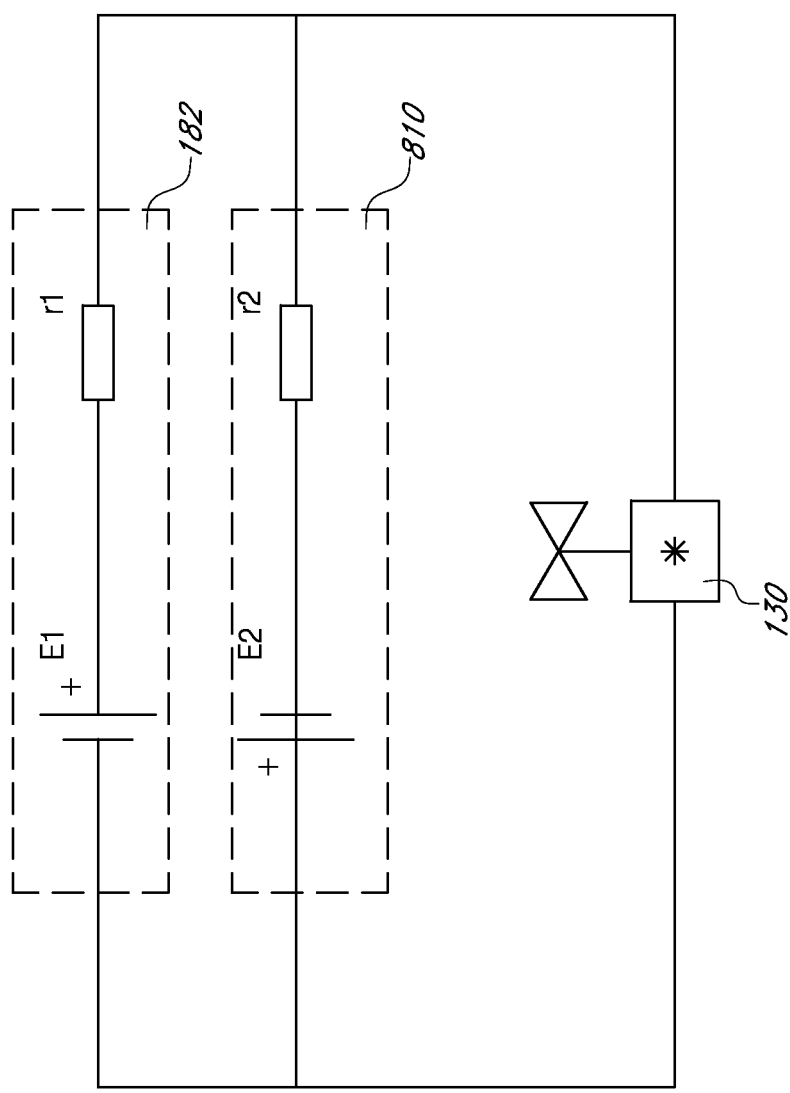
FIG. 9 schematically represents an electric circuit between the control valve and two thermocouples.

Looking now to FIG. 9, a schematic diagram is shown of the control valve 130 and the two thermocouples 182 and 810. The illustrated control valve 130 includes a solenoid that can hold the valve in an open position when an electric current is generated by the first thermocouple 182.

The first thermocouple can generate an electric potential E1 and has an internal resistance r1. The second thermocouple can generate an electric potential E2 and has an internal resistance r2. The solenoid has an internal resistance R. In the illustrated embodiment, when the correct gas is connected to the heating system, only the first thermocouple generates an electric potential E1. Thus the current I generated equals:

$$I=E1(r1+r2)/(R(r1+r2)+r1r2) \quad (1)$$

And when the wrong gas is connected such that a larger flame 800B is generated, the current 1 equals:

$$I=((E1-E2)(r1+r2))/(R(r1+r2)+r1r2) \quad (2)$$

The second thermocouple generates a reverse potential which can cause the potential to drop. This will reduce the current and in some embodiments may effectively cancel out the potential from the first thermocouple. The solenoid needs a rated current to operate, but as the second thermocouple causes a potential drop the solenoid can close. This can prevent a potential safety issue and/or the wrong fuel from flowing through the system.

A thermocouple can include one or more an anode and a cathode. The anode can be the negative terminal on the thermocouple and the cathode can be the positive terminal.

A safety pilot can comprise a first pilot nozzle having an outlet, a first thermocouple and a second thermocouple. The first thermocouple can be positioned a first distance from said outlet of said first pilot nozzle, said first thermocouple comprising a first anode and a first cathode and configured to generate voltage in response to heat from said first pilot nozzle. The second thermocouple can be positioned a second distance from said outlet of said first pilot nozzle, said second thermocouple comprising a second anode and a second cathode and configured to generate voltage in response to heat from said first pilot nozzle.

In some embodiments, the thermocouples can be electrically connected in reverse polarity. The second cathode can be in electrical contact with the first anode, and the second anode can be in electrical contact with the first cathode. In some embodiments, a wire leading from the positive terminal of the first thermocouple can be connected to the negative terminal of the second thermocouple. And a wire leading from the negative terminal of the first thermocouple can be connected to the positive terminal of the second thermocouple. A single set of wires may then be used to connect the pilot to a control valve or other electrically responsive valve.

With the thermocouples electrically connected in reverse polarity and when heated by the pilot, two separate currents can be generated which can have the effect of reducing the generated current and/or effectively cancelling each other out as has been explained above. But, when only one thermocouple is heated by the pilot, a usable current can be generated.

In some embodiments, the cathode of the first thermocouple is in electrical contact with the anode of the second thermocouple and the anode of the first thermocouple is in electrical contact with the cathode of the second thermocouple. Thus, when a single thermocouple is heated in response to heat from said the pilot nozzle a first current is generated by the safety pilot and when both the first and the second thermocouples are heated in response to heat from the pilot nozzle, two currents are generated which combine to generate a second current that is less than the first current.

A heating assembly can include a pilot and an electrically responsive valve in electrical communication with a first thermocouple and a second thermocouple of the pilot. The electrically responsive valve can direct fuel flow to a burner through a burner nozzle. (1) The valve can maintain a closed position when an insufficient signal is generated by the first thermocouple and no significant signal is generated by the second thermocouple. (2) The valve can maintain an open position in response to a first signal level from said first thermocouple when no or insufficient signal is generated by said second thermocouple. (3) The valve can close in response to the first signal level from the first thermocouple and a sufficient signal level from the second thermocouple or from simply a sufficient signal level from the second thermocouple. If the electrically responsive valve is a control valve that directs fuel to both the burner and the pilot, it will be understood, that the electrically responsive valve may also direct fuel to the pilot light apart from the actions of the valve controlling the flow of fuel to the burner and the burner nozzle.

Many different types of temperature sensors can be used to detect an excessive temperature condition and/or the connection of the wrong fuel. For example, in many embodiments a thermopile could be used in place of one or more of the thermocouples discussed herein. The signal generated could be sent to the control valve 130, but could also be sent to a printed circuit board. In addition, one or more shut off features can be included in the system instead of, or in addition to the control valve.

Figure 10:
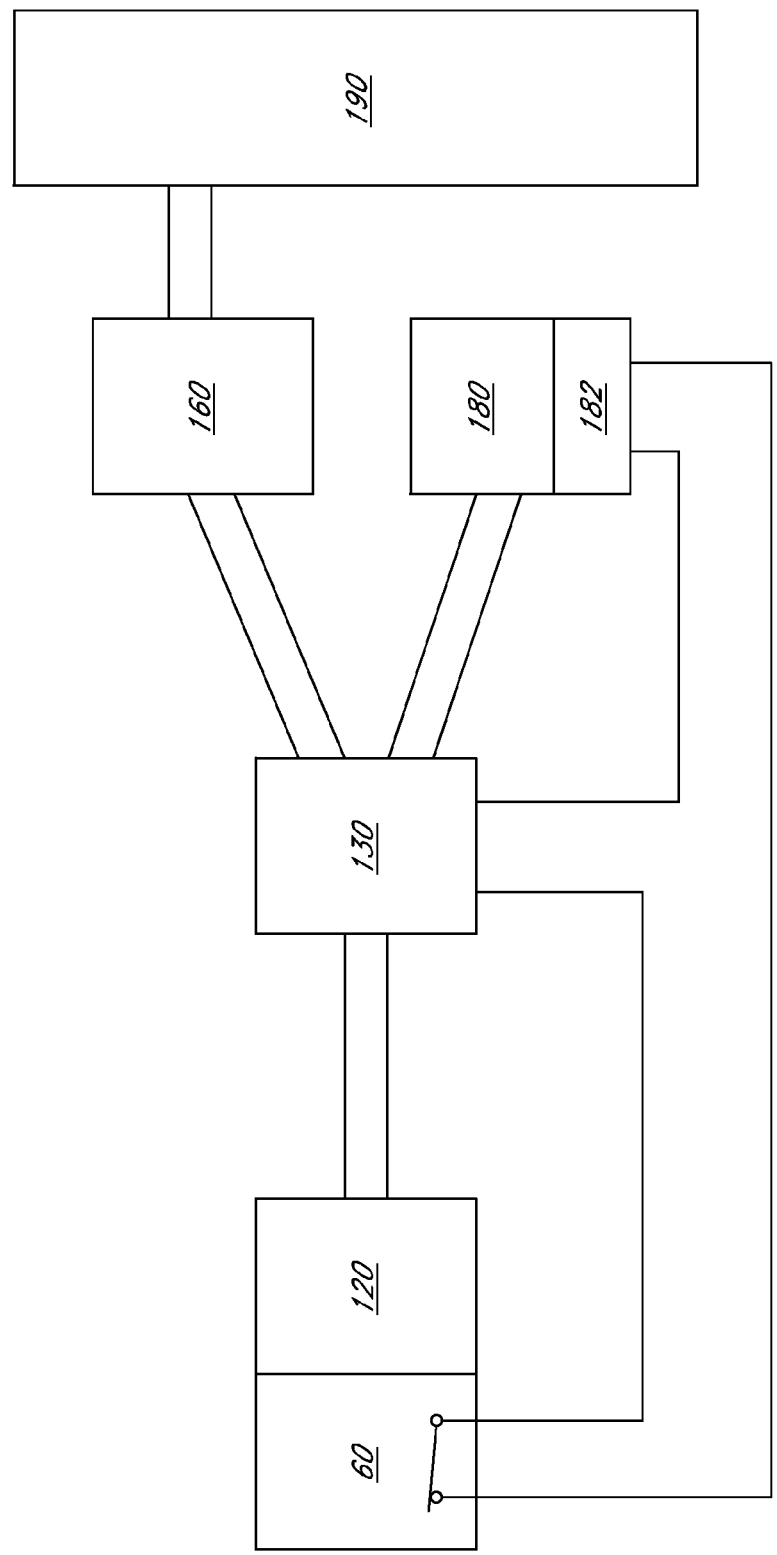
FIG. 10 is a schematic representation of another embodiment of heating system.

FIG. 10 is a schematic representation of another embodiment of heating system. In the illustrated heating system basic components of the heating system are shown including a regulator 120, a control valve 130, a nozzle assembly 160, a burner 190, and a pilot assembly 180. The heating system and components can function in a similar manner to those previously described and can be a single fuel or a dual fuel system. Thus, for example fuel can flow from the regulator 120 to the control valve. The control valve 130 can provide fuel to both the nozzle assembly 160 and to the pilot assembly 180. The nozzle assembly 160 can direct fuel to the burner.

The heating system of FIG. 10 also includes a safety feature to prevent the heating system from starting if the wrong fuel is connected to the heating system under certain circumstances. In some embodiments, a pressure sensor 60 can be used to detect an incorrect fluid pressure entering the system. The incorrect fluid pressure can be indicative of a wrong type of fuel connected to the heating system. In some embodiments, a signal from the pressure switch 60 can be sent to the control valve 130, or the signal from the thermocouple 182 can be interrupted, to thereby close the control valve. In some embodiments, this can be done before fuel is permitted to flow to the burner nozzle 160, or before the pilot has been fully proven. For example, the heating assembly can be configured to detect an undesired condition while the pilot is being proven and before the fuel can flow to the burner nozzle 160. This can beneficially prevent a potential safety hazard.

Figure 11:
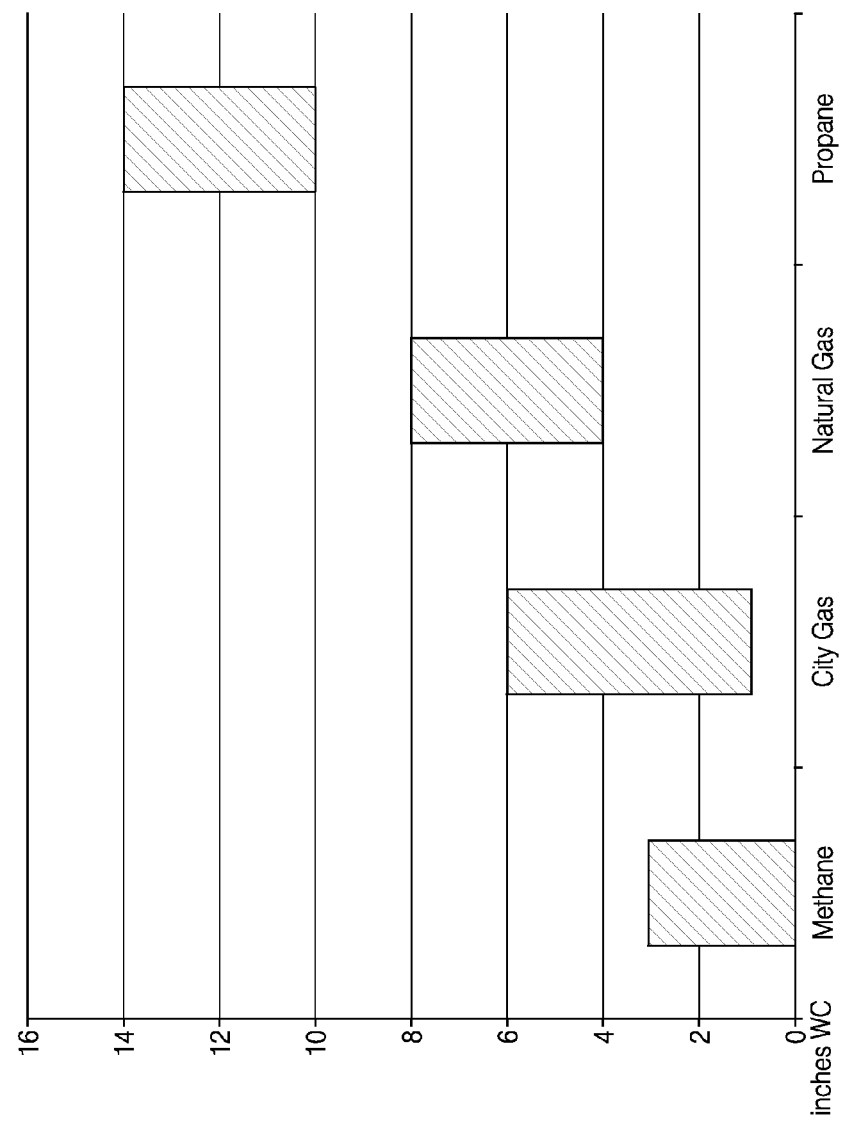
FIG. 11 is a chart showing typical gas pressures of different fuels.

Different fuels are generally run at different pressures. FIG. 11 shows four different fuels: methane, city gas, natural gas and liquid propane; and a typical pressure range of each particular fuel. The typical pressure range can mean the typical pressure range of the fuel as provided by a container, a gas main, a gas pipe, etc. for consumer use, such as the gas provided to an appliance. Thus, natural gas is generally provided to a home gas oven within the range of 4 to 7 inches of water column. The natural gas can be provided to the oven through piping connected to a gas main. As another example, propane may be provided to a barbeque grill from a propane tank with the range of 10 to 14 inches of water column. The delivery pressure of any fuel may be further regulated to provide a more certain pressure range or may be unregulated. For example, the barbeque grill may have a pressure regulator so that the fuel is delivered to the burner within the range of 10 to 12 inches of water column rather than within the range of 10 to 14 inches of water column.

As shown in the chart, city gas can be a combination of one or more different gases. As an example, city gas can be the gas typically provided to houses and apartments in China, and certain other countries. At times, and from certain sources, the combination of gases in city gas can be different at any one given instant as compared to the next.

Because each fuel has a typical range of pressures that it is delivered at, these ranges can advantageously be used in a heating assembly to ensure that the proper gas is connected to the proper inlet. In particular, a pressure sensor can be used to determine the pressure of the gas before, or as it enters the regulator. If the pressure is not within the typical range or is greatly outside of the typical range of the desired fuel, the control valve can be triggered to close, preventing the incorrect fuel from flowing to the burner nozzle 160 and to the burner 190. In some embodiments, the pressure sensor could be set to a threshold pressure level above the typical pressure range, for example, about 0.5, 1, 1.5 or 2 inches of water column above or below the typical pressure range. In a preferred embodiment, the pressure sensor is set at a threshold level above the typical pressure range.

One embodiment of such a system is represented in FIG. 10. A pressure switch 60 can be fluidly connected to an inlet on or in fluid communication with the pressure regulator 120. The pressure switch 60 can be electrically connected to one or more of the control valve 130, the pilot assembly 180, and the igniter. As shown, the pressure switch 60 is electrically connected to both the control valve 130 and the pilot assembly 180. The pressure switch 60 can be a normally closed switch and can be electrically positioned between the thermocouple 182 and the control valve 180. Thus, if the pressure switch is opened the circuit between the thermocouple and the control valve will be opened and current from the thermocouple will be prevented from reaching the control valve as the circuit will be an open circuit. Other configurations of the system can also be used.

Figure 10A:
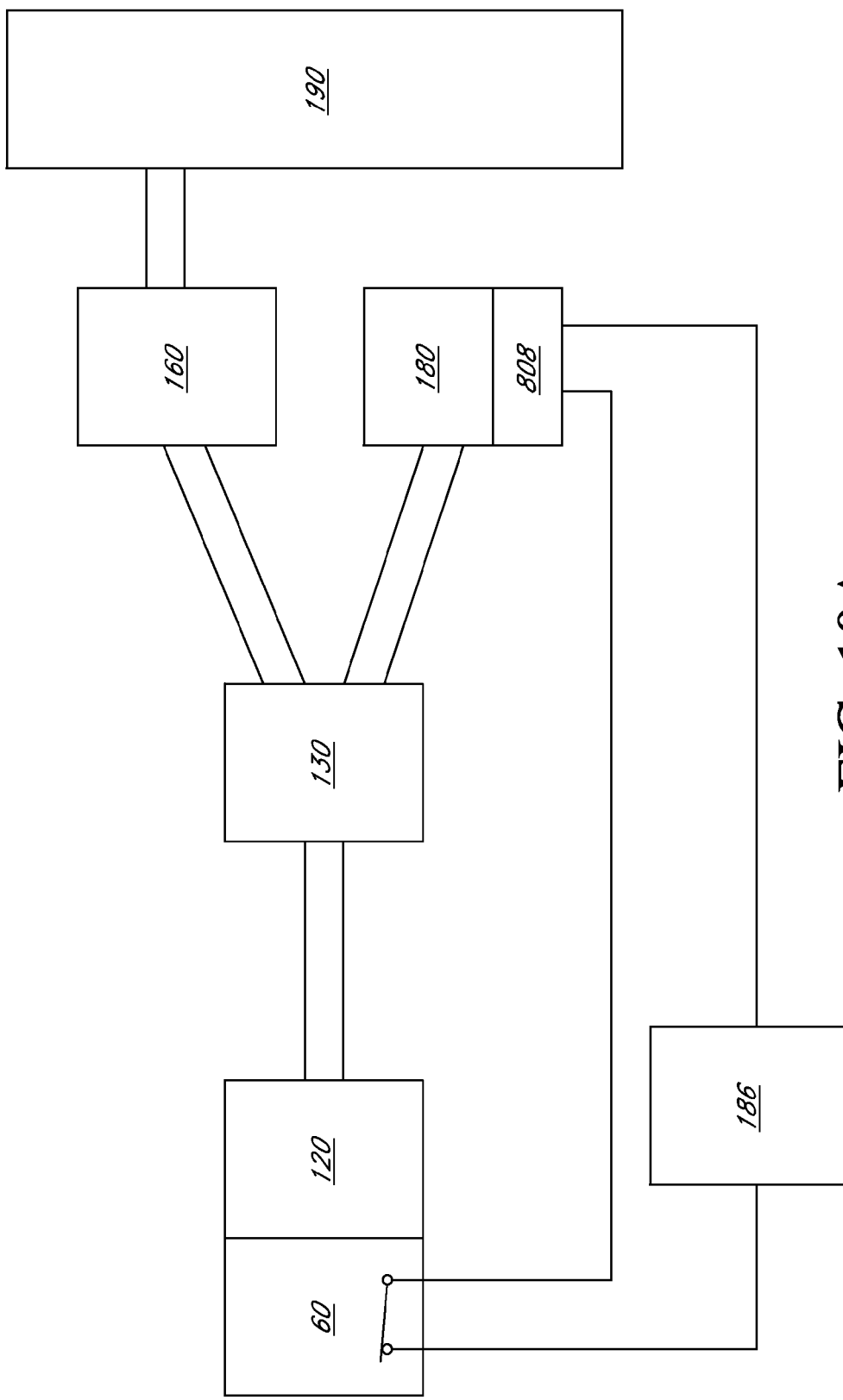
FIG. 10A is a schematic representation of another embodiment of heating system.

In another embodiment as shown in FIG. 10A, the pressure switch 60 can be electrically connected to the igniter 808. The pressure switch 60 can be a normally closed switch and can be electrically positioned between the switch 186 for the igniter and the igniter 808 itself, such as a piezoelectric igniter. Thus, if the pressure switch is opened the circuit between the igniter switch and the igniter will be opened and current from the igniter switch will be prevented from reaching the igniter as the circuit will be an open circuit. Thus, if the pressure is too high, which may indicate the wrong fuel is connected to the heater, the pilot assembly 180 cannot be ignited with the igniter 808.

In some embodiment, two pressure switches can be used per inlet. One pressure switch can be set at a low level below the typical pressure range for the desired fuel and the other can be set at a high level above the typical pressure range for the desired fuel. The pressure regulator can be set based on the desired fuel. Thus, if the heating assembly is a dual fuel heating assembly, the heating assembly may have two inlets and four pressure switches, two on each inlet. Similarly, if the heating assembly is a single fuel heating assembly, the heating assembly may have one inlet and one or two pressure switches. In another embodiment, the heating assembly can be a dual fuel heating assembly with a single inlet and it may include one or more pressure switches.

In another embodiment, a dual fuel heating assembly can have two inlets and only one pressure switch. The pressure switch can be connected to the inlet for the lower pressure fuel and can be set at a level above the typical pressure range for that fuel. In this way, the heating assembly can prevent the higher pressure fuel from being connected to the inlet for the lower pressure fuel. As an example, the pressure switch 60 can be used with a natural gas inlet and set to 7.5 inches of water column. The second inlet can be used with liquid propane which is delivered at a higher pressure than natural gas. Propane would also produce a higher flame if introduced through into the system that has been set for natural gas. Thus, the pressure switch can beneficially prevent a safety hazard from occurring.

Figure 12:
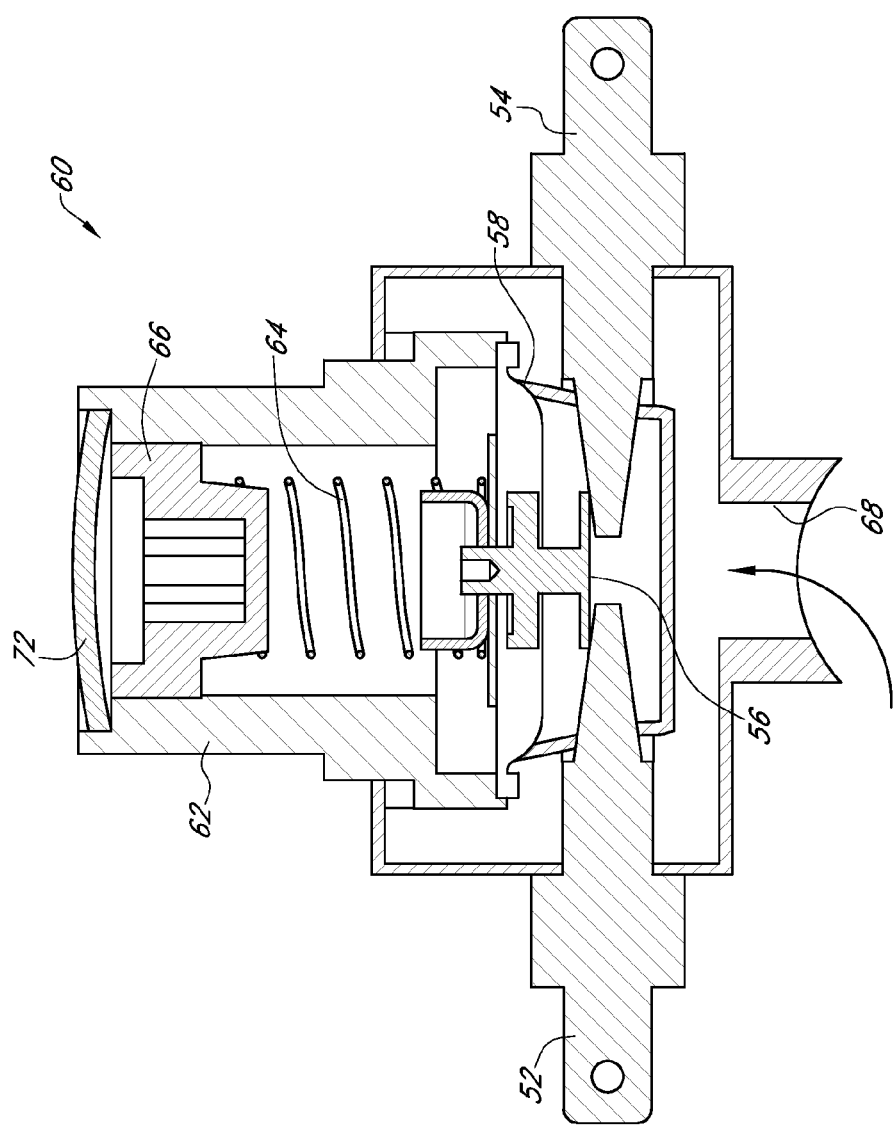
FIG. 12 shows a cross-sectional view of a pressure switch.

FIG. 12 shows a cross-sectional view of one embodiment of a pressure switch 60. The pressure switch 60 has a housing 62 having an inlet 68 to receive fluid as indicated by the arrow and to be able to respond to certain pressures. As shown, the pressure switch 60 is a normally closed pressure switch. The pressure switch 60 can be set to open when a greater than desired pressure encounters a valve member 58, such as the illustrated diaphragm 58. A spring 64 and screw 66 can be used to set and adjust the pressure required to move the diaphragm 58. A cap 72 can cover the screw 66. In addition, a contact member 56 can move with the diaphragm. The contact member 56 can contact two electrical connection members 52, 54 which can be electrically connected to a printed circuit board, the igniter 808, igniter switch 186, the control valve 130 and/or the thermocouple 182, among other features.

As has been discussed previously, under normal operation a flame at the pilot 180 heats the thermocouple 182 to generate a current to maintain the control valve in an open position. The pressure switch 60 can be set to open this circuit and prevent the current from reaching the control valve when the switch 60 has been advanced, if it is a normally closed pressure switch. In another embodiment, the pressure switch 60 can be normally open switch so that the switch will only be closed when a minimum pressure is present at the inlet. The system can operate in a similar manner with an igniter, a printed circuit board, or with other features of the heater assembly.

The pressure switch 60 positioned at the inlet can allow the system to provide a safety check before the pilot has been proven and before fuel begins to follow to the burner nozzle 160 and the burner 190. As the pressure switch can respond immediately based on the delivery pressure of the fuel.

In some embodiments, a pressure switch is configured such that if a fuel is connected to the first gas hook-up that has a delivery pressure either above or below a predetermined threshold pressure, the fuel will act on the pressure switch to move a movable contact member from one of a first or second position to the other position. This will open or close a circuit as the case may be, such that the pilot light cannot be proven to thereby prevent fuel from flowing to the burner.

A pilot light may comprise a thermocouple electrically coupled to one of a first and a second electrical contact of the pressure switch and to the control valve. The heater assembly can be configured so that the movable contact member of the pressure switch is in the second disengaged position when the delivery pressure is above the predetermined threshold pressure to create an open circuit between the thermocouple and the control valve such that the control valve cannot flow fuel to the burner.

In some embodiments, an igniter may be electrically coupled to one of the first and second electrical contacts. The heater assembly can be configured so that the movable contact member of the pressure switch is in the second disengaged position when the delivery pressure is above the predetermined threshold pressure to create an open circuit between the igniter and one of the first and second electrical contacts such that the fuel cannot be ignited.

In some embodiments, a pressure switch can communicate with a fuel hook-up. When the fuel has a pressure below a threshold pressure, the pressure switch can permit a temperature sensor to electrically connect with a control valve. When the fuel is above the threshold pressure, the pressure switch can prevent the temperature sensor from electrically connecting with the control valve.

A pressure switch can comprise a housing having an inlet and defining an internal chamber. The pressure switch can also include a spring, a diaphragm, first and second electrical contacts, and a movable contact member. The diaphragm can be connected to the spring and positioned within the internal chamber such that fluid entering the inlet acts on the diaphragm. The movable contact member can be connected to the diaphragm such that movement of the diaphragm can cause the movable contact member to movably engage and disengage the first and second electrical contacts, the diaphragm and spring configured to the movable contact member between engaged and disengaged positions at a set fluid pressure. In some embodiments, the movable contact member is biased to the engaged position.

Some embodiments of heater assembly can comprise a thermocouple and a pressure switch. The pressure switch can comprise a valve member movable at a predetermined threshold pressure, first and second electrical contacts, and a movable contact member. The movable contact member can be mechanically connected to the valve member and movable therewith. The movable contact member can be configured for electrical connection to the first and second electrical contacts when in a first engaged position and have a second disengaged position configured to create an open circuit. The thermocouple can be electrically coupled to one of the first and second electrical contacts, wherein the heater assembly is configured so that the movable contact member of the pressure switch is in the second disengaged position at a set fluid pressure of fuel in fluid communication with the valve member to create an open circuit with the thermocouple.

Figure 13:
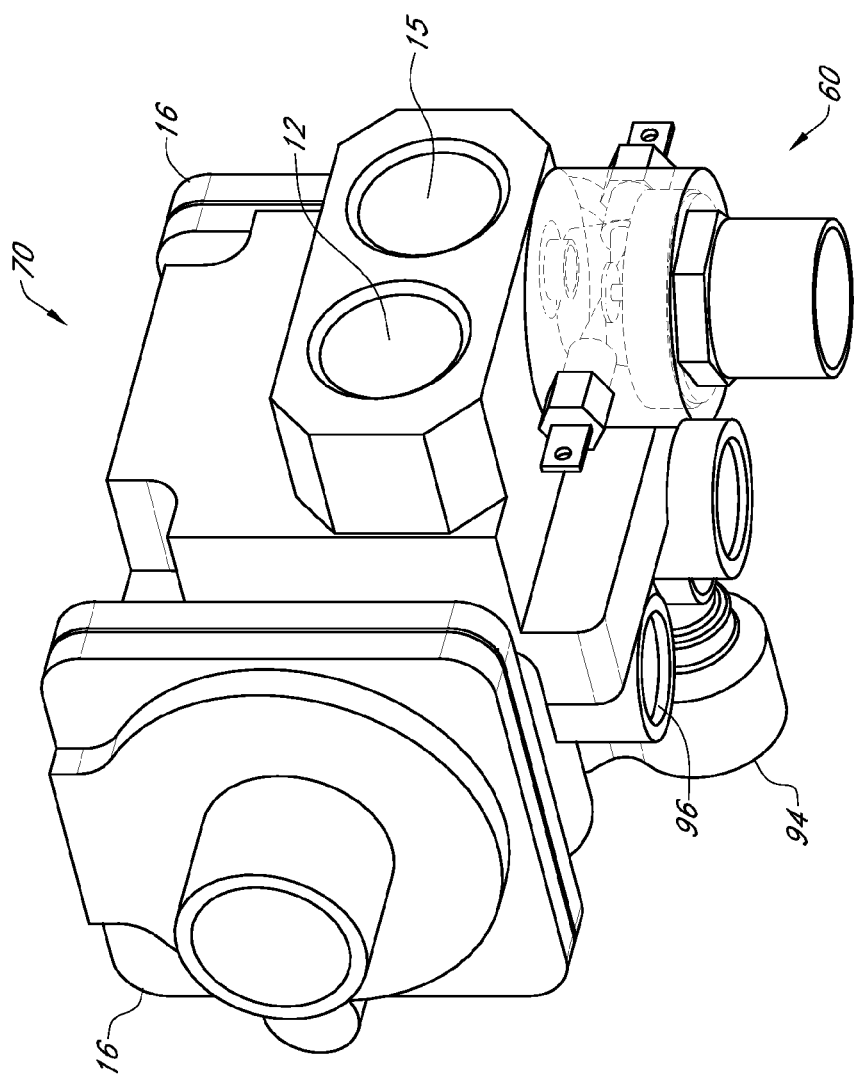
FIG. 13 illustrates a heating unit with a pressure switch.

Turning now to FIG. 13, a heating unit 70 including a pressure switch 60 is shown. The heating unit 70 combines certain features of a pressure regulator 120 and a fluid flow controller 140 for use with a dual fuel heating assembly. The heating unit 70 is functionally similar to the heating units described in U.S. provisional application No. 61/748,071 filed Dec. 31, 2012, the entire contents of which are incorporated by reference herein. For example, in many aspects, the heating unit 70 is similar to that described with reference to FIGS. 22-28 in U.S. provisional application No. 61/748,071.

The heating unit 70 is shown with a pressure switch 60 in fluid communication with one of the inputs 15 of the heating unit 70. The pressure switch 60 can function in a manner as described above.

Figure 14:
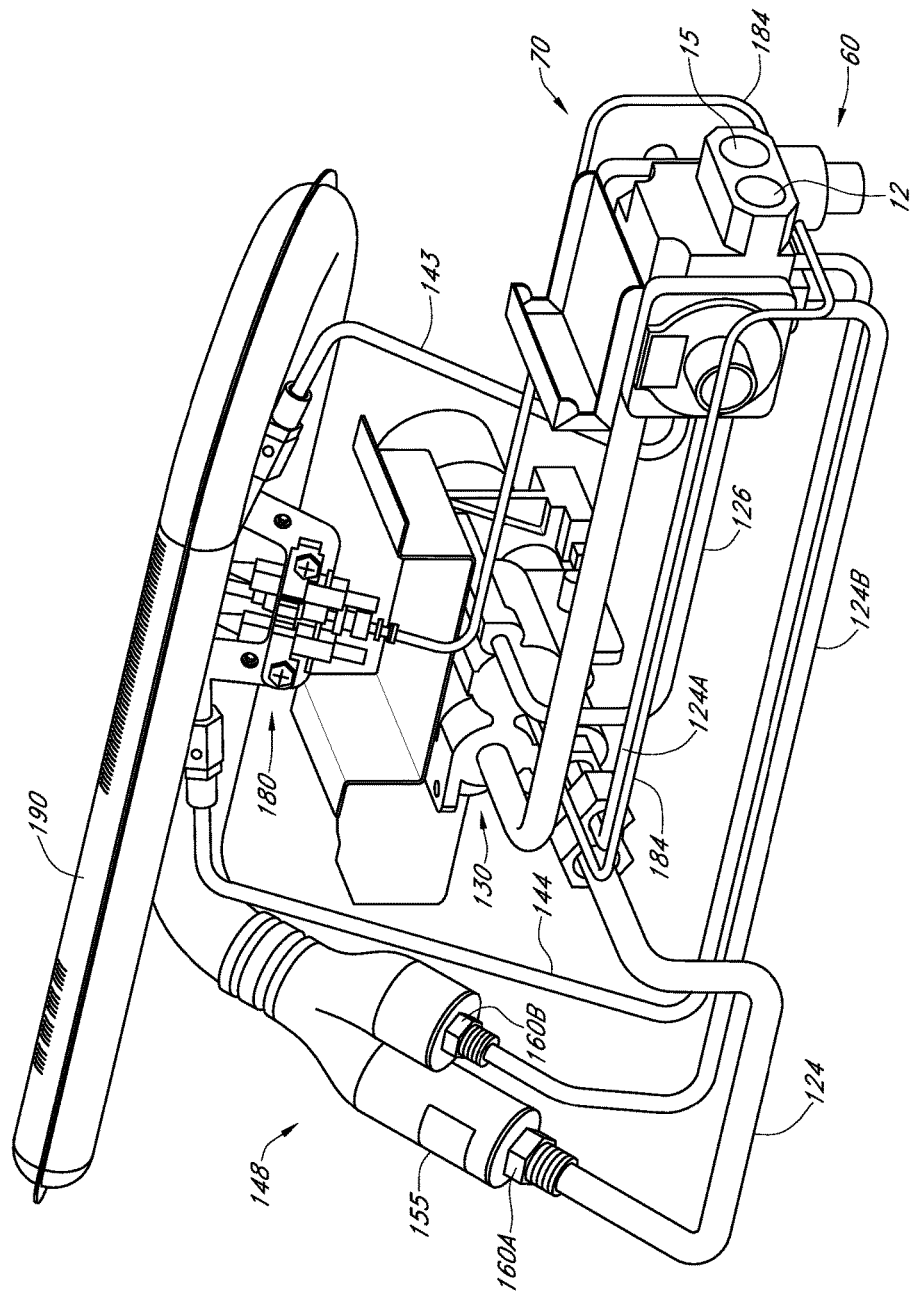
FIG. 14 shows a heater including the heating unit of FIG. 13.
Figure 15:
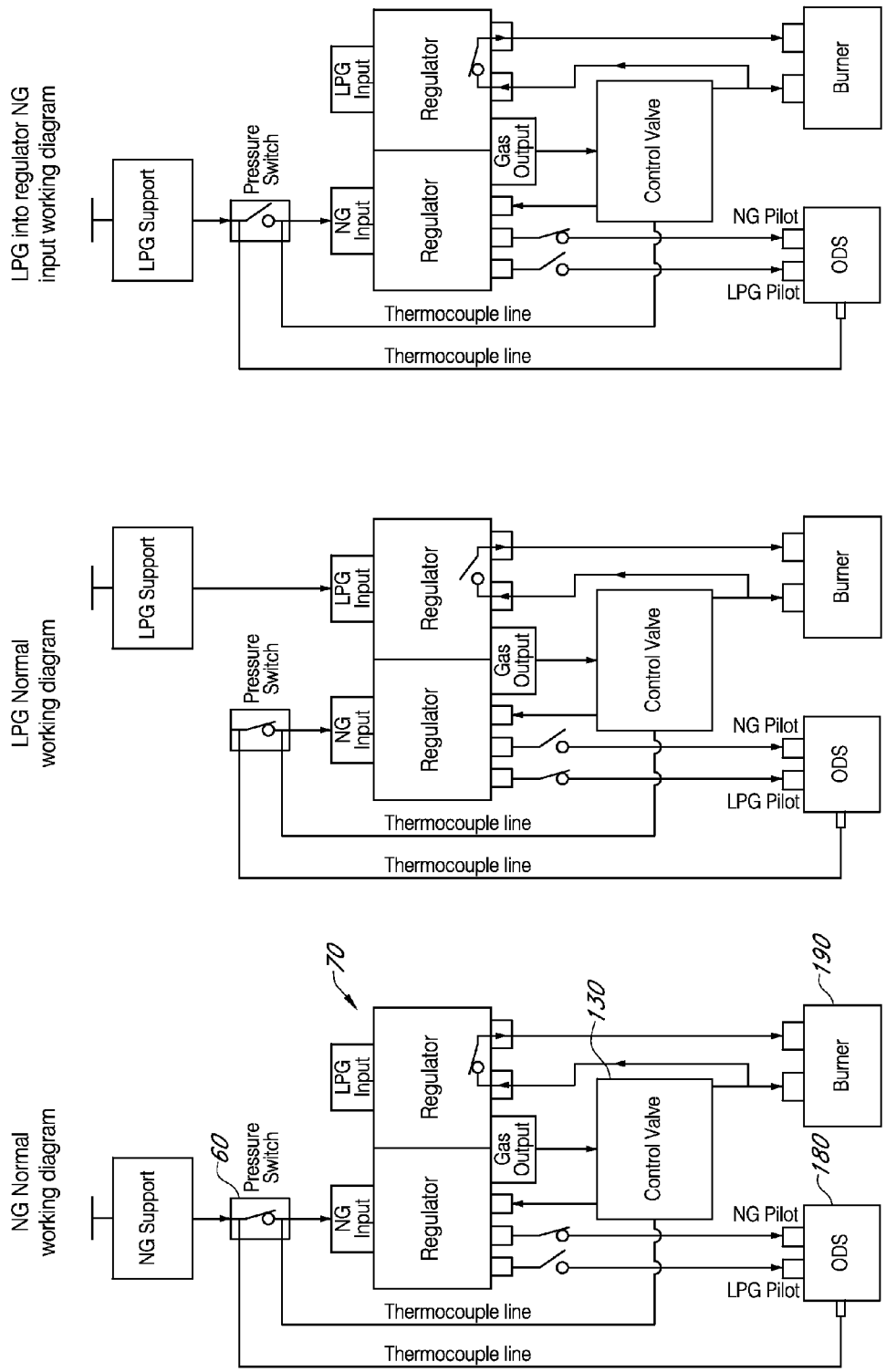
FIG. 15 shows a schematic diagram of the function of the heater of FIG. 14.
Figure 16:
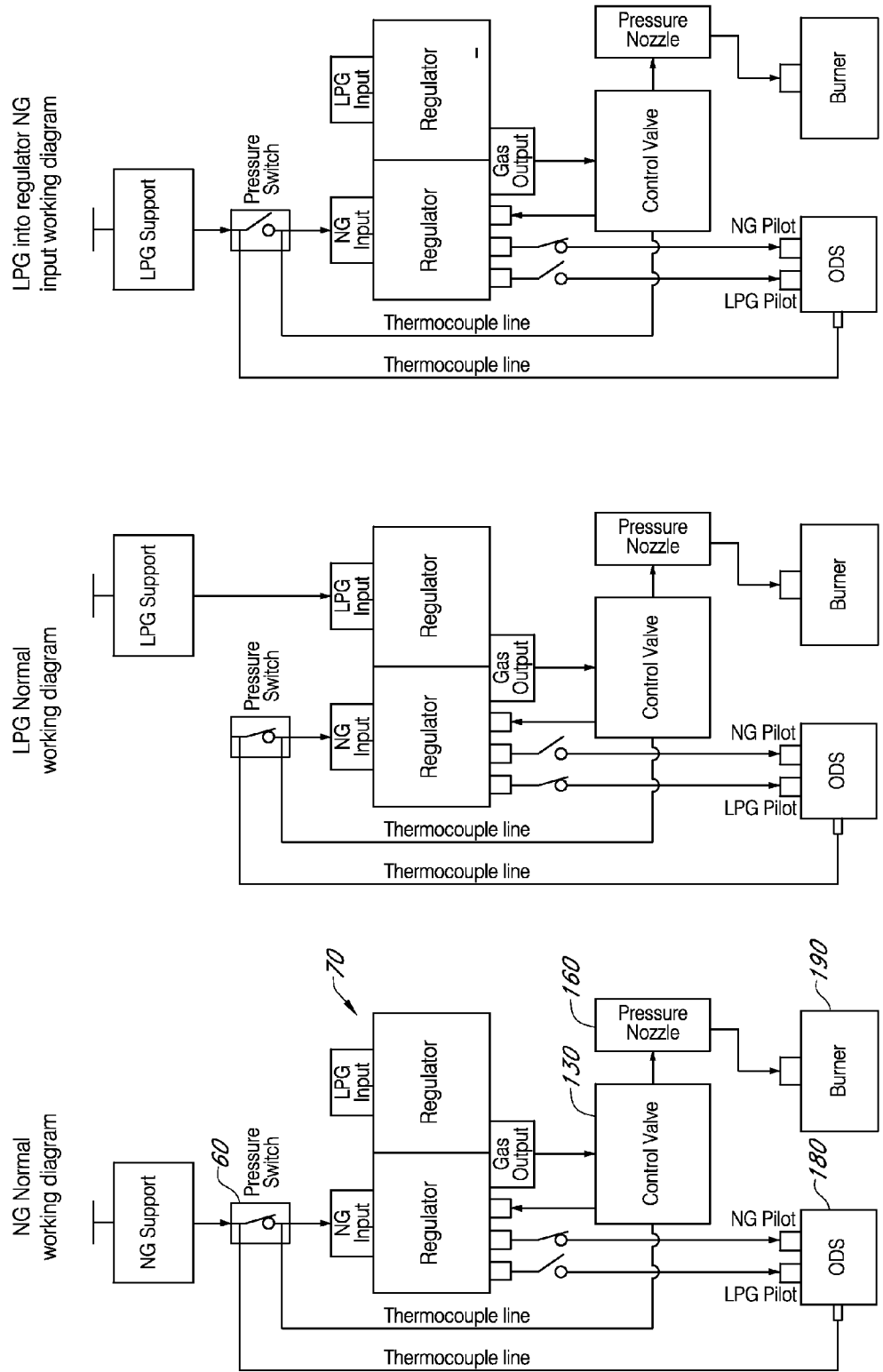
FIG. 16 shows a schematic diagram of the function of another embodiment of heater.

FIG. 14 shows a heater including the heating unit of FIG. 13 having the pressure switch 60. FIG. 15 shows a schematic diagram of the function of the heater of FIG. 14. FIG. 16 shows a schematic diagram of the function of another embodiment of heater that is similar to those described in U.S. provisional application No. 61/748,071 filed Dec. 31, 2012 and incorporated by reference herein.

In some embodiments, the heating unit 70 can be a fuel selector valve. The fuel selector valve 70 can receive a first fuel or a second fuel. In some embodiments, the first fuel may be liquid propane gas (LP). In some embodiments, the second fuel may be natural gas (NG). The fuel selector valve 70 includes a fuel source connection 12 and a fuel source connection 15. The fuel selector valve 70 can receive LP at fuel source connection 12. The fuel selector valve 70 can receive NG at fuel source connection 15.

In some embodiments, the fuel selector valve 70 can direct fuel to a control valve 130. The control valve can include at least one of a manual valve, a thermostat valve, an AC solenoid, a DC solenoid and a flame adjustment motor. The control valve 130 can direct fuel back to the fuel selector valve 70 and/or to one or more nozzle assemblies 160. In some embodiments the one or more nozzle assemblies 160 can be part of the fuel selector valve 70. The nozzle assembly 160 can be similar the various embodiments that described in U.S. patent application Ser. No. 13/310,664 filed Dec. 2, 2011 and published as U.S. 2012/0255536, the entire contents of which are incorporated by reference herein and are to be considered a part of the specification. FIGS. 23-24B, 28A-34B, 39A-44B, and their accompanying descriptions are but some examples of nozzle assemblies from U.S. 2012/0255536.

A window or opening 155 can be positioned at the nozzle assembly 160. An opening 155 can be used to introduce air into the flow of fuel prior to combustion. The amount of air that is needed to be introduced depends on the type of fuel used. For example, propane gas needs more air than natural gas to produce a flame of the same size as will be discussed in more detail below. In some embodiments, the heating assembly can be switched between the different fuels without requiring adjustment of a window or opening for creating the air fuel mixture. Some embodiments can also include an air shutter assembly around the opening 155. An air shutter can be used to adjust the size of the window. This may be done to accommodate for differences in fuel quality and/or pressure. In some embodiments, this adjustment can be done once for the system as a whole, but it may not be required to further adjust the air shutter if the heater assembly is switched between different fuels.

The fuel selector valve 70 can also direct fuel to an oxygen depletion sensor (ODS) 180. In some embodiments, the fuel selector valve 70 can be coupled with ODS lines 143 and 144. As shown, the ODS 180 has a thermocouple 182 coupled to the control valve 130, and an igniter line 184 coupled with an igniter, such as an electrode. In some embodiments, the ODS 180 can be mounted to the main burner 190.

Figure 17:
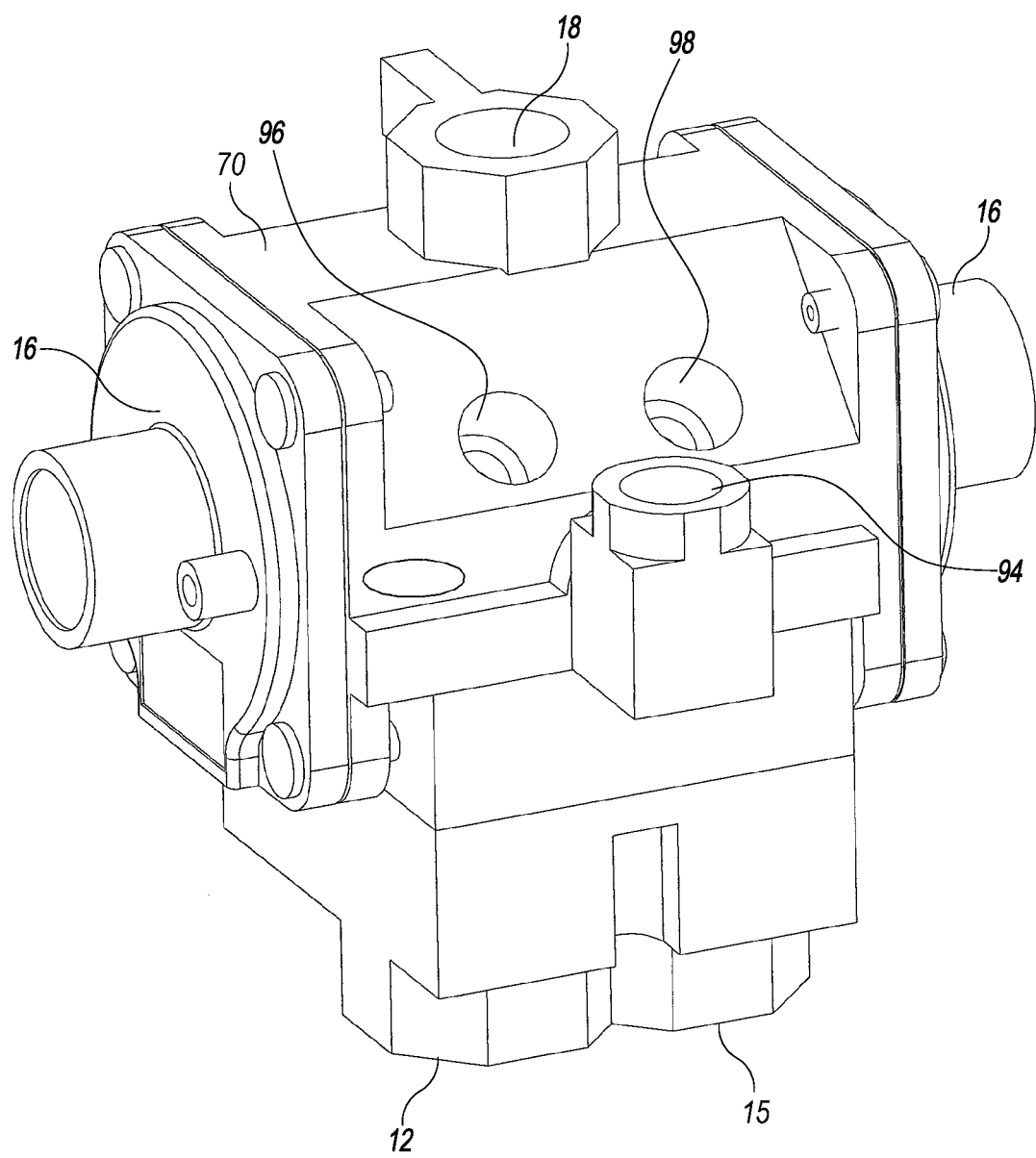
FIGS. 17 and 17A show another embodiment of heating source.
Figure 17A:
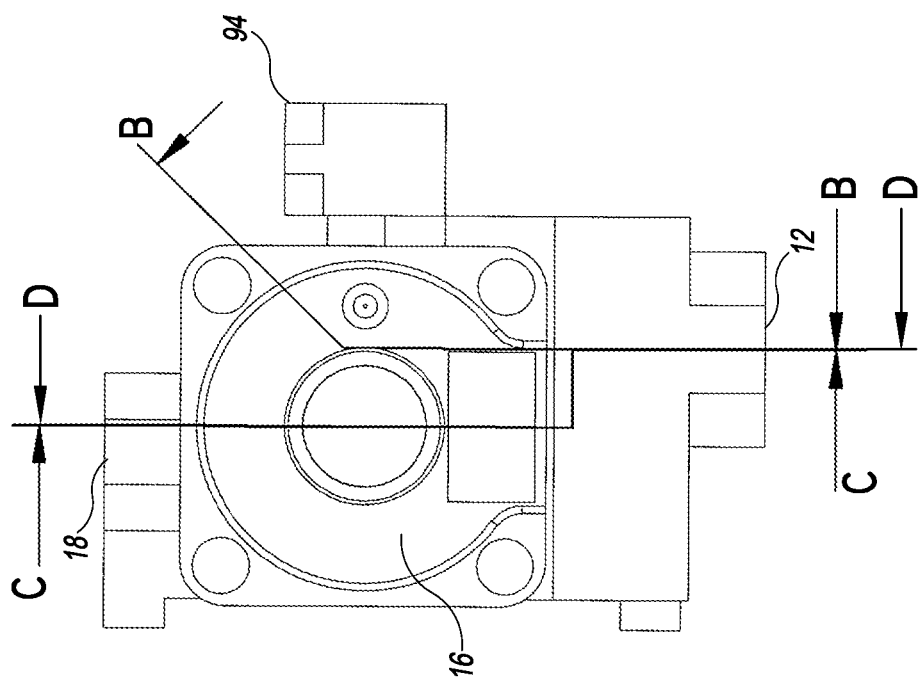
Figure 19:
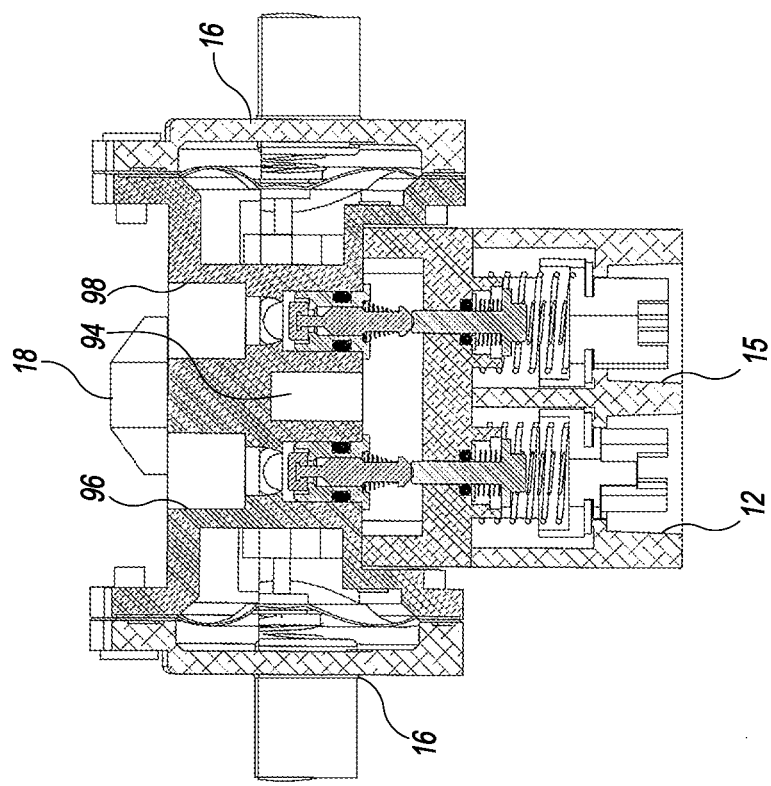
FIG. 19 is a cross-section taken along line B-B of FIG. 17A.

Referring now to FIGS. 17-17A, another embodiment of a fuel selector valve 70 will be described. The illustrated fuel selector valve is similar to that shown in FIGS. 13-14. The fuel selector valve of FIGS. 13-14 is also shown with a pressure sensitive switch and can also include one addition input and output for receiving fuel from the control valve and for directing fuel to a nozzle 160.

The fuel selector valve 70 as illustrated in FIGS. 17-17A includes two pressure regulators 16, one for each different fuel type for a dual fuel heater. Each of the pressure regulators can have a spring loaded valve connected to a diaphragm. The fluid pressure acting on the diaphragm can move the valve allowing more or less fluid to flow through the pressure regulator depending on the orientation of the valve with respect to a valve seat which are generally positioned within the flow passage through the pressure regulator.

Among other features, the heating assembly can be used to select between two different fuels and to set certain parameters, such as one or more flow paths, and/or a setting on one or more pressure regulators based on the desired and selected fuel. The heating assembly 100 can have a first mode configured to direct a flow of a first fuel (such as LP) in a first path through the heating assembly 100 and a second mode configured to direct a flow of a second fuel (such as NG) in a second path through the heating assembly.

The fuel selector valve 70 can be used to select between two different fuels and to set certain parameters, such as one or more flow paths, and/or a setting on one or more pressure regulators based on the desired and selected fuel. The fuel selector valve 70 can have a first mode configured to direct a flow of a first fuel (such as LPG) on a first path through the fuel selector valve 70 and a second mode configured to direct a flow of a second fuel (such as NG) on a second path through the fuel selector valve 70. The fuel selector valve 70 can also include one or more actuation members. In some embodiments, the fuel selector valve 70 can be configured such that inlets of the valve are only open when they are connected to a source of fuel, as described in more detail below.

Figure 18:
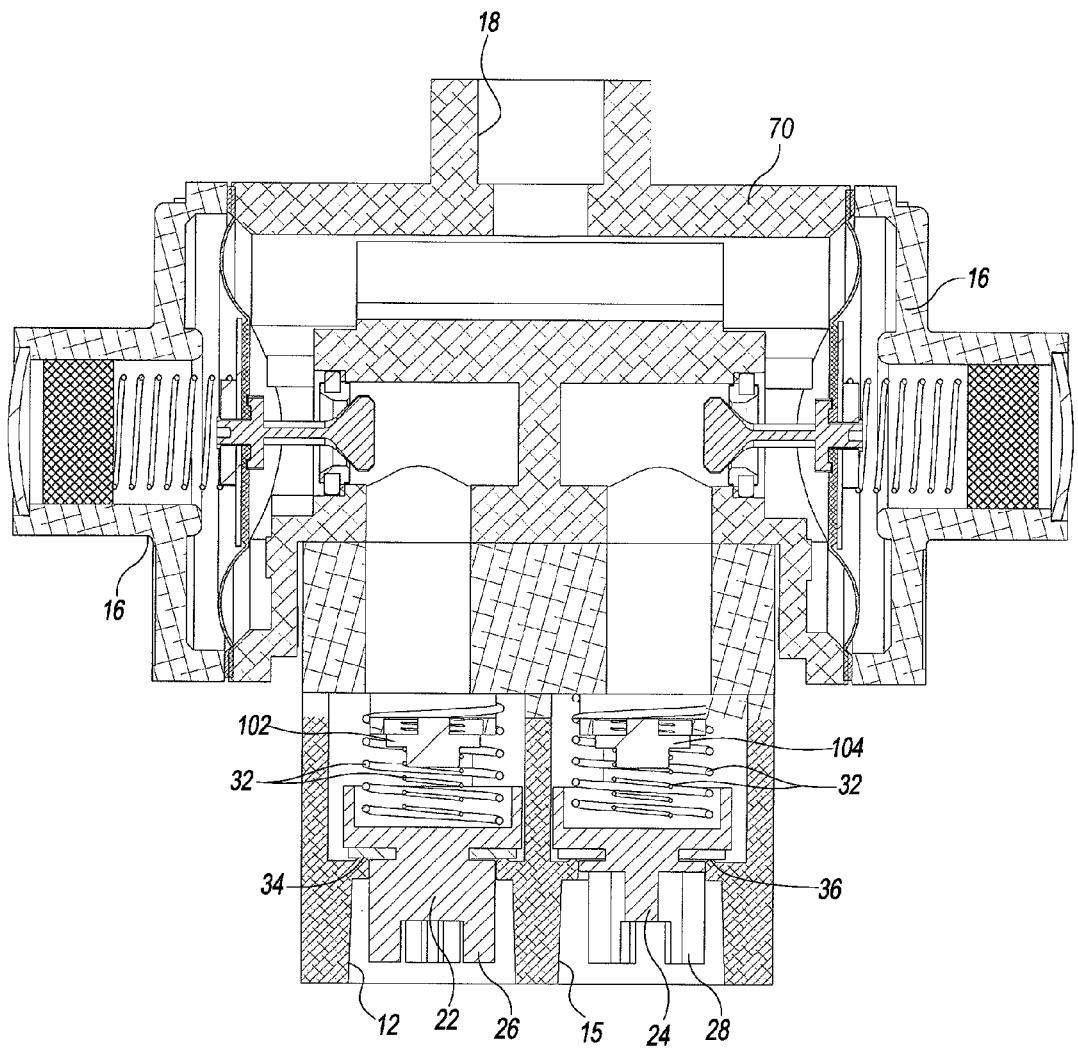
FIG. 18 is a cross-section taken along line C-C of FIG. 17A.

FIG. 17 illustrates an external view of a fuel selector valve 70 that can have a first inlet 12 and a second inlet 15. Both inlets can have an actuation member with an end that can at least partially enter the inlet and close or substantially close the inlet. For example, as illustrated in FIG. 18, the first inlet 12 can have a first actuation member 22 with an end that blocks the inlet. Similarly, the second inlet 15 can have a second actuation member 24 with an end that blocks the inlet.

As described with respect to various embodiments above, the actuation members can have sealing sections 34, 36 that can seat against respective ledges to close or substantially close their respective inlets 12, 14. Thus, the first actuation member 22 can have a first position in which the sealing section 34 of the first actuation member seats against the first ledge. Similarly, the second actuation member 24 can have a first position in which the sealing section 36 of the second actuation member seats against the second ledge. Each actuation member preferably has a biasing member, such as a spring 32 that biases the actuation member toward the first position.

Figure 20:
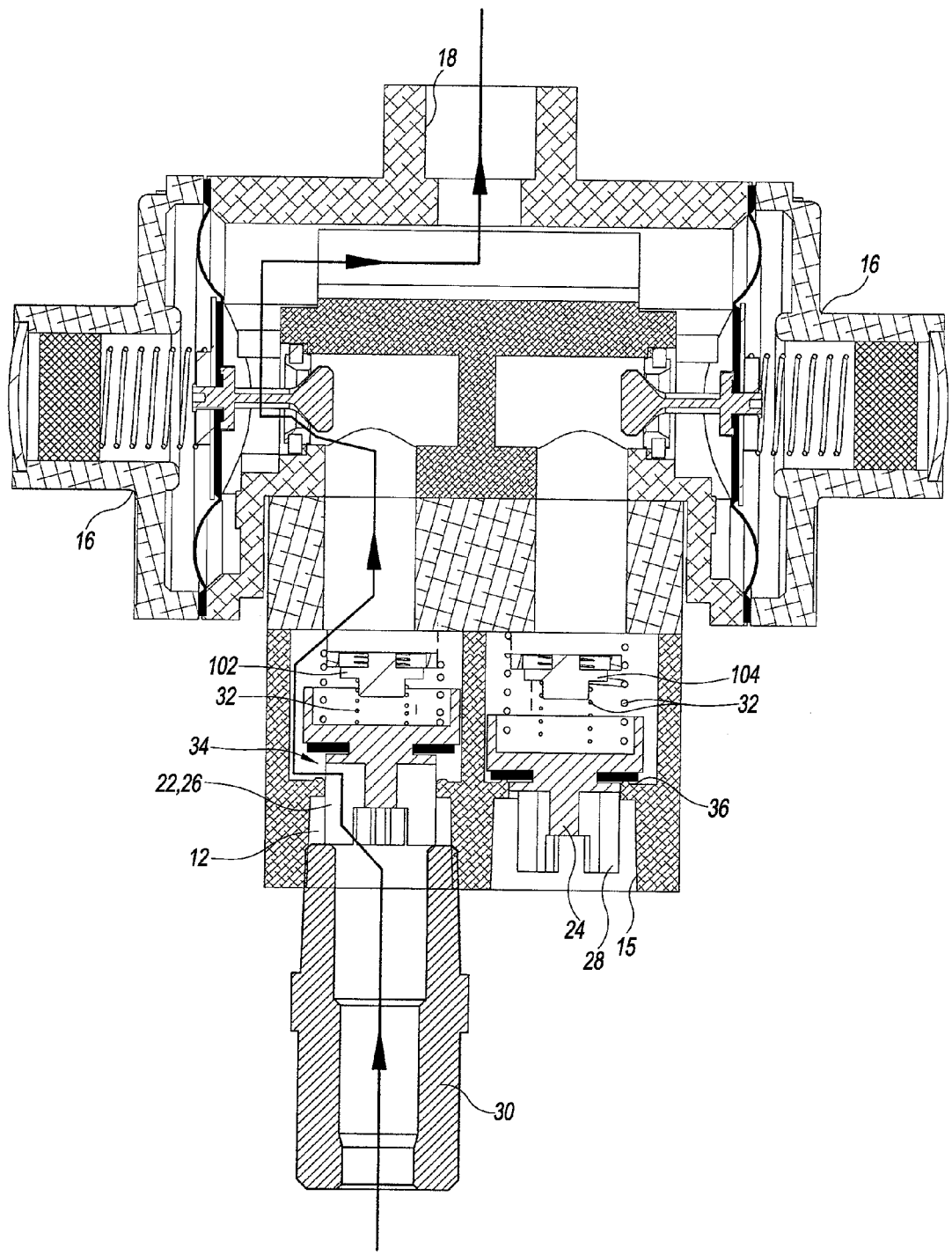
FIG. 20 is the cross-section of FIG. 18 shown with a fitting.

As described in various embodiments above, when a fitting for a source of fuel connects to one of the inlets, it can move the actuation member into a second position that allows fluid to flow through the inlet. FIG. 20 illustrates a fitting 30 of a source of fuel connected to the first inlet 12. Each of the inlets is shown fluidly connected to a pressure regulator 16 and to the outlet 18.

As with some pressure regulators described above, the pressure settings of each pressure regulator 16 can be independently adjusted by tensioning of a screw or other device that allows for flow control of the fuel at a predetermined pressure or pressure range (which can correspond to a height of a spring) and selectively maintains an orifice open so that the fuel can flow through a spring-loaded valve or valve assembly of the pressure regulator. If the pressure exceeds a threshold pressure, a plunger seat can be pushed towards a seal ring to seal off the orifice, thereby closing the pressure regulator. In some embodiments, a fuel selector valve 70 can include two inlets with respective inlet valves as well as dedicated pressure regulators that can direct fluid flow to an outlet. Other embodiments may have additional features.

The fuel selector valve can provide additional control of a fluid flow through an additional valve system. The fuel selector valve can both direct fluid to the control valve 130 and receive a flow of fluid from the control valve. As shown, the control valve 130 directs the fluid flow for the oxygen depletion sensor (ODS) to the fuel selector valve. It will be understood that other embodiments can receive both the ODS fluid flow, as well as the nozzle fluid flow, or just the fluid flow for the nozzle. In addition, the fuel selector valve can direct fluid flow to other components in addition to and/or instead of the control valve 130.

Figure 21:
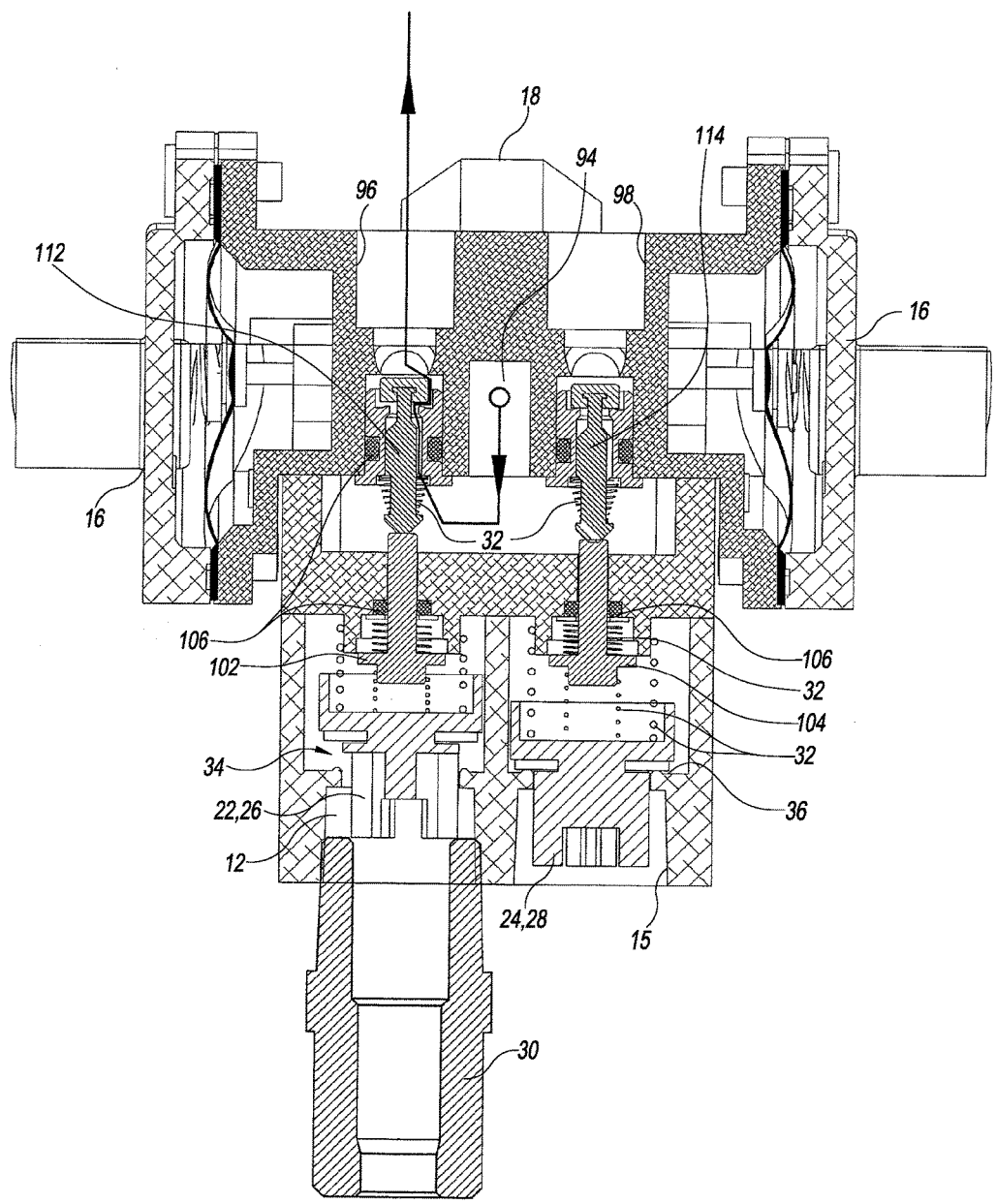
FIG. 21 is the cross-section of FIG. 19 shown with a fitting.

As best seen in FIG. 21, the actuators 22, 24 can each be operatively coupled to a valve member 112, 114 that can open the flow path to either the second outlet 96 or the third outlet 98 114 can be. Thus, fluid received at the third inlet 94 can be discharged to either the second outlet 96 or the third outlet 98. In this way, the fuel selector valve can direct fuel to desired location, such as a burner nozzle or ODS nozzle specific for a particular type of fuel.

The actuation members 22, 24 are shown as have three separate movable members. For example, actuation member 22 has a first valve 26, a moveable member 102 and a second valve 112. This second valve 112 of actuation member 22 is also the third valve of the system. Actuation member 24 is shown with a first valve 28, a moveable member 104 and a second valve 114. In the overall system, these valves are also called the second valve 28 and the fourth valve 112. One benefit of having two or more independently movable members is that having two or more separate members can allow each member to properly seat to the respective valve to prevent leakage; though it will be understood that one, two, or more members could be used. It can also be seen that a number of springs 32 and O-rings, 106 can be used to bias the members to their initial positions and to prevent leakage.

In some embodiments, a fuel selector valve 70 similar to that described with respect to FIGS. 17-21 and described further below with respect to FIGS. 22-24B can have a single pressure regulator, or no pressure regulators. In addition, in some embodiments, the fuel selector valve 70 can have separate outlets fluidly connected to each inlet and/or fuel hook-up.

Each of the fuel selector valves described herein can be used with a pilot light or oxygen depletion sensor, a nozzle, and a burner to form part of a heater or other gas appliance. The different configurations of valves and controls such as by the actuation members can allow the fuel selector valve to be used in different types of systems. For example, the fuel selector valve can be used in a dual fuel heater system with separate ODS and nozzles for each fuel. The fuel selector valve can also be used with nozzles and ODS that are pressure sensitive so that can be only one nozzle, one ODS, or one line leading to the various components from the fuel selector valve.

According to some embodiments, a heater assembly can be used with one of a first fuel type or a second fuel type different than the first. The heater assembly can include a pressure regulator having a first position and a second position and a housing having first and second fuel hook-ups. The first fuel hook-up can be used for connecting the first fuel type to the heater assembly and the second hook-up can be used for connecting the second fuel type to the heater assembly. An actuation member can be positioned such that one end is located within the second fuel hook-up. The actuation member can have a first position and a second position, such that connecting a fuel source to the heater assembly at the second fuel hook-up moves the actuation member from the first position to the second position. This can cause the pressure regulator to move from its first position to its second position. As has been discussed, the pressure regulator in the second position can be configured to regulate a fuel flow of the second fuel type within a predetermined range.

The heater assembly may also include one or more of a second pressure regulator, a second actuation member, and one or more arms extending between the respective actuation member and pressure regulator. The one or more arms can be configured to establish a compressible height of a pressure regulator spring within the pressure regulator.

A heater assembly can be used with one of a first fuel type or a second fuel type different than the first. The heater assembly can include at least one pressure regulator and a housing. The housing can comprise a first fuel hook-up for connecting the first fuel type to the heater assembly, and a second fuel hook-up for connecting the second fuel type to the heater assembly. The housing can also include a first inlet, a first outlet, a second outlet configured with an open position and a closed position, and a first valve configured to open and close the second outlet. A first actuation member having an end located within the second fuel hook-up and having a first position and a second position can be configured such that connecting a fuel source to the heater assembly at the second fuel hook-up moves the actuation member from the first position to the second position which causes the first valve to open the second outlet, the second outlet being in fluid communication with the second fuel hook-up.

The first actuation member can be further configured such that connecting the fuel source to the heater assembly at the second fuel hook-up moves the first actuation member from the first position to the second position which causes the at least one pressure regulator to move from a first position to a second position, wherein the at least one pressure regulator in the second position is configured to regulate a fuel flow of the second fuel type within a predetermined range.

The at least one pressure regulator can comprises first and second pressure regulators, the first pressure regulator being in fluid communication with the first fuel hook-up and the second pressure regulator being in fluid communication with the second fuel hook-up.

Similarly, the first valve can be configured to open and close both the first and second outlets or there can be a second valve configured to open and close the first outlet. The housing may include addition, inlets, outlets and valves. Also a second actuation member may be used and positioned within the first fuel hook-up.

In certain embodiments, the heater assembly is configured to accept and channel liquid propane when in a first operational configuration and to accept and channel natural gas when in a second operational configuration. In other embodiments, the heater assembly is configured to channel one or more different fuels when in either the first or second operational configuration.

The fuel selector valves 70 of FIGS. 17-21 can be used in the system shown in FIG. 16. Returning to FIGS. 13 and 14, a fuel selector valve 70 (also shown in FIGS. 22-24B) can be used in the system shown in FIG. 15. It can be seen that one of the main differences between FIG. 15 and FIG. 16 is how the fuel travels from the control valve to the burner. In FIG. 16, fuel can travel from the control valve to a pressure sensitive nozzle which can control how the fuel is injected to the burner, i.e. the pathway through the nozzle to the burner.

In FIG. 15, the control valve directs some of the flow directly to the burner through a nozzle and some of the flow is returned to the fuel selector valve 70. This second flow may be directed to the burner by a second nozzle dependent upon which fuel inlet is connected to a fuel source. In this way, some of the flow to the burner travels the second path when the natural gas connection is made. But, the direct flow to the burner is independent of whether liquid propane or natural gas is connected. From this it will be understood that the fuel selector valve of FIGS. 13-14 includes one additional input and an output for receiving fuel from the control valve and for directing fuel to a nozzle, as well as an internal valve to open and close this passageway.

Figure 22:
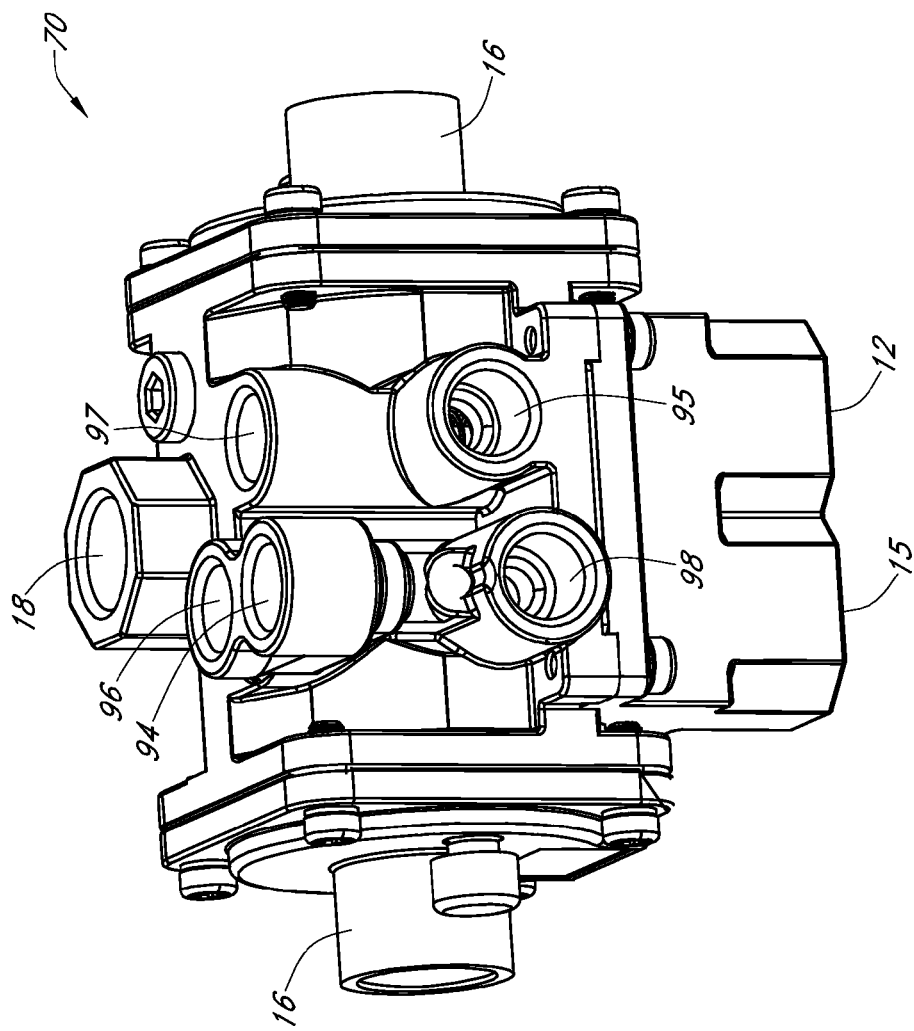
FIG. 22 shows another embodiment of a heating source.

FIG. 22 illustrates an external perspective view of a fuel selector valve 70 that can have an additional input and output and can be used in the system shown in FIG. 15, although it can also be used in the system shown in FIG. 16. Like valves described above, valve 70 of FIG. 22 can have a first fuel source connection or inlet 12 and a second fuel source connection or inlet 15. In some embodiments, the first inlet 12 can be configured to connect to a fitting for a first fuel (such as LP), and the second inlet 15 can be configured to connect to a fitting for a second fuel (such as NG). Both inlets can have an actuation member with an end that can at least partially enter the inlet and close or substantially close the inlet. For example, as illustrated in FIG. 18, the first inlet 12 can have a first actuation member 22 with an end that blocks the inlet. Similarly, the second inlet 15 can have a second actuation member 24 with an end that blocks the inlet. FIG. 18 is a cross-section of the valve illustrated in FIG. 17, but is similar in all relevant respects to the valve of FIG. 22 if considered to be viewed from the line D-D of FIG. 17A.

As described with respect to various embodiments above, the actuation members can have sealing sections 34, 36 that can seat against respective ledges to close or substantially close their respective inlets 12, 14. Thus, the first actuation member 22 can have a first position in which the sealing section 34 of the first actuation member seats against the first ledge. Similarly, the second actuation member 24 can have a first position in which the sealing section 36 of the second actuation member seats against the second ledge. Each actuation member preferably has a biasing member, such as a spring 32 that biases the actuation member toward the first position.

As described in various embodiments above, when a fitting for a source of fuel connects to one of the inlets, it can move the actuation member into a second position that allows fluid to flow through the inlet. FIG. 20 illustrates a fitting 30 of a source of fuel connected to the first inlet 12. Each of the inlets is shown fluidly connected to a pressure regulator 16 and to the outlet 18. FIG. 20 shows the same view as FIG. 18.

As with some pressure regulators described above, the pressure settings of each pressure regulator 16 can be independently adjusted by tensioning of a screw or other device that allows for flow control of the fuel at a predetermined pressure or pressure range (which can correspond to a height of a spring) and selectively maintains an orifice open so that the fuel can flow through a spring-loaded valve or valve assembly of the pressure regulator. If the pressure exceeds a threshold pressure, a plunger seat can be pushed towards a seal ring to seal off the orifice, thereby closing the pressure regulator. In some embodiments, a fuel selector valve 70 can include two inlets with respective inlet valves as well as dedicated pressure regulators that can direct fluid flow to an outlet. Other embodiments may have additional features.

The fuel selector valve can provide additional control of a fluid flow through additional valve systems, as described further below. The fuel selector valve can both direct fluid to the control valve 130 and receive a flow or flows of fluid from the control valve. In some embodiments the control valve 130 directs the fluid flow for the oxygen depletion sensor (ODS) to the fuel selector valve. In some embodiments, the fuel selector valve can receive both the ODS fluid flow as well as a portion of the nozzle fluid flow. In some embodiments, the fuel selector valve can receive just the fluid flow for the nozzle from the control valve. In addition, the fuel selector valve can direct fluid flow to other components in addition to and/or instead of the control valve 130. For example, in some embodiments the fuel selector valve can selectively direct fluid flow to a nozzle. In some embodiments, the fuel selector valve can direct fluid flow toward an ODS.

With reference to FIG. 22, the fuel selector valve can have a variety of connections allowing for use in the system shown in FIG. 15 and in various other embodiments of systems described herein. In additional to the first inlet 12 and second inlet 15, the fuel selector valve can have a third inlet 94 and a fourth inlet 95, each of which can fluidly connect to the control valve. The fuel selector valve can also have a first outlet 18, which can fluidly connect to the pressure regulators 16 and the control valve, a second outlet 96 and third outlet 98, which can fluidly connect to an ODS, and a fourth outlet 97, which can fluidly connect to a nozzle.

Figure 23:
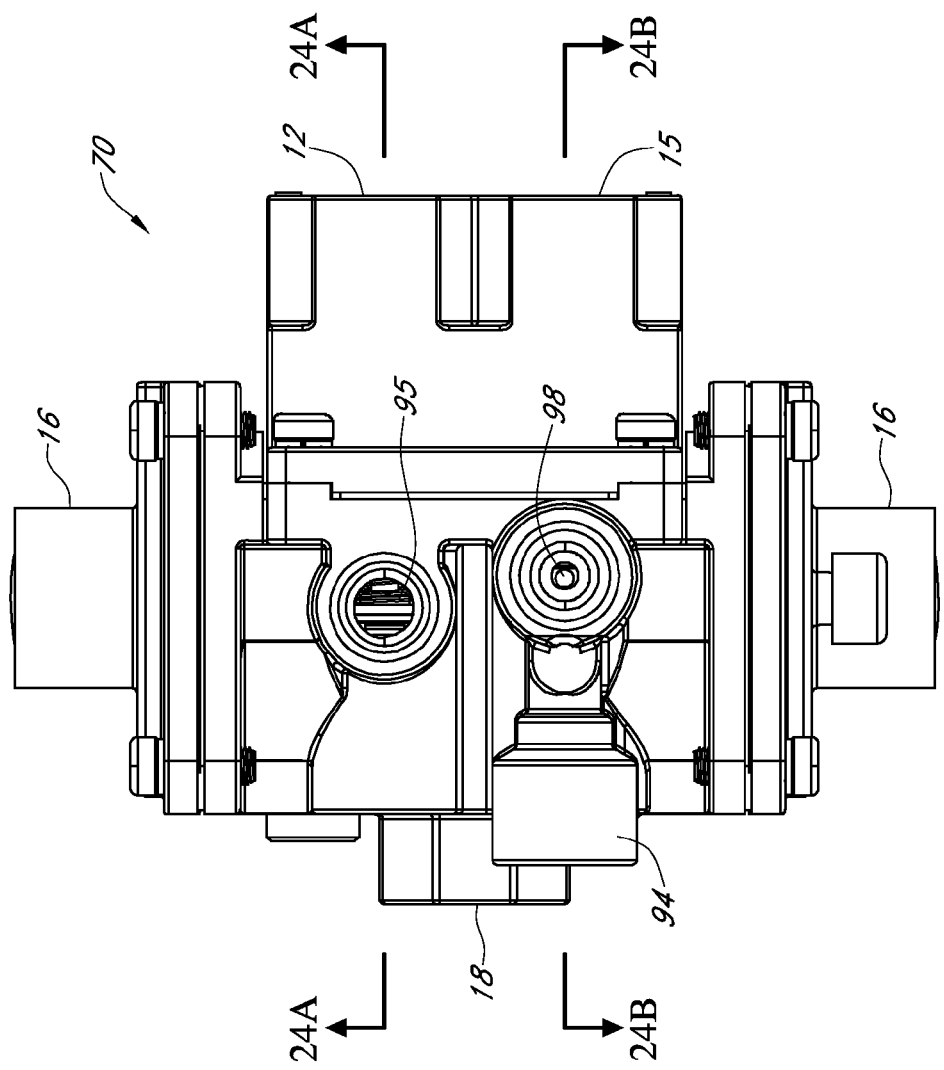
FIG. 23 shows a top view of the heating source of FIG. 22.
Figure 24A:
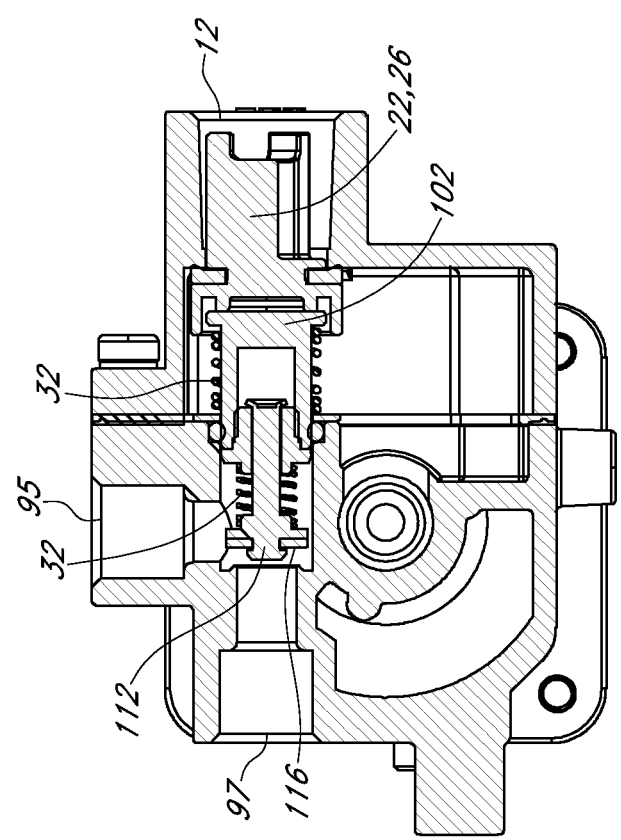
FIG. 24A is a cross-section taken along the line 24A-24A of FIG. 23.
Figure 24B:
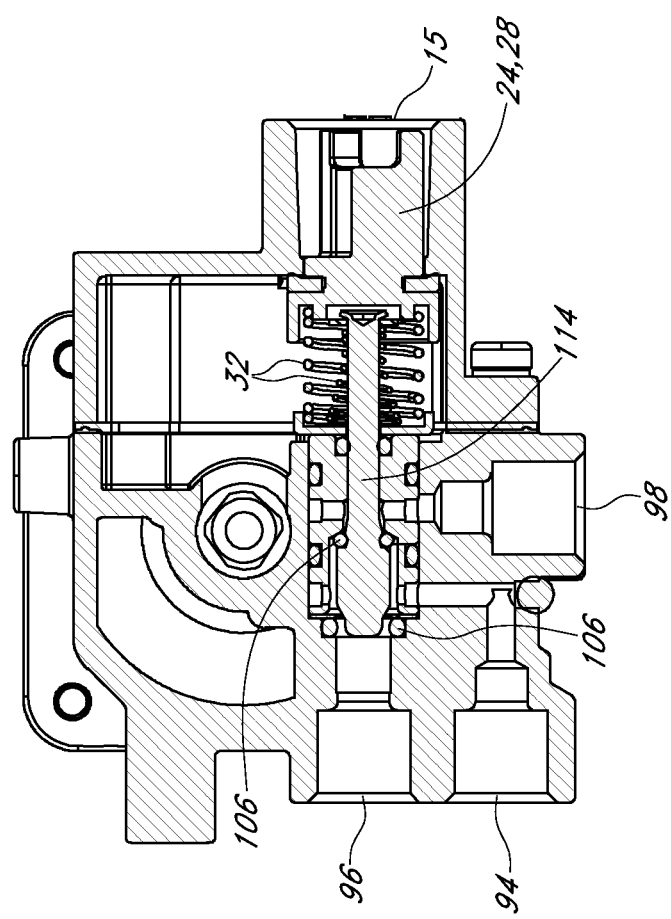
FIG. 24B is a cross-section taken along the line 24B-24B of FIG. 23.

As best seen in FIGS. 24A and 24B, which illustrate the cross sections of the fuel selector valve 70 identified in FIG. 23, the actuators 22, 24 can each be operatively coupled to a valve member 112, 114 that can adjust flow paths through the selector valve. For example, as illustrated in FIG. 24A, the valve member 112 can selectively allow a flow of fluid that enters through the fourth inlet 95 from the control valve to pass through the fourth outlet 97 to the nozzle. In some embodiments, the valve member 112 can have a first position configured to allow a second fuel (such as NG) to exit the fourth outlet 97 and a second position configured to block or substantially block a first fuel (such as LP) from exiting the fourth outlet 97. The valve member 112 can be biased toward the first position. In some embodiments, connecting a fitting to the first inlet 12 can move the valve member 112 to the second position. Because the second inlet 15 can be configured to receive fittings for the second fuel (such as NG), when the second inlet receives the second fuel the valve member 112 can be in the first position.

Similarly, as illustrated in FIG. 21B, the valve member 114 can direct a fluid flow path from the control valve through the third inlet 94 to either the second outlet 96 or the third outlet 98. In some embodiments, the second outlet can fluidly connect to an ODS pilot for the first fuel (such as LP). In some embodiments, the third outlet can fluidly connect to an ODS pilot for the second fuel (such as NG). In some embodiments, the valve member 114 can be configured to be biased toward a first position that allows fluid that enters through the third inlet 94 to flow through the second outlet 96, and that blocks or substantially blocks fluid flow through the third outlet 98. In some embodiments, connecting a fitting to the second inlet 15 can move the valve member to a second position that allows fluid that enters through the third inlet 94 to flow through the third outlet 98, and that blocks or substantially blocks fluid flow through the second outlet 96. Because the first inlet can be configured to receive fittings for the first fuel (such as LP), when the first inlet receives the first fuel the valve member 114 can be in the first position.

As above, in some embodiments, an actuation member 22, 24 may have multiple separate movable members. For example, actuation member 22 is shown with three separate movable members: a first valve 26, a moveable member 102, and a second valve 112. This second valve 112 of actuation member 22 is also the third valve of the system. As a further example, actuation member 24 is shown with two separate movable members: a first valve 28 and a second valve 114. In the overall system, these valves are also called the second valve 28 and the fourth valve 114. One benefit of having two or more independently movable members is that having two or more separate members can allow each member to properly seat to the respective valve to prevent leakage; though it will be understood that one, two, or more members could be used for either the first actuation member or the second actuation member. It can also be seen that a number of springs 32 and O-rings 106 can be used to bias the members to their initial positions and to prevent leakage. Additionally, different sealing systems can be used. For example, the fourth valve 114 can move relative to and seal against O-rings 106 to close or substantially close the valve. The third valve 112 can have a sealing section 116 that seats against a respective ledge to close or substantially close the valve.

Returning now to FIG. 14, in certain embodiments, a control valve 130 and/or a heating unit 70, such as a fuel selector valve, can be positioned to be in fluid communication with the burner 190. The heating unit 70 and/or control valve 130 can be coupled to the burner 190 in any suitable manner. As has been discussed, various pipes or lines (including 124, 124A, 124B) can be used to direct fuel flow to a nozzle 160 which is then directed to the burner 190. A burner delivery line 148 can be used to direct fuel flow from the nozzle(s) to the burner 190. The burner delivery line 148 can be part of, or separate from, the actual burner 190 and may not be used in all embodiments. Thus, it will be understood that features of the burner delivery line can also be features of the burner.

Figure 14A:
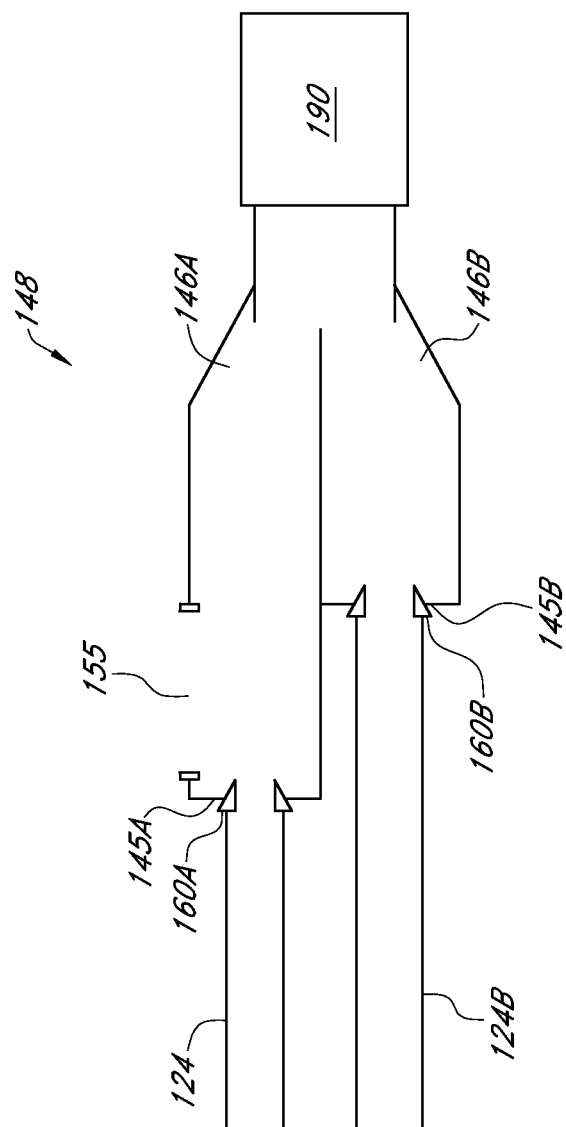
FIG. 14A shows a schematic detail view of a portion of the heater of FIG. 14.

In some embodiments, the burner delivery line 148 defines an opening 145A, 145B at a first end thereof through which one or more of the nozzles 160A, 160B can extend (FIG. 14A). In other embodiments, the nozzles are not located within the burner delivery line 148 but are positioned to direct fuel into the burner delivery line 148. The nozzle(s) can direct fuel to the venturi 146A, 146B or the throat of the burner, which as shown is constricted to act like a built-in venturi, and then into the burner itself.

In some embodiments, such as that shown in FIG. 14, the burner delivery line 148 defines an air intake, aperture, opening, or window 155 through which air can flow to mix with fuel dispensed by the nozzle 160A. An opening 155 can be used to introduce air into the flow of fuel prior to combustion. The amount of air that is needed to be introduced depends on the type of fuel used. For example, propane gas at typical pressures needs more air than natural gas to produce a flame of the same size. In some embodiments, the window 155 is adjustably sized. For example, in some embodiments, a cover as part of an air shutter can be positioned over the window 155 to adjust the amount of air that can enter the burner delivery line 148 through the window. The area or volume inside of the burner delivery line 148 at the window 155 defines a mixing chamber where air and fuel can be mixed.

Referring now to FIG. 14A, a schematic cross-section view of a portion of the heater is shown. As shown, in some embodiments, a burner 190 or burner delivery line 148 can have two separate inlets 145A, 145B. The inlets can be separate and can remain divided along a portion of the length of the burner or burner delivery line. For example, the burner delivery line 148 can be divided from the inlets 145A, 145B until after the venturi 146A, 146B. In some embodiments, the end of the separation may determine the end of the venturi. In some embodiments, the first inlet 145A can be part of a first conduit, and the second inlet 145B can be part of a second conduit. The first and second conduits can connect to then form a single conduit, or can both connect to a third conduit. These conduits can all be part of the burner or burner delivery line.

As shown, a window 155 can be positioned between the inlet 145A and the venturi 146A. It can also be seen that the other side does not have a window. In some embodiments, the burner delivery line 148 can be divided starting from the inlets 145A, 145B until after the window 155, or until after a set distance from the window. A first fuel that requires more air (compared to a second fuel) can be injected into the burner delivery line 148 through nozzle 160A to pass by the window. The second fuel, that does not require as much air, can be injected into the burner delivery line 148 through nozzle 160B. In some embodiments, a fuel that does not require as much air can be injected into the burner through both nozzles 160A, 160B. Injecting a fuel into both nozzles will result in a less air rich fuel. It will be understood that the various factors can be considered to obtain the desired air fuel mixture, including, but not limited to, nozzle orifice size, window size, position of the nozzle with respect to the window, position of the second nozzle with respect to the window, etc.

As shown, the burner delivery line can be used in a dual fuel heater without requiring an air shutter, or adjustments to the window size. This can reduce costs and also prevent user error associated with adjusting an air shutter.

As fuel passes the window 155 it will pull air into the mixing chamber of the burner delivery line 148. As the nozzle 160B does not have a window positioned close to the nozzle, an air/fuel mixture will still be created at injection, but it will generally not be as air rich as it would if it were positioned next to a window.

In some embodiments, the first inlet 145A can be positioned a set distance away from the second inlet 145B. For example, the set distance can be equal to or greater than the size of the window 155. In some embodiments, the distance from the end of the window to the venturi can be substantially the same as the distance from the second inlet to the venturi.

It will be understood that though the inlets are shown positioned next to each other, in some embodiments the two inlets can be more clearly separated, or even completely separated, such as having one inlet at one end of the burner, and the other at an opposite end or different part of the burner. In addition, though the illustration shows one inlet with a window 155 and one without, in other embodiments, both inlets can have a window, but one window can be substantially larger than the other, such as 2, 3, 4, or 5 times the size of the first smaller window. It will also be understood that the window can be any of a number of different sizes, shapes, and configurations, and may be one or more windows.

Referring to FIGS. 14 and 15, operation of the illustrated heater will be described according to certain embodiments. A user can connect one of two fuels, such as either natural gas or propane to the heater. Each fuel hook-up can be set for a certain fuel type. Connecting the fuel source to the fuel selector valve 70 can automatically set the fuel selector valve to a position configured for the particular gas as has been described. If propane is connected to the natural gas inlet, the pressure sensor 60 can detect this pressure difference and prevent the control valve from opening thereby preventing fluid flow to the burner.

With the proper gas is connected and once the pilot has been proven, the system can be changed to a heating configuration where fuel can flow from the control valve to the burner. The control valve 130 can then control the flow to the pilot (or ODS) 180 and to the burner 190.

In the illustrated embodiment, the control valve 130 returns the pilot fuel flow to the fuel selector valve 70. The setting of the fuel selector valve 70, based on which fuel hook-up is used, then determines which pilot nozzle receives the pilot fuel flow.

In the illustrated embodiment, the control valve 130 returns some of the burner fuel flow to the fuel selector valve 70 and some is directed at the burner nozzle 160A. The setting of the fuel selector valve 70, based on which fuel hook-up is used, then determines whether burner nozzle 160B also receives the burner fuel flow. If the natural gas fuel hook-up is used and natural gas is flowing in the heater, an internal valve in the fuel selector valve 70 will be open to allow fuel flow to burner nozzle 160B. If the propane fuel hook-up is used and propane gas is flowing in the heater, an internal valve in the fuel selector valve 70 will be closed to prevent fuel flow to burner nozzle 160B. But, with propane, as with natural gas, fuel can flow from the control valve 130 to the burner nozzle 160A.

It can be seen that one of the main differences between FIG. 15 and FIG. 16 is how the fuel travels from the control valve to the burner. In FIG. 16, fuel can travel from the control valve to a pressure sensitive nozzle which can control how the fuel is injected to the burner, i.e. the pathway through the nozzle to the burner.

In FIG. 15, the control valve directs some of the flow directly to the burner through a nozzle and some of the flow is returned to the fuel selector valve 70. This second flow may be directed to the burner by a second nozzle dependent upon which fuel inlet is connected to a fuel source. In this way, some of the flow to the burner travels the second path when the natural gas connection is made. But, the direct flow to the burner is independent of whether liquid propane or natural gas is connected. From this it will be understood that the fuel selector valve of FIGS. 13-14 includes one addition input and an output for receiving fuel from the control valve and for directing fuel to a nozzle, as well as an internal valve to open and close this passageway.

Figure 25B:
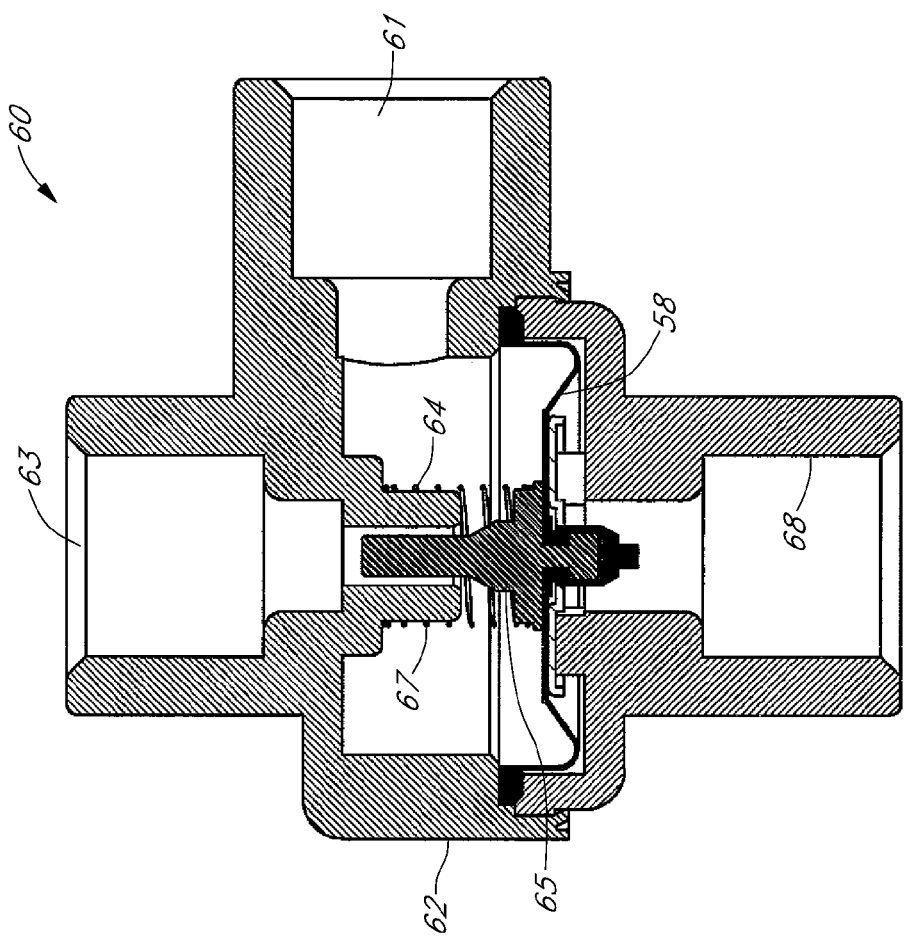
FIG. 25B is a side cross-sectional view of the pressure switch of FIG. 25A.
Figure 25A:
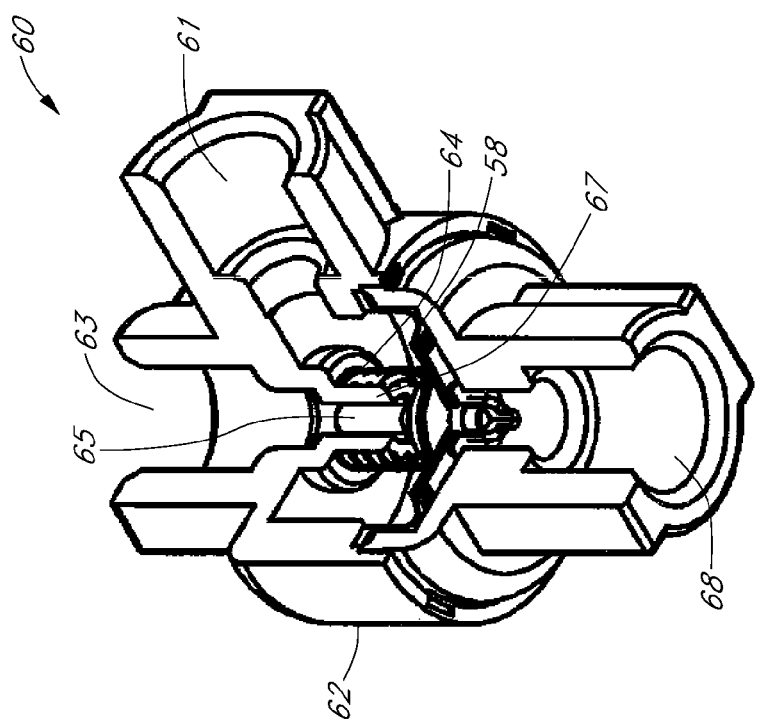
FIG. 25A show a perspective view partially in cross-section of another embodiment of pressure switch.

Turning now to FIGS. 25A-25B, another embodiment of a pressure switch 60 is illustrated. The pressure switch 60 has a housing 62 having an inlet 68 to receive fluid to be able to respond to certain pressures. As shown, the pressure switch 60 is a normally open pressure switch. The pressure switch 60 can be set to close when a greater than desired pressure encounters a valve member 58, such as the illustrated diaphragm 58. A spring 64 can be used to determine the pressure required to move the diaphragm 58.

As can be seen, in this pressure switch, rather than control an electrical connection, the valve member can control a flow path through the pressure switch between an inlet 61 and an outlet 63. A valve stem 65 on the valve member 58 can engage a valve seat 67 on the housing 62 to close the flow path when the pressure of the fluid entering inlet 68 is at or above a set threshold pressure. The inlet 68 may also be considered a pressure chamber. Other types and styles of valve members can also be used. For example, the diaphragm 58 alone can be used to close the flow path. In addition, in other embodiments, the pressure switch 60 can be a normally closed pressure switch that is opened when the pressure in the inlet or pressure chamber 68 is at or above a set threshold pressure.

The pressure switch 60 with flow path control can be used to control one or more flows of fuel within a heating assembly. For example, the pressure switch 60 can be in fluid communication with an inlet on the heating assembly such that the pressure at the pressure chamber 68 is the delivery pressure of the fluid. As different types of fuels are generally provided within distinguishable pressure ranges, as has been discussed, the pressure switch can be used to distinguish between different types of fuel. The pressure switch may be used as a safety feature, similar to other pressure switches and devices discussed herein, but may also serve other or additional purposes, such as determining one or more flow paths through the heating assembly.

Figure 26:
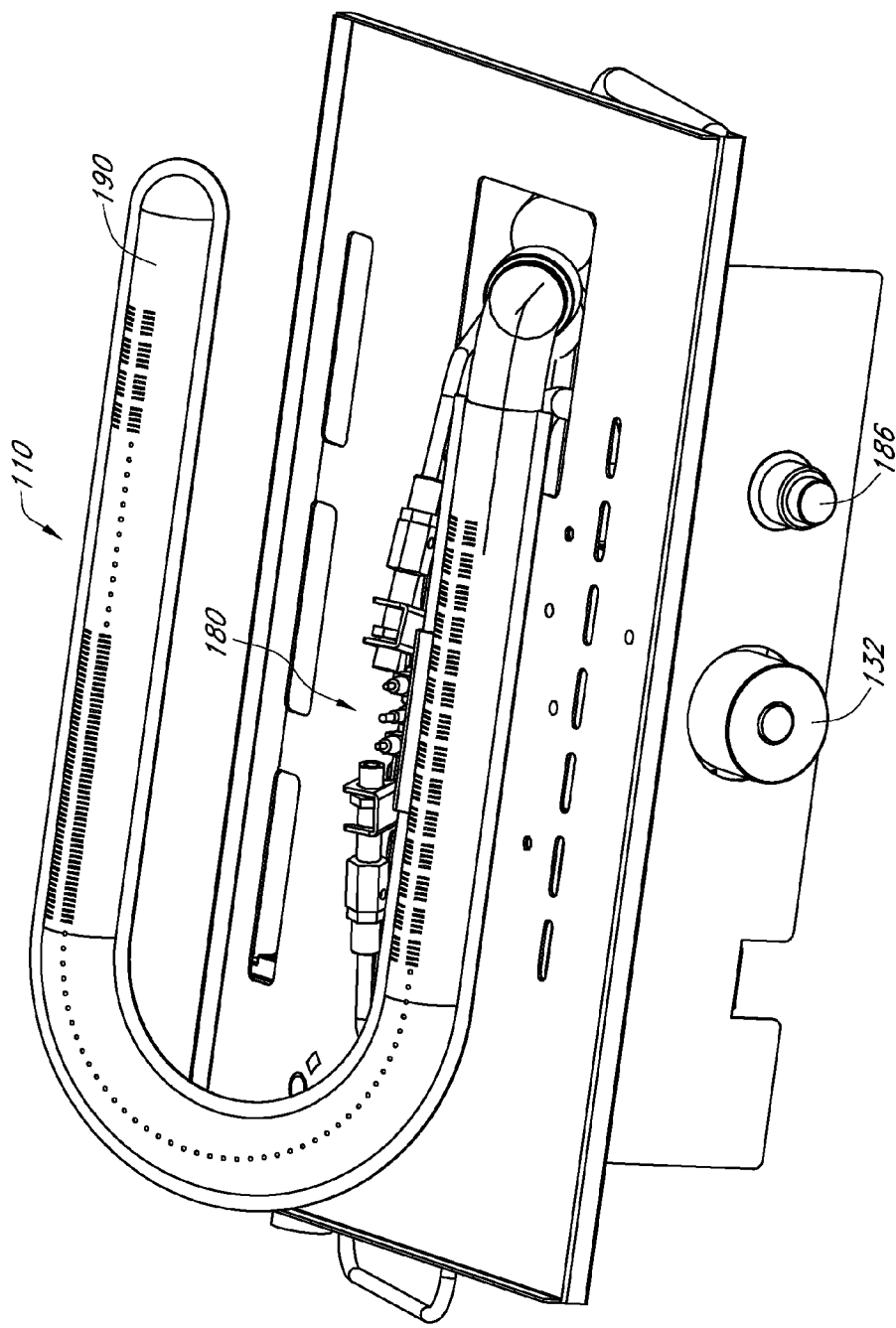
FIG. 26 shows a heater.

FIGS. 26-29B show an example of a heater 110 having a pressure switch 60 with flow path control. The heater 110 of FIG. 26 is very similar to the heater shown in FIG. 14. Looking now at FIG. 27A, the heater 110 is shown in a partially dissembled view. The illustrated heating source 70 of the heater 110 is the same as that shown and described with respect to FIGS. 22-24B and FIG. 14. Thus, the primary difference between the heater 110 and the heater shown in FIG. 14 is the use of a different pressure switch. In the embodiment of FIGS. 26-29B, the pressure switch 60 provides flow path control to the pilot or ODS 180 based on the delivery pressure of the fuel at one of the inlets.

Figure 27A:
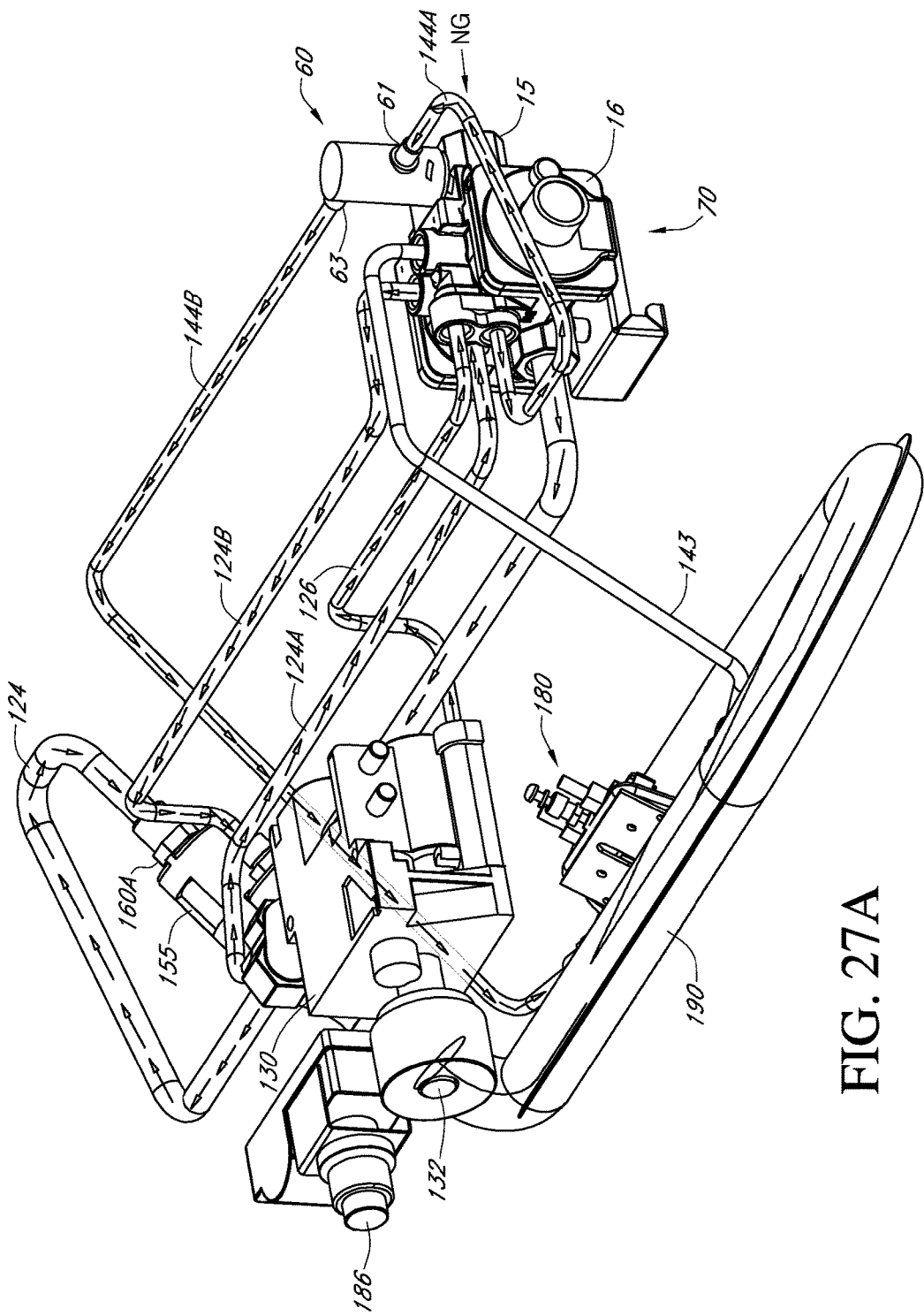
FIGS. 27A, 28A and 29A show partially dissembled views of the heater of FIG. 26 illustrating different flow configurations.
Figure 27B:
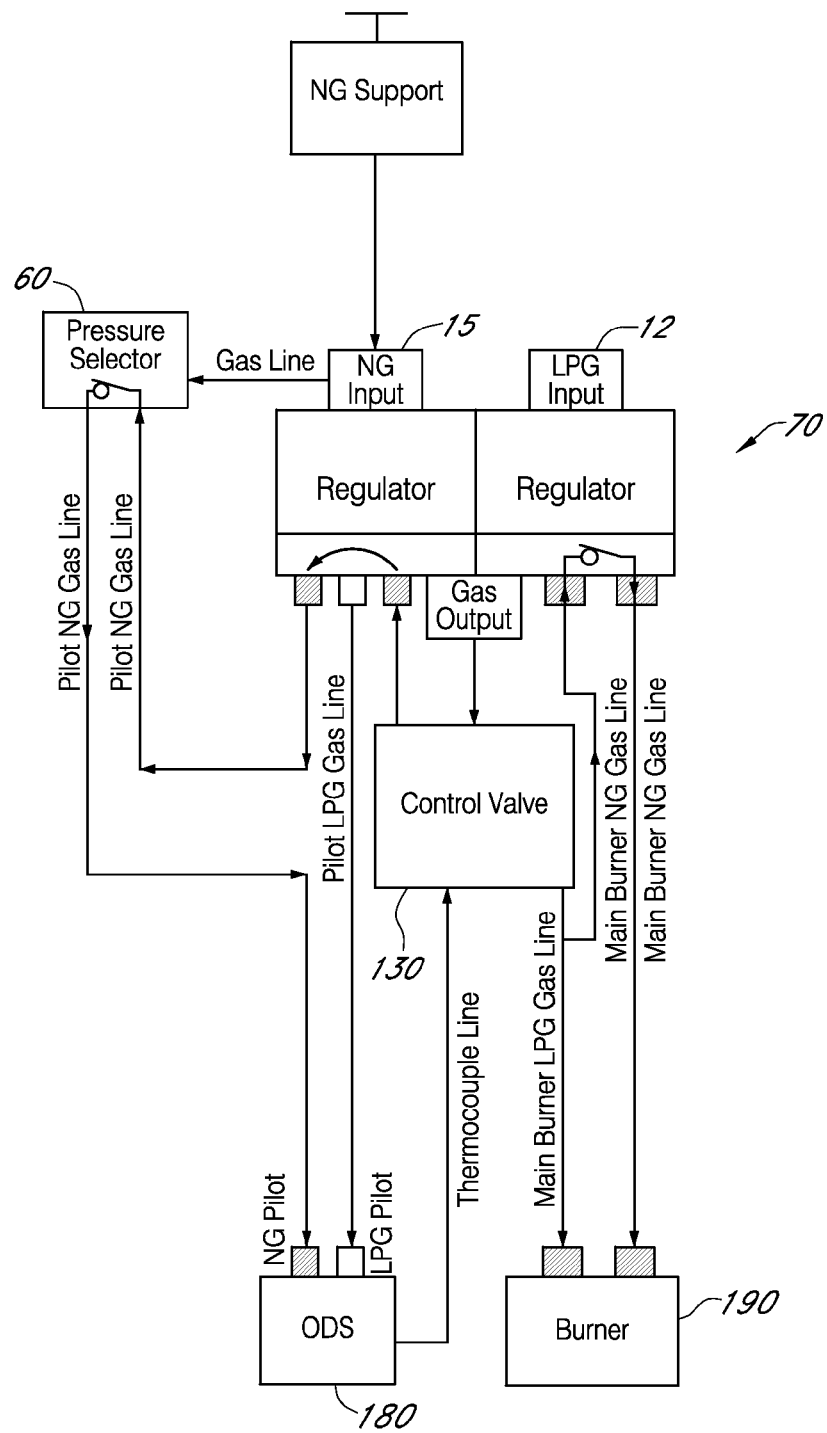
FIGS. 27B, 28B and 29B respectively show a schematic diagram of the flow configuration of one of FIGS. 27A, 28A and 29A.
Figure 28A:
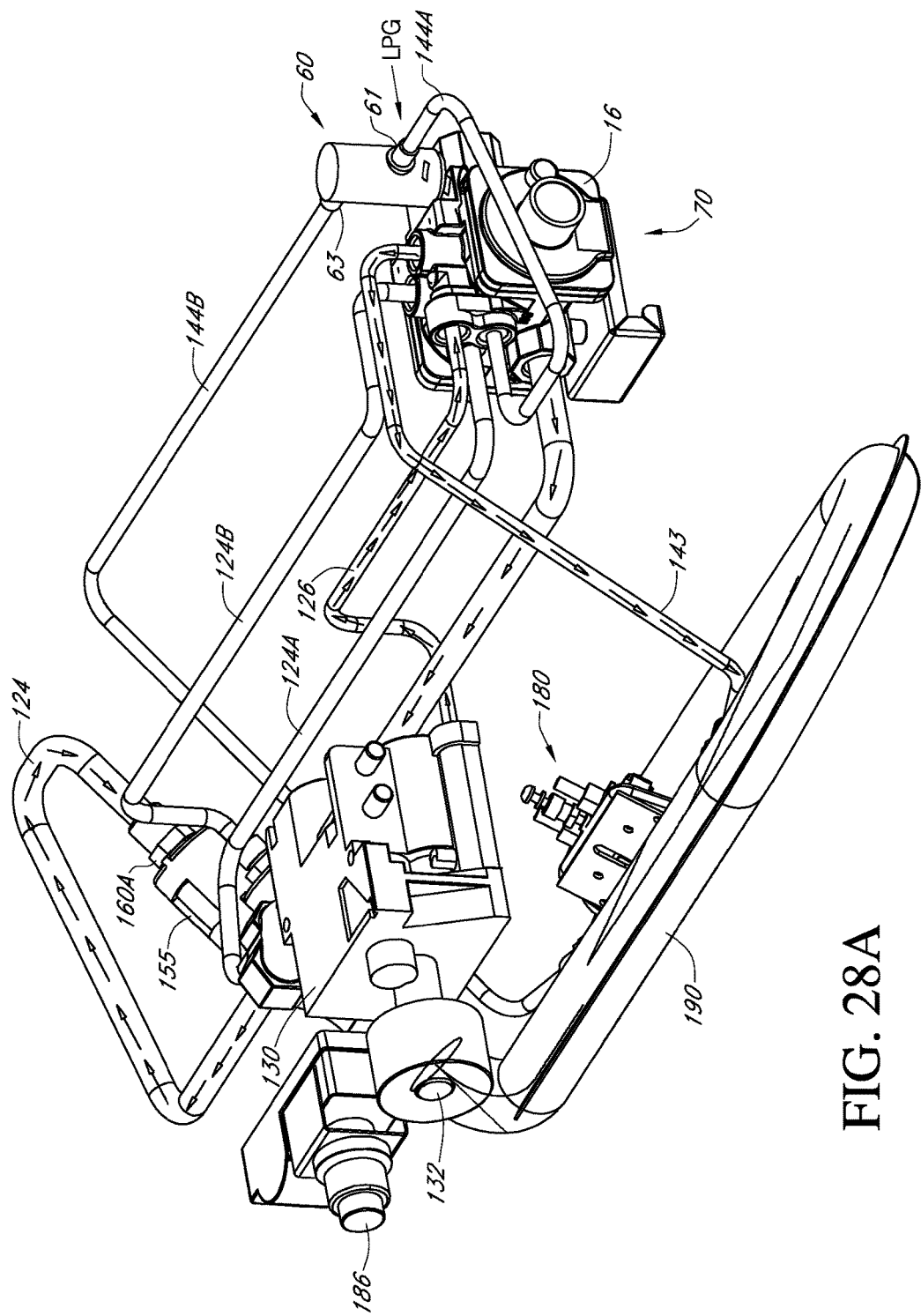
Figure 28B:
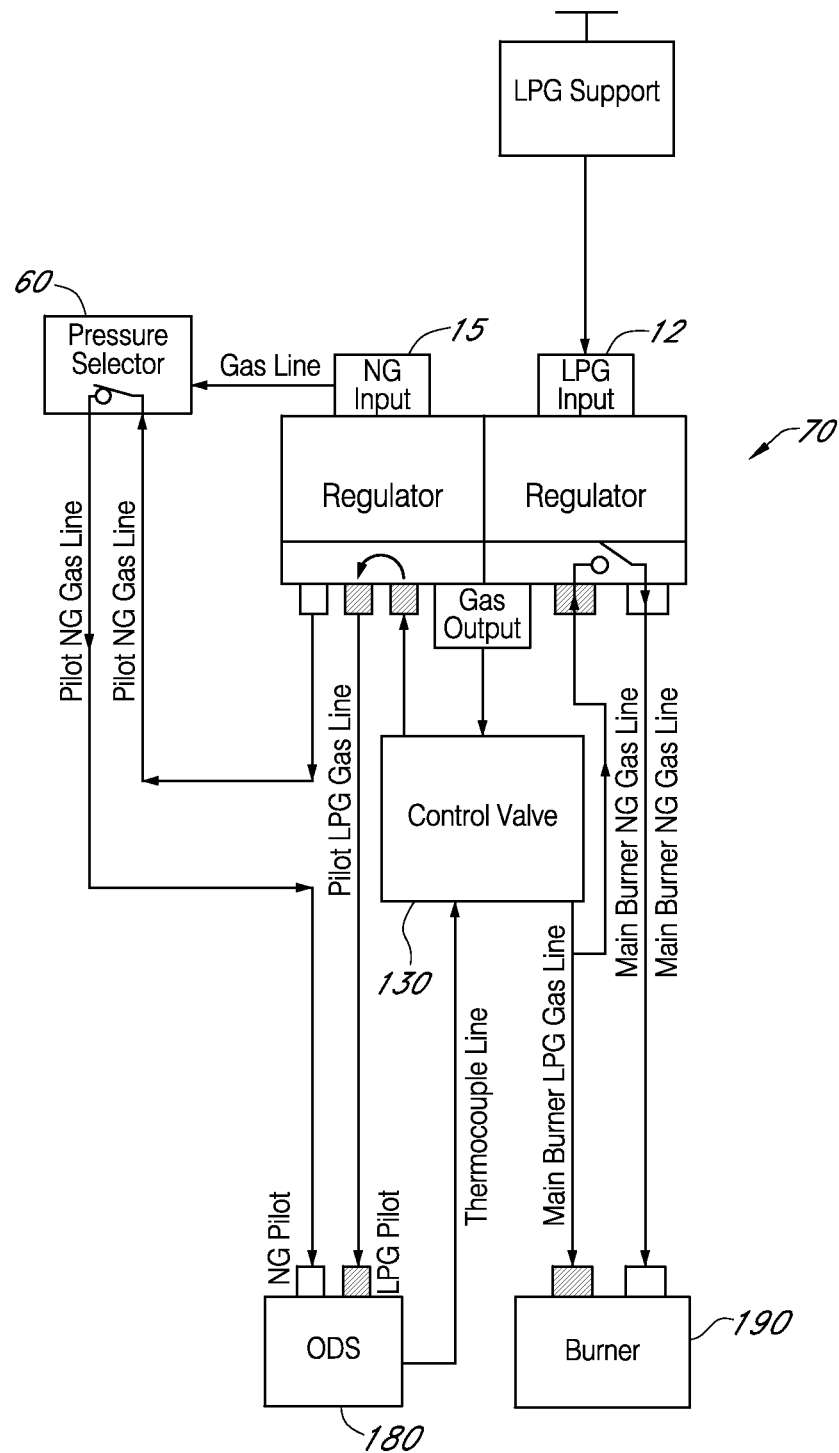
Figure 29A:
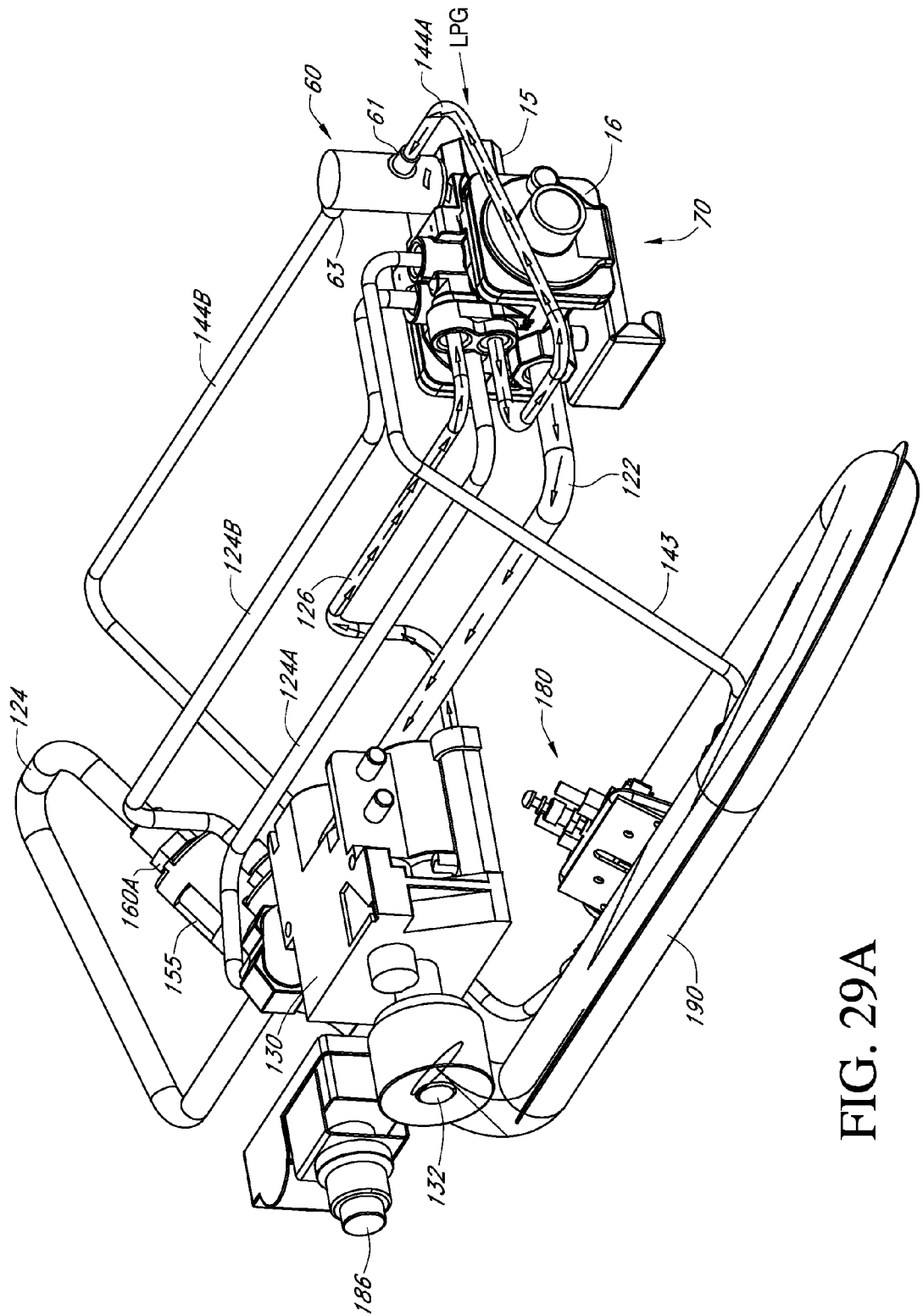
Figure 29B:
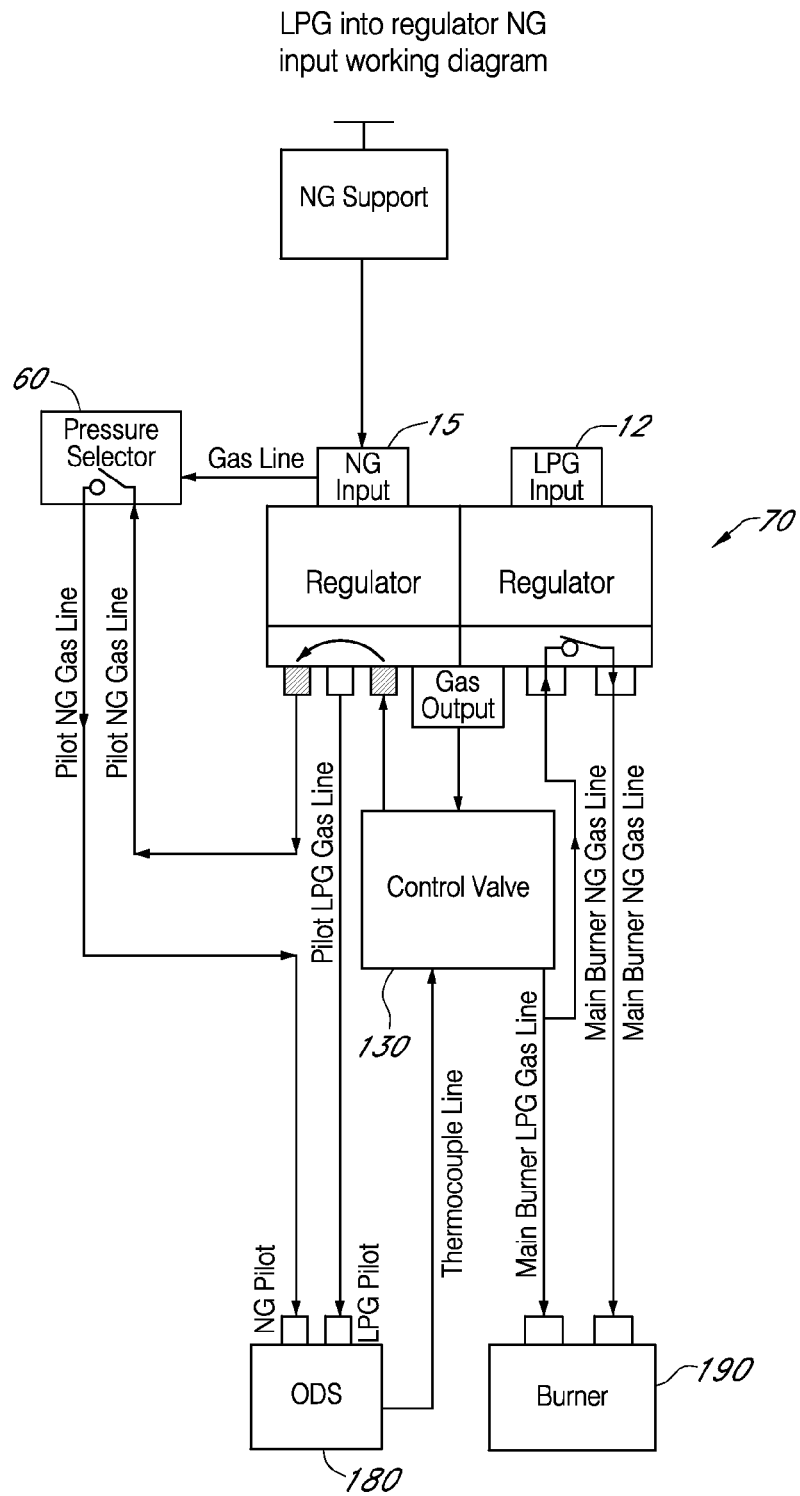
Figure 30:
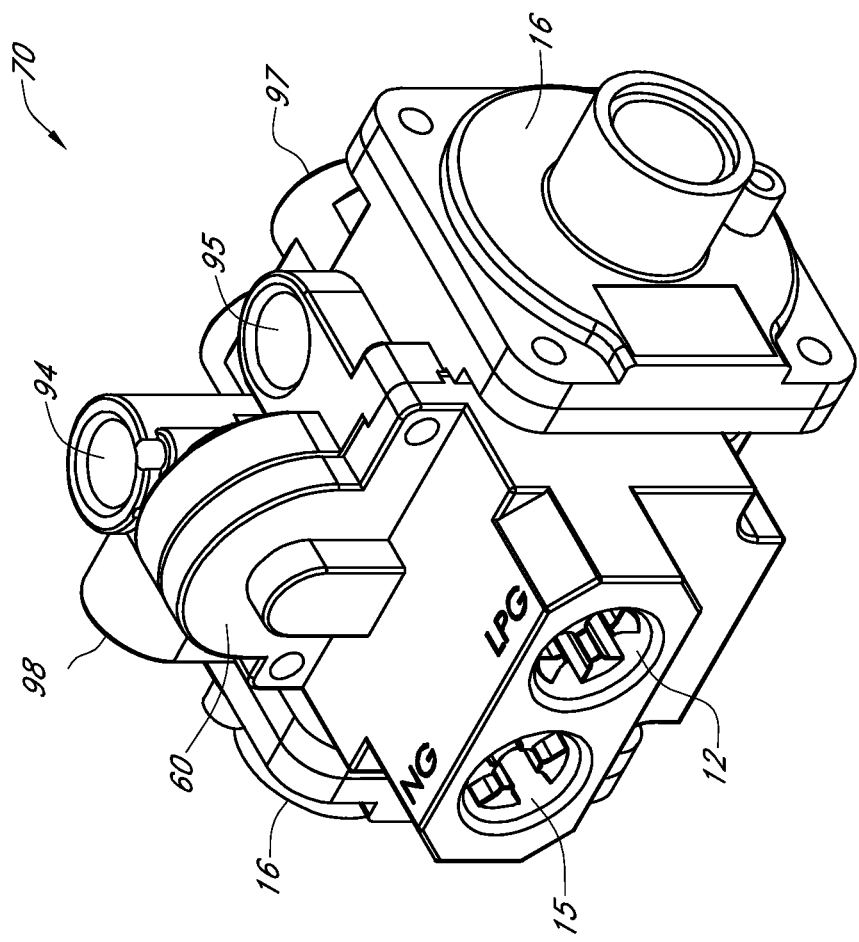
FIGS. 30 and 31 show perspective views of another embodiment of heating source.
Figure 31:
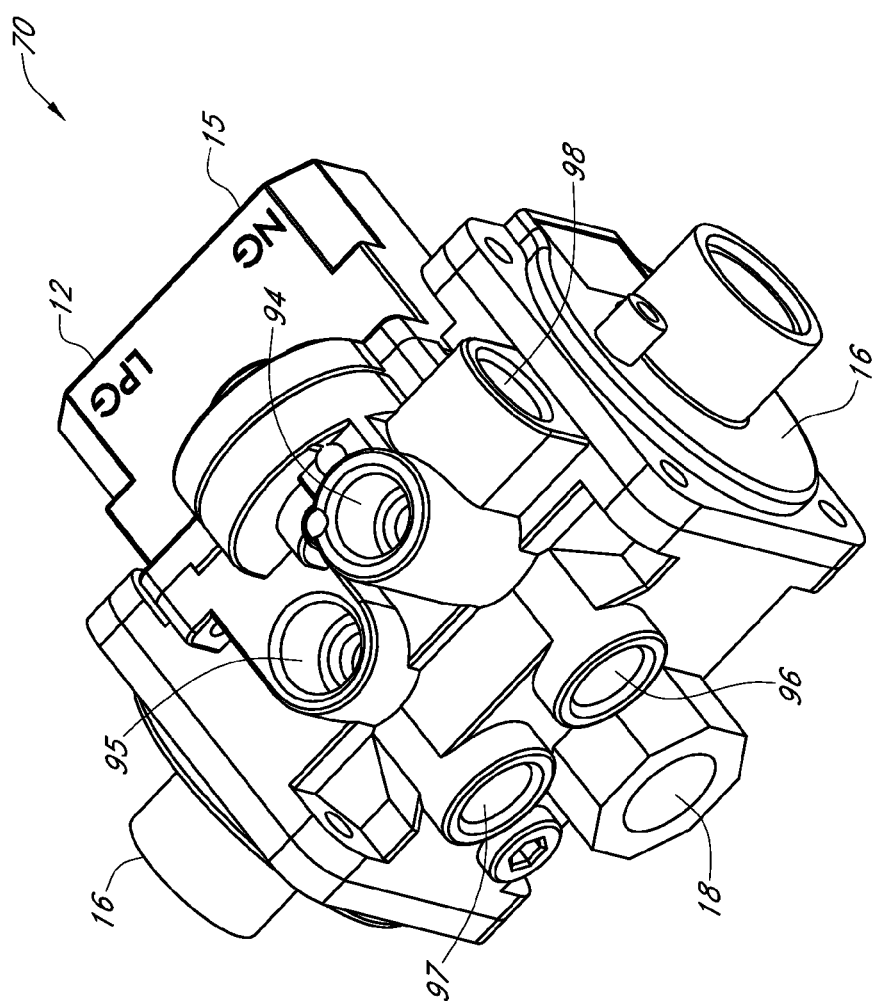

FIGS. 27A, 28A and 29A are partially dissembled views of the heater of FIG. 26 illustrating different flow configurations and FIGS. 27B, 28B and 29B respectively show a schematic diagram of the flow configuration of one of FIGS. 27A, 28A and 29A. FIGS. 27A-B show the flow paths through the heater when a natural gas (NG) supply is connected to the natural gas input 15. It will be understood that the illustrated NG and liquid propane (LPG) inputs and supplies are simply examples of fuels that can be used with the heater.

As shown, when NG is connected to the NG inlet 15, the pressure chamber 68 of the pressure switch 60 is in communication with the fuel as it is delivered to the heater. Thus, the delivery pressure of the gas determines the position of the internal valve member 58. The valve can be configured such that NG delivered within a standard or typical pressure range does not move the valve member so that the flow path between the inlet 61 and the outlet 63 is open and fuel can flow through the flow path. The NG ODS or pilot line 144 has been divided into two segments 144A and 144B with the pressure switch 60 in-between. In this position, the pressure switch 60 can determine whether NG fuel can flow to the pilot or ODS 180. As will be described in more detail below, when an incorrect fuel is connected to the NG inlet with a higher delivery pressure, the pressure switch can prevent this gas from flowing to the pilot 180. Thus, the pilot cannot be proven and fuel cannot flow to the burner.

Though the schematic diagram has been drawn slightly differently from FIG. 15, the other flow paths through the heater and between the control valve 130, heating source 70, ODS 180, and nozzle(s) 160 are the same as those previously described.

FIGS. 28A-B show an LP fuel source connected to the LP inlet 12. The LP inlet 12 is not in communication with the pressure switch 60, thus, the delivery pressure does not control any of the flow paths through the heater.

FIGS. 29A-B show an LP fuel source connected to the NG inlet 15. As shown, when LP is connected to the NG inlet 15, the pressure chamber 68 of the pressure switch 60 is in communication with the fuel as it is delivered to the heater. Thus, the delivery pressure of the gas determines the position of the internal valve member 58. The valve can be configured such that LP delivered within a standard or typical pressure range moves the valve member so that the flow path between the inlet 61 and the outlet 63 is closed and fuel cannot flow through the flow path. The NG ODS or pilot line 144 has been divided into two segments 144A and 144B with the pressure switch 60 in-between. In this position, the pressure switch 60 can determine whether fuel can flow to the pilot or ODS 180. As LP is the incorrect fuel in this instance, because it in is connected to the incorrect NG inlet and it has a higher delivery pressure than NG, the pressure switch can prevent LP from flowing to the pilot 180 in this situation. Thus, the pilot cannot be proven and LP fuel cannot flow to the burner through incorrect flow paths. Thus, a user can be prevented from causing a safety hazard that may result if the wrong fuel where connected to the wrong inlet or fuel hook-up of the heater.

Though the pressure switch 60 is shown configured to control flow through one of the ODS lines, it will be understood that the pressure switch 60 could also be positioned in other locations to control other flows. For example, the pressure switch could be used to control flow to the burner, positioned for example at a point along the NG gas line 124B. In this way, the pressure switch could allow the heater to still be used when LP is connected to the NG inlet, but would only allow flow to the LP burner nozzle.

In another embodiment, the pressure switch 60 can be used on a dual fuel heater with a single inlet, such as with a changeable pressure regulator to a two position pressure regulator. The pressure switch can include a rocker valve, instead of the on/off valve and can be used to determine the flow path to the pilot or ODS. Thus, the pressure switch can have two alternate outlets instead of a single outlet 63. One outlet can direct fuel to a first pilot, first pilot nozzle, or first orifice and the second outlet can direct fuel to a second pilot, second pilot nozzle, or second orifice. For example the first nozzle pilot can be configured for NG and the second for LP.

In addition, the pressure switch 60 with flow control could be used on a single fuel heater, such as an NG heater. The pressure switch may be positioned along a flow path directed towards the pilot, ODS, burner, or control valve, among other features.

Moving now to FIGS. 30-33B an embodiment of a heating source 70 is shown that incorporates a pressure switch 60 with flow control into the housing of the heating source. The heating source can function in a manner similar to those previously described. For example, the heating source of FIGS. 30-33B can be the same as that described with respect to FIGS. 22-24B with the addition of the pressure switch 60. Of course it will be understood that the pressure switch 60 can also be used with and/or integrated into other heating sources as well. In addition, other types of pressure switches may be integrated into the heating source, for example, a pressure switch with electronic control can be integrated into the heating source.

Thus, in some embodiments a fuel source can connect to either inlet 12 or inlet 15. Selecting the inlet can determine which pressure regulator 16 will be used as well as selecting certain flow paths through the heating source 70. From the pressure regulator, the fuel can exit at outlet 18 to the control valve 130. The control valve 130 can direct a flow of fuel for the pilot or ODS to the inlet 94 and a flow of fuel for the burner to the inlet 95. Depending on whether the inlet 12 or the inlet 15 is selected can determine whether fuel will flow to the burner from outlet 97. Also, depending on whether the inlet 12 or the inlet 15 is selected can determine whether the pilot flow will exit outlet 96 or 98.

Figure 32A:
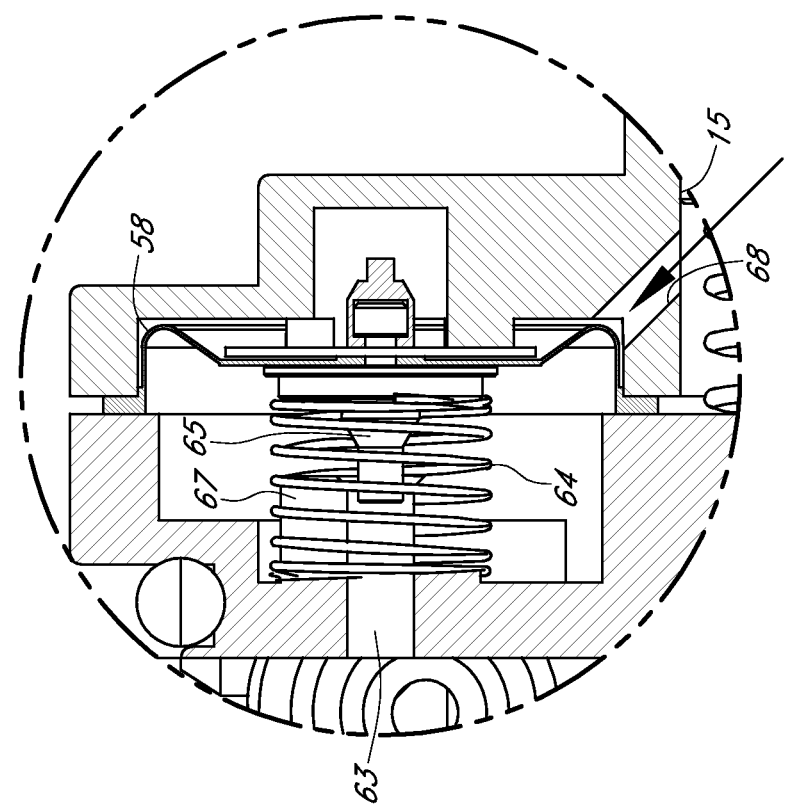
FIG. 32A is a detail view of the heating source from circle A in FIG. 32.
Figure 32:
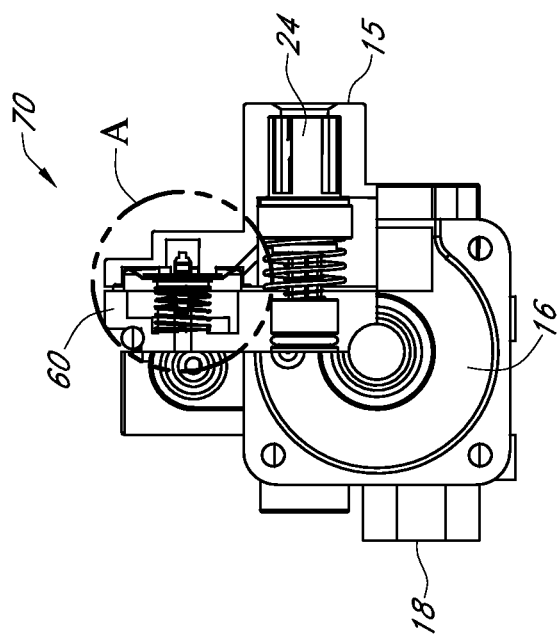
FIG. 32 is a side view of the heating source of FIG. 30 in partial cross-section.
Figure 33A:
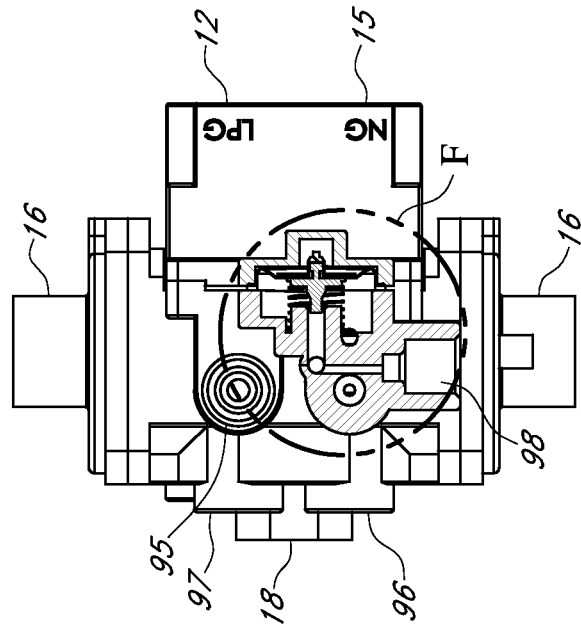
FIG. 33A is a top view of the heating source with a partial cross-section taken along line B-B of FIG. 33.
Figure 33:
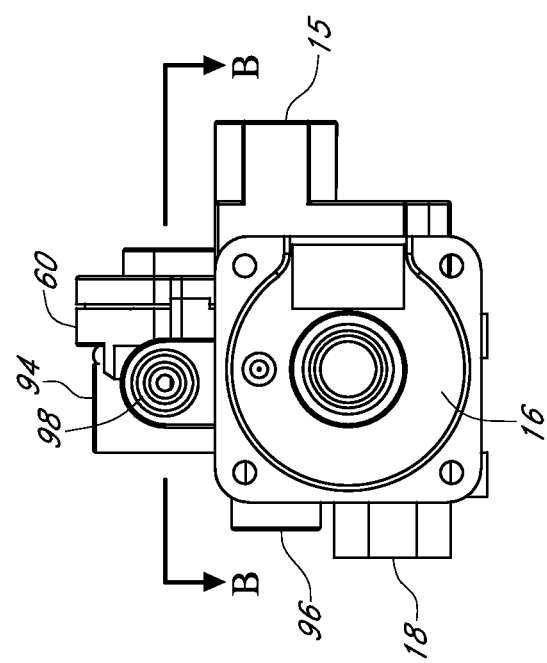
FIG. 33 is a side view of the heating source of FIG. 30.
Figure 33B:
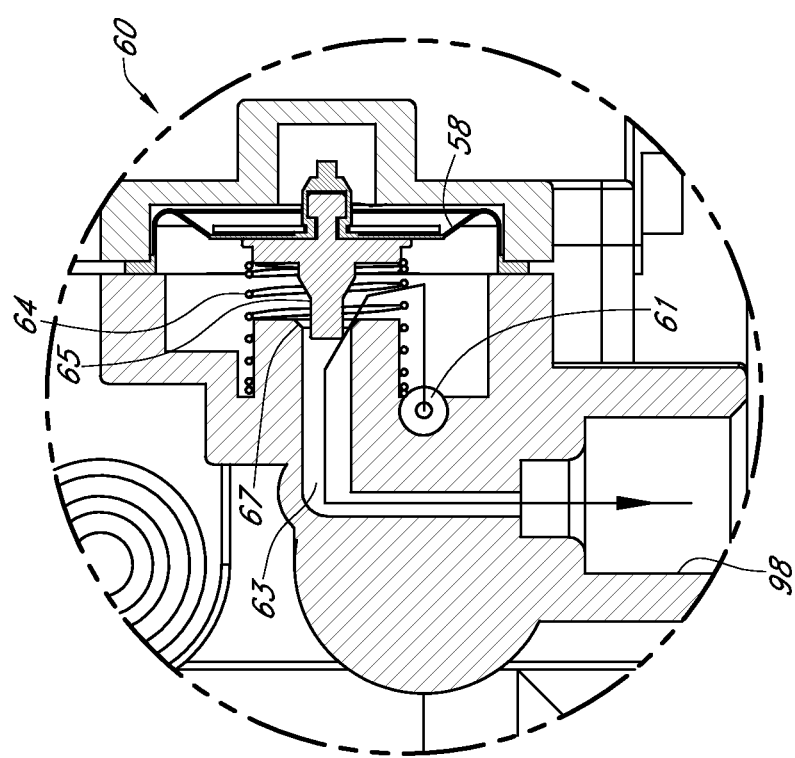
FIG. 33B is a detail view of the heating source from the partial cross-section of FIG. 33A.

If the inlet 15 has been selected, then the delivery pressure of the fuel and the pressure switch 60 can also determine whether fuel can flow to the pilot. Looking now at FIGS. 32-33B, the details of the pressure switch can be seen. In FIG. 32A the inlet 68 can be seen that allows fluid communication between fuel at the inlet 15 and the valve 58 of the pressure switch. If the delivery pressure exceeds a predetermined threshold pressure, the valve 58 can be moved from a first position to a second position. In the illustrated embodiment, this can close the flow path between inlet 61 and outlet 63 as best seen in FIG. 33B. Inlet 61 of the pressure switch 60 can be connected to the inlet 94 of the heating source 70 and outlet 63 of the pressure switch 60 can be connected to the outlet 98 of the heating source 70. A separate valve can be used to determine whether the inlet 94 is open to the outlet 96 or the outlet 98 as has been described with respect to previous embodiments.

According to some embodiments, a heater assembly can comprise a burner, a pilot light, a gas hook-up, a control valve and a pressure switch. The control valve can be configured to receive a flow of fuel from the gas hook-up and to selectively direct fuel to the pilot light and the burner. The pressure switch can be in fluid communication with the gas hook-up and be movable at a predetermined threshold pressure from a first position to a second position. The pressure switch can be further configured such that if a fuel is connected to the gas hook-up that has a delivery pressure either above or below the predetermined threshold pressure, the fuel will act on the pressure switch to move it from the first position to the second position.

The movement from the first position to the second position results in a change in the heater assembly. This change can be a safety feature, such as to prevent the wrong fuel from flowing through the heater assembly through the wrong flow paths, but may also provide a control mechanism, such as determining a flow path through the heater assembly. In some embodiments, the movement of the pressure switch prevents that the pilot light from being proven to thereby prevent the fuel from flowing to the burner. This may be a result of a change in the electrical system or a change in the flow of fuel through the system.

In some embodiments, the pressure switch can comprise a valve member, first and second electrical contacts, and a movable contact member mechanically connected to the valve member and movable therewith. The movable contact member can be configured for electrical connection to the first and second electrical contacts when in a first engaged position and having a second disengaged position configured to create an open circuit. The electrical contacts can be used with a thermocouple, igniter, printed circuit board, and/or control valve, among other features. For example, in some embodiments, the movable contact member of the pressure switch is in the second disengaged position when the delivery pressure is above a predetermined threshold pressure to create an open circuit between the thermocouple and the control valve such that the control valve cannot flow fuel to the burner.

In some embodiments, the pressure switch can be used to control whether an electric signal can flow to the igniter. In still other embodiments, the pressure switch comprises a valve member positioned within a flow channel and movement of the pressure switch either opens or closes the flow channel. The pressure switch can allow or prevent flow to the pilot or to the burner in some embodiments.

According to some embodiments, a heater assembly can comprise a pilot light, a burner, a first gas hook-up, a control valve configured to receive a flow of fuel from the first gas hook-up and to selectively direct fuel to the pilot light and the burner, and a pressure switch in fluid communication with the first gas hook-up. The pressure switch can comprise a valve member movable at a predetermined threshold pressure, first and second electrical contacts, and a movable contact member mechanically connected to the valve member and movable therewith. The movable contact member can be configured for electrical connection to the first and second electrical contacts when in a first engaged position and have a second disengaged position configured to create an open circuit. The pressure switch can be configured such that if a fuel is connected to the first gas hook-up that has a delivery pressure either above the predetermined threshold pressure in one situation, or below the predetermined threshold pressure in another situation, the fuel will act on the pressure switch to move the movable contact member from one of the first or second positions to the other position such that the pilot light cannot be proven to thereby prevent the fuel from flowing to the burner.

The contact member can contact two electrical connection members which can be electrically connected to a printed circuit board, igniter, igniter switch, control valve and/or thermocouple, among other features.

In some embodiments, a heater assembly can comprise a housing comprising: a first gas hook-up, a first pressure regulator, a first flow path extending between the first gas hook-up and the pressure regulator, a second flow path, and a pressure switch in fluid communication with the first gas hook-up upstream from the first pressure regulator. The pressure switch can be movable from a first position to a second position when a delivery pressure of a fuel at the first gas hook-up is within a predetermined delivery pressure range. The pressure switch can be configured such that if the fuel connected to the first gas hook-up has a delivery pressure within the predetermined delivery pressure range, the fuel will act on the pressure switch to move it from the first position to the second position which movement opens or closes the second flow path through the housing.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A heater assembly for use with one of a first fuel type or a second fuel type different than the first, the heater assembly comprising:
    a first pressure regulator configured to regulate a fuel flow of a first fuel type within a first predetermined range
    a second pressure regulator configured to regulate a fuel flow of a second fuel type within a second predetermined range different from the first;
    a housing comprising:
        a first fuel hook-up for connecting the first fuel type to the heater assembly, the first fuel hook-up configured to direct fuel flow to the first pressure regulator;
        a second hook-up for connecting the second fuel type to the heater assembly, the second fuel hook-up configured to direct fuel flow to the second pressure regulator;
        a first outlet in fluid communication with both the first and second pressure regulators;
        a first inlet;
        a second inlet;
        a second outlet;
        a third outlet; and
        a fourth outlet;
    a first actuation member having an end located within the first fuel hook-up and having a first actuation member first position and a second position, the actuation member configured such that connecting a fuel source to the heater assembly at the first fuel hook-up moves the actuation member from the first actuation member first position to the second position,
        wherein in the first actuation member first position, fuel flow through the first fuel hook-up and between the second inlet and the fourth outlet is prevented and in the first actuation member second position, fuel flow through the first fuel hook-up and between the second inlet and the fourth outlet is permitted;
    a second actuation member having an end located within the second fuel hook-up and having a first position and a second position, the actuation member configured such that connecting a fuel source to the heater assembly at the second fuel hook-up moves the actuation member from the first position to the second position,
        wherein in the second actuation member first position, fuel flow through the second fuel hook-up between the first inlet and the third outlet is prevented and in the second actuation member second position, fuel flow through the second fuel hook-up and between the first inlet and the third outlet is permitted.

2. The heater assembly of claim 1, wherein in the second actuation member first position, fuel flow between the first inlet and second outlet is permitted and in the second actuation member second position, fuel flow between the first inlet and the second outlet is prevented.

3. The heater assembly of claim 1, further comprising a spring operatively coupled to the first actuation member to bias the actuation member towards the first position.

4. The heater assembly of claim 1, wherein the actuation member comprises a rod configured for linear advancement from the first position to the second position.

5. The heater assembly of claim 1, wherein each actuation member comprises at least two separately movable valve members.

6. The heater assembly of claim 5, wherein each actuation member further comprises a separate movable member positioned in between two movable valve members.

7. The heater assembly of claim 1, further comprising a control valve, a nozzle, and a pilot or oxygen depletion sensor.

\* \* \* \* \*